US012211339B2

United States Patent

(12) United States Patent
Danielson et al.

(10) Patent No.: US 12,211,339 B2
(45) Date of Patent: *Jan. 28, 2025

(54) VIDEO DISPLAY PROGRAMMABLE PLAYING CARDS

(71) Applicant: IGT, Las Vegas, NV (US)

(72) Inventors: Patrick Danielson, Las Vegas, NV (US); Dwayne Nelson, Las Vegas, NV (US); Samantha Ascheri-Phillips, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,205

(22) Filed: Dec. 14, 2022

(65) Prior Publication Data

US 2023/0112066 A1 Apr. 13, 2023

Related U.S. Application Data

(63) Continuation of application No. 17/220,063, filed on Apr. 1, 2021, now Pat. No. 11,551,507.

(60) Provisional application No. 63/008,381, filed on Apr. 10, 2020.

(51) Int. Cl.
*G07F 17/32* (2006.01)

(52) U.S. Cl.
CPC ...... *G07F 17/3211* (2013.01); *G07F 17/3293* (2013.01)

(58) Field of Classification Search
CPC .......... A63F 2001/008; A63F 2009/241; A63F 2009/2454; G07F 17/322; G07F 17/3211; G07F 17/3293
See application file for complete search history.

(56) References Cited

U.S. PATENT DOCUMENTS 6,890,260 B2 5/2005 Ollins
7,097,108 B2 8/2006 Zellner et al.
7,762,887 B1 7/2010 House et al.
8,419,535 B2 4/2013 Miller et al.
8,512,137 B2 8/2013 Hayes et al.
(Continued)

OTHER PUBLICATIONS

"E-paper to be enabled by flexible processor," Ziff Davis, LLC., Feb. 17, 2005, 8 pages [retrieved online from: www.geek.com/blurb/e-paper-to-be-enabled-by-flexible-processor-558200/].
(Continued)

*Primary Examiner* — Dmitry Suhol
*Assistant Examiner* — Jason Pinheiro
(74) *Attorney, Agent, or Firm* — Sheridan Ross P.C.

(57) ABSTRACT

The present disclosure relates generally to electronic playing cards, each of the playing cards comprising opposing first and second planar playing card surfaces such that, when being viewed by the corresponding player, the first planar playing card surface faces the other players and the second planar playing card surface faces the corresponding player. The first and/or second planar playing card surface can comprise a digital display. A gaming system can assign an electronic playing card to each player in a card game and determine and provide to each of the electronic playing cards an assigned playing card parameter (e.g., card suit and rank) for depiction by a digital display of the respective playing card.

20 Claims, 19 Drawing Sheets

(56) References Cited

U.S. PATENT DOCUMENTS

| | | | | |
|---|---|---|---|---|
| 8,808,077 | B1 * | 8/2014 | Chun | G07F 17/323 463/25 |
| 9,254,435 | B2 * | 2/2016 | Miller | A63F 1/14 |
| 9,558,617 | B2 * | 1/2017 | Peera | A63F 1/062 |
| 10,198,913 | B1 * | 2/2019 | Deckoff | A63F 1/02 |
| 10,706,667 | B1 | 7/2020 | Shepherd et al. | |
| 10,765,929 | B2 * | 9/2020 | Jones | G07F 17/3293 |
| 11,488,440 | B2 * | 11/2022 | Nguyen | G07F 17/3223 |
| 11,551,507 | B2 | 1/2023 | Danielson et al. | |
| 2004/0002387 | A1 | 1/2004 | Grady | |
| 2004/0248073 | A1 | 12/2004 | Pinkerman et al. | |
| 2006/0058082 | A1 | 3/2006 | Crawford et al. | |
| 2008/0076505 | A1 * | 3/2008 | Nguyen | G07F 17/3293 463/16 |
| 2008/0113772 | A1 * | 5/2008 | Burrill | G07F 17/322 463/43 |
| 2008/0234024 | A1 * | 9/2008 | Connors | G07F 17/32 463/31 |
| 2008/0303782 | A1 | 12/2008 | Grant et al. | |
| 2010/0311488 | A1 * | 12/2010 | Miller | A63F 1/12 463/31 |
| 2010/0311489 | A1 * | 12/2010 | Miller | A63F 1/12 463/31 |
| 2010/0311490 | A1 * | 12/2010 | Miller | G07F 17/3293 463/16 |
| 2010/0311493 | A1 * | 12/2010 | Miller | A63F 1/02 463/40 |
| 2010/0311494 | A1 * | 12/2010 | Miller | A63F 1/18 463/22 |
| 2010/0311502 | A1 * | 12/2010 | Miller | A63F 1/02 463/30 |
| 2010/0312625 | A1 * | 12/2010 | Miller | G06Q 30/0252 705/14.5 |
| 2011/0045886 | A1 * | 2/2011 | Hayes | G07F 17/32 463/43 |
| 2011/0065081 | A1 | 3/2011 | Wen | |
| 2013/0296008 | A1 | 11/2013 | Hardison | |
| 2015/0209654 | A1 * | 7/2015 | Jones | G07F 17/3293 463/31 |
| 2016/0063797 | A1 | 3/2016 | Shepherd et al. | |
| 2019/0371110 | A1 | 12/2019 | Higgins et al. | |
| 2020/0320820 | A1 * | 10/2020 | Bros | G07F 17/3223 |
| 2022/0036697 | A1 * | 2/2022 | Shigeta | G07F 17/3241 |
| 2023/0206719 | A1 * | 6/2023 | Birkenmeyer | G07F 17/3211 463/13 |

OTHER PUBLICATIONS

AnandTech "A look at LG G Flex's Flexible OLED display," YouTube, Dec. 3, 2013, pages [retrieved online from: www.youtube.com/watch?v=JmewQRNhILw].

Kevin Darrah, "E-Paper + ESP8266 Tutorial—Easy Text & Images," YouTube, Aug. 17, 2018, 0:45-1:10, pages [retrieved online from: www.youtube.com/watch?v=0luqL-4UftA].

Official Action for U.S. Appl. No. 17/220,063, dated Mar. 14, 2022 19 pages.

Notice of Allowance for U.S. Appl. No. 17/220,063, dated Sep. 29, 2022 7 pages.

* cited by examiner

VIDEO DISPLAY PROGRAMMABLE PLAYING CARDS

CROSS REFERENCE TO RELATED APPLICATIONS

The present application is a continuation of and claims priority to U.S. application Ser. No. 17/220,063, filed Apr. 1, 2021, which claims priority to U.S. Provisional Application No. 63/008,381, filed Apr. 10, 2020, the entire disclosures of which are hereby incorporated by reference.

BACKGROUND

The present disclosure is directed generally toward gaming systems and devices and, in particular, playing cards associated with gaming systems and devices.

A standard 52-card deck of French playing cards (54 counting wild cards) is the most common deck of playing cards. It includes thirteen ranks in each of the four French suits: clubs (♣), diamonds (♦), hearts (♥) and spades (♠), with reversible "court" or face cards. Each suit includes an ace, a king, queen and jack, each depicted with a symbol of its suit; and ranks two through ten, with each card depicting that many symbols (pips) of its suit. Anywhere from one to six jokers or wild cards are added to commercial decks.

While the most popular standard pattern of the French deck is sometimes referred to as "English" or "Anglo-American" pattern, other types of card decks are in use. For example, in Central Europe, German suited cards are widely used, whereas Italian suited cards are common in Italy and Spanish suited cards on the Iberian Peninsula. In addition, tarot cards are required for games such as French Tarot, which is widely played in France, and the Tarock family of games played in countries like Austria and Hungary. Unicode playing card decks have been introduced for many card games.

Card games using the standard 52-card deck are popular at casinos. Examples of casino card games include blackjack, 3- and 4-card poker, baccarat, pai gow poker, Caribbean stud poker, let it ride poker, Spanish 21, casino war, super fun 21, Vegas three card rummy, Texas hold'em, Omaha, solitaire, and 7 card stud. While card games are typically played at casino table games using a physical deck of cards, online casinos use virtual playing cards rendered to the player on a display.

The use of physical cards in casinos typically require random shuffling of the cards, such as using a shuffling machine, and adequate precautions to be taken to detect instances of cheating by players, such as by marking or bending cards to perform card counting.

BRIEF SUMMARY

In certain embodiments, the present disclosure relates to a gaming system, comprising: a playing card having opposing first and second planar playing card surfaces, the opposing first and second planar playing card surfaces comprising one or more digital display(s) to provide selected content; and a processor, in communication with the digital display(s), that renders first selected content at a first time and different second selected content at a second time via the digital display(s).

In some embodiments, the present disclosure also relates to a method of playing a card game, comprising: (a) assigning, by a gaming system, a playing card to a corresponding player of a plurality of players in a card game, each of the playing cards having opposing first and second planar playing card surfaces, wherein, when being viewed by the corresponding player, the first planar playing card surface faces the other players and the second planar playing card surface faces the corresponding player, and the second planar playing card surface comprising a digital display; (b) determining, by the gaming system, a playing card parameter to be assigned to each of the playing cards; (c) providing, by the gaming system, each of the playing cards with the corresponding determined playing card parameter for depiction by the digital display of the respective playing card; and (d) receiving, by the gaming system, current playing card state information from the playing card.

In some embodiments, the present disclosure also relates to a playing card comprising: first and second opposing planar playing card surfaces; a wireless receiver positioned relative to the first and second opposing planar playing card surfaces to receive selected content from a gaming system; a digital display positioned adjacent to one of the first and second opposing planar playing card surfaces; a processor in communication with the wireless receiver and digital display and positioned between the first and second opposing planar playing card surfaces; a computer-readable storage medium, coupled with the processor and positioned between the first and second opposing planar playing card surfaces, comprising instructions that are executable by the processor, wherein the instructions comprise instructions that control depiction of the selected content by the digital display; and a power source coupled with the digital display and processor.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

An Electronic Gaming Machine (EGM) as used herein refers to any suitable electronic gaming device which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk.

An Electronic Gaming Table or Electronic Table Game (EGT) as used herein refers to a gaming device in the form of a table that enables a player to play a game (including but not limited to a game of chance, a game of skill, and/or a game of partial skill), such as roulette, poker, blackjack or Baccarat, to potentially win one or more awards. There can be multiple player seats in the electronic gaming table for tournament or side game play, and each player can operate or play the game in the electronic gaming table.

A "gaming system" as used herein refers to various configurations of: (a) one or more central servers, central controllers, or remote hosts; (b) one or more gaming devices such as those located on a casino floor; and/or (c) one or more personal gaming devices, such as desktop computers, laptop computers, tablet computers or computing devices, personal digital assistants, mobile phones, and other mobile computing devices.

Additional features and advantages are described herein and will be apparent from the following Description and the figures.

DETAILED DESCRIPTION

Figure 1D:
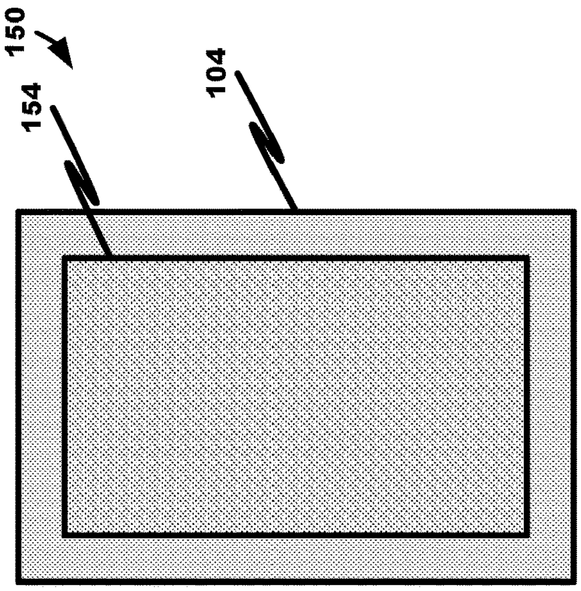
FIG. 1D illustrates a top view of a VDPPC in accordance with embodiments of the present disclosure.

The video programmable playing card ("VDPPC") of the present disclosure can have the dimensions of a standard playing card and include one or more digital displays to render or provide selected content. By way of illustration, a standard playing card is about 2 to about 3 inches in width, about 3 to about 4 inches high, and about 0.0025 to about 0.025 inches in thickness. The selected content can be a playing card parameter, such as a type (e.g., suit) or value (rank) of a playing card, a casino logo or other customized casino content, an advertisement, or other selected content. The VDPPC can provide a dynamic user sensory feedback response, such as color and video by the digital display and/or sound and/or movement by other sensory feedback devices, in response to and dependent upon a sensed context associated with the VDPPC. Stated differently, the VDPPC can produce, in response to first sensed context information, a first sensory feedback response corresponding to a first appearance of the VDPPC and, in response to different second sensed context information, a second sensory feedback response corresponding to a different second appearance of the VDPPC.

VDPPCs can have the appearance of a playing card, have a substantially uniform size, shape, and pattern, be bendable and flexible in a player's fingers in a manner substantially similar to the bendability and flexibility of a standard playing card, be stackable as typical or standard playing cards to form a deck that can be shuffled manually or mechanically, and have a substantially uniform weight to allow them to be handled in a manner similar to standard playing cards. Through the ability to provide players with assigned playing card parameters using modern display technologies, VDPPCs can avoid the complexity associated with the secure and random shuffling of standard playing cards, avoid fraud caused by players marking cards and performing card counting, increase player privacy and security by providing players with greater control over potential viewing of playing card parameters by other players during a card game, and provide increased player satisfaction by providing a controllable digital display for on-demand content. VDPPCs can use random number generation not only to generate playing card parameters randomly, thereby enabling automatic and secure shuffling, but also to disassociate a physical card with a specific card issued to a player during a game, thereby making card counting difficult, if not impossible. VDPPCs can beneficially allow for further enhancements to the play of card games, such as allowing in-game bonuses, dynamic wild cards, and custom card branding of a card or cards. It should be appreciated that such bonuses associated with the VDPPC may include a non-monetary award (such as an award of a bonus set of playing card parameter(s)) and/or a monetary award. VDPPCs can be used as a replacement to physical cards, or in conjunction with physical cards at a casino table.

VDPPCs can also provide customized or dynamic user sensory feedback responses to players, thereby providing higher levels of customer satisfaction leading to higher casino revenue. The use of sensed context information to control VDPPC behavior can give a player the perception that the VDPPC is more than simply a playing card but rather is an artificially intelligent gaming companion that is uniquely linked to the player. The incorporation of one or more displays into the VDPPC enables the same VDPPC to display content customized for different players or games, thereby enhancing player satisfaction and reducing casino playing card demands. Additionally, the VDPPC can be used as an alternate player tracking mechanism due to its on-board logic and wireless communication ability. The VDPPC can have an on-board power source that is wirelessly chargeable to provide ease-of-use to the player and casino.

A number of examples will demonstrate other benefits associated with VDPPCs.

With the introduction of VDPPCs, casinos are no longer limited to leveraging the cards in a traditional deck of cards. Instead, the contents of cards can change dynamically based upon many different triggers. For example, players could be dealt a "bonus card". In an embodiment, the "bonus card" could act as a "wild card" to help the player get a better hand. Alternatively or additionally, the player could win a bonus (triggered based upon time, win/loss/or amount bet thresholds). Alternatively or additionally, the bonus could negatively change a player's hand to turn it into a loser. Players may be required to make it to a certain level or point in the hand in order for their bonus to be revealed, such as making it through the last betting round.

VDPPCs can be customized by the casino or by players. In the simplest embodiment, the back or first digital display of each VDPPC could display a custom image created by or associated with the casino. In another branding embodiment, each VDPPC could be customized by the casino to represent: a holiday, a special event (super bowl weekend, final four, etc.). Customization could also be player or hand-specific. The first display of a VDPPC could change to illustrate the player's rank, such as having a Platinum, Gold, Silver, or Bronze color if the player has a rank of Platinum, Gold, Silver, or Bronze in the casino's players club. The back of the VDPPC could change to highlight which player won the last hand. The back of the VDPPC could change to highlight which player has been winning the most at the table or casino. The player could also control the branding of the VDPPC, such as being able to change the back of the VDPPC to contain their lucky color.

A gaming table can leverage a combination of physical cards and VDPPCs to increase levels of player excitement. For example, a player could be dealt one or more physical playing cards plus one or more VDPPCs where the VDPPCs are assigned playing card parameters. To avoid duplication and player cheating, the playing card parameters of physical playing cards and VDPPCs are tracked. Stated differently, a virtual deck can be maintained in memory with the set of possible playing card parameters with each subset of playing card parameters associated with a potential card having a queue or deck position relative to other cards, a status indicator indicating whether or not the card has been dealt to a player with an identity of the player or player seating position, and a card source indicator indicating whether the card was dealt as a physical card from the physical deck or as a displayed image on a VDPPC.

Images, text and colors can be used to teach players how to play a specific card game. For example, each player during a training game is dealt a hand. The cards communicate with a central program executing on a gaming server that allows the dealer to follow the game and provide instruction to players as the game progresses. Alternatively or additionally, the central program sends prompts to the cards in each players hand to let players know: when it's their turn to play (for example, cards in player's hand light up); what type of hand the players can build with their cards (for example, if the player has an ace, queen, king, and jack in their hand, the words "straight flush" display on each of the cards); and which potential hand is better than another (for example, if the player has a hand comprised of an ace, king, queen, and two jacks, the flush cards would read "straight flush" in green, one of the two jacks would display "two of a kind" in red text, and one of the jacks would display both "straight flush" and "two of a kind".) The color-coded text would act as a visual cue to let the player know which hands are better/worse.

Near Field Communication ("NFC") or other wireless technologies and protocols, such as Bluetooth Low Energy (BLE), can be used to send and receive data between a control unit (or antenna connected to a table-level control unit) to change the state on the VDPPCs for the various use cases above, such as: to display the card type and/or value on the face of the card, to present advertisement or one or more custom graphics on the back of the card, to present an advertisement on either the face or back of a card, to present bonus messaging on the face or the back of a card, or to enhance one or more aspects of a traditional card game with one or more VDPPCs.

The use of VDPPCs in computer-enabled gaming can address a variety of technical problems, including how to attract the attention of a player and have that player choose to interact with a gaming system, how to provide an improved gaming experience such as by providing improved graphics for playing card parameters, and enhanced entertainment opportunities, and/or how to monitor cheating by players. VDPPCs can not only provide an enhanced card playing modality to increase player excitement and casino revenue but also strengthen security measures against cheating by players. By using a random number generator, computer monitoring, and VDPPC display state changes, known cheating techniques, such as colluding with the dealer, looking at the dealer's hand movements, replacing cards with better ones, card marking, card swapping between players (as each VDPPC is associated with a specific player), and edge sorting, can be detected and/or prevented.

Figure 1E:
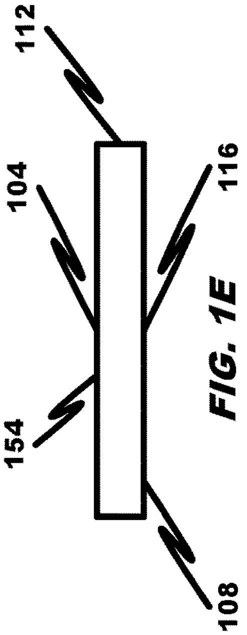
FIG. 1E illustrates a side view of a VDPPC in accordance with embodiments of the present disclosure.
Figure 1B:
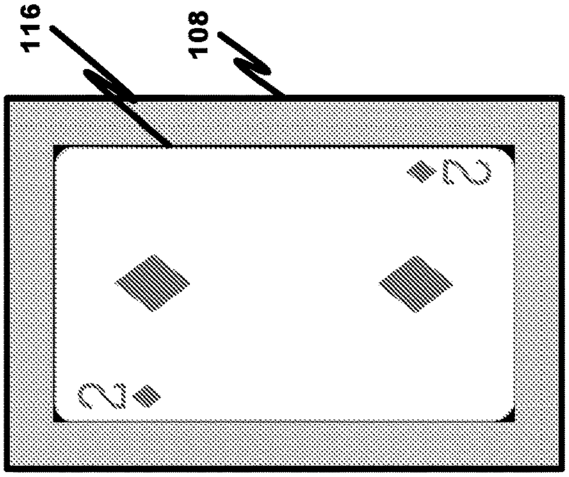
FIG. 1B illustrates a bottom view of a VDPPC in accordance with embodiments of the present disclosure.
Figure 1A:
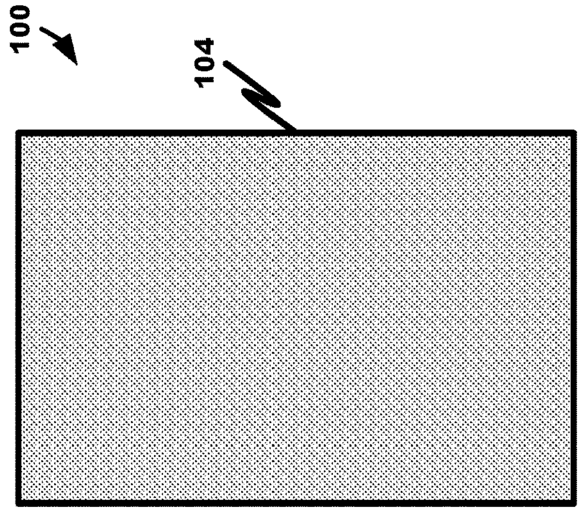
FIG. 1A illustrates a top view of a video programmable playing card ("VDPPC") in accordance with embodiments of the present disclosure.
Figure 1C:
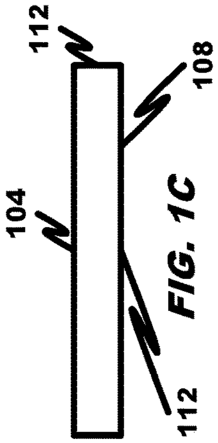
FIG. 1C illustrates a side view of a VDPPC in accordance with embodiments of the present disclosure.

Referring to FIGS. 1A-C, a VDPPC 100 is illustrated in accordance with an embodiment. The VDPPC 100 comprises opposing first and second planar surfaces 104 and 108 and a circumferential edge 112. While the first surface 104 comprises a standard decorative pattern visible to other players (as in the case of a standard physical playing card), the second surface 108 comprises a digital display 116 for displaying selected content. The selected content can be changed dynamically such that the digital display renders a first selected content at a first time and a different second selected content at a second time.

Referring to FIGS. 1D-E, a VDPPC 150 is illustrated in accordance with a different embodiment. While the VDPPC 100 comprises a digital display 116 only on the second surface 108, the VDPPC 150 comprises a first digital display 154 on the first planar surface 104 and a separate second digital display 116 on the second planar surface 108. When VDPPC 150 is viewed by a player associated with the VDPPC, the first planar surface 104 faces away from the associated player and is viewable by other players and the second planar surface 108 is viewable only by the associated player. While the second digital display 116 normally depicts one or more playing card parameters, the first digital display 116 depicts selected content that is unrelated to the one or more playing card parameters and is therefore the first and second digital displays 154 and 116 commonly depict different content. The selected content depicted by the first digital display 116 can include, for example, selected content associated with the associated player, and the selected content can be unrelated to the selected content depicted by the second digital display 116.

The selected content depicted by the first or second digital displays 154 and 116 can be a color or set of colors (e.g., blue, yellow, pink, red, purple, etc.), video (such as an advertisement or promotions of the casino, a video of the player or of a gaming event, an animation, a set of symbols, and the like), a digitally represented image (such as an assigned playing card parameter (e.g., type or rank of card parameter such as suit or rank assigned to the VDPPC)), an advertisement, content associated with the associated player (e.g., picture or identification of or other content selected by the player), logo or other customized content of the casino, gaming event information (such as a game status or outcome, wager, content associated with the card game, and the like), a symbol, and other content selected by the player, dealer, gaming system, or combination thereof.

In other embodiments, the VDPPC can be configured to include only the first digital display 154 and not the second digital display 116.

The displays can be any type of digital display, including a cathode ray tube, liquid crystal display, light-emitting diode (e.g., organic light-emitting diode or active-matrix organic light-emitting diode) display ("LED"), electronic paper or electronic ink ("E Ink") (which beneficially has a static or low frame rate image that only requires power or data to change state), electroluminescent display, plasma display, quantum dot display, and a fixed state red, green, blue ("RGB") LED display. It can be a segmented or unsegmented. In some embodiments, ultra-thin or paper-thin E-Ink or OLED display technologies are used as one or more of the digital displays. In some embodiments, fixed paper-thin LEDs/OLEDs (e.g., LCD technology that requires a constant rate of power to show content) are used as one or more of the digital displays.

Figure 2:
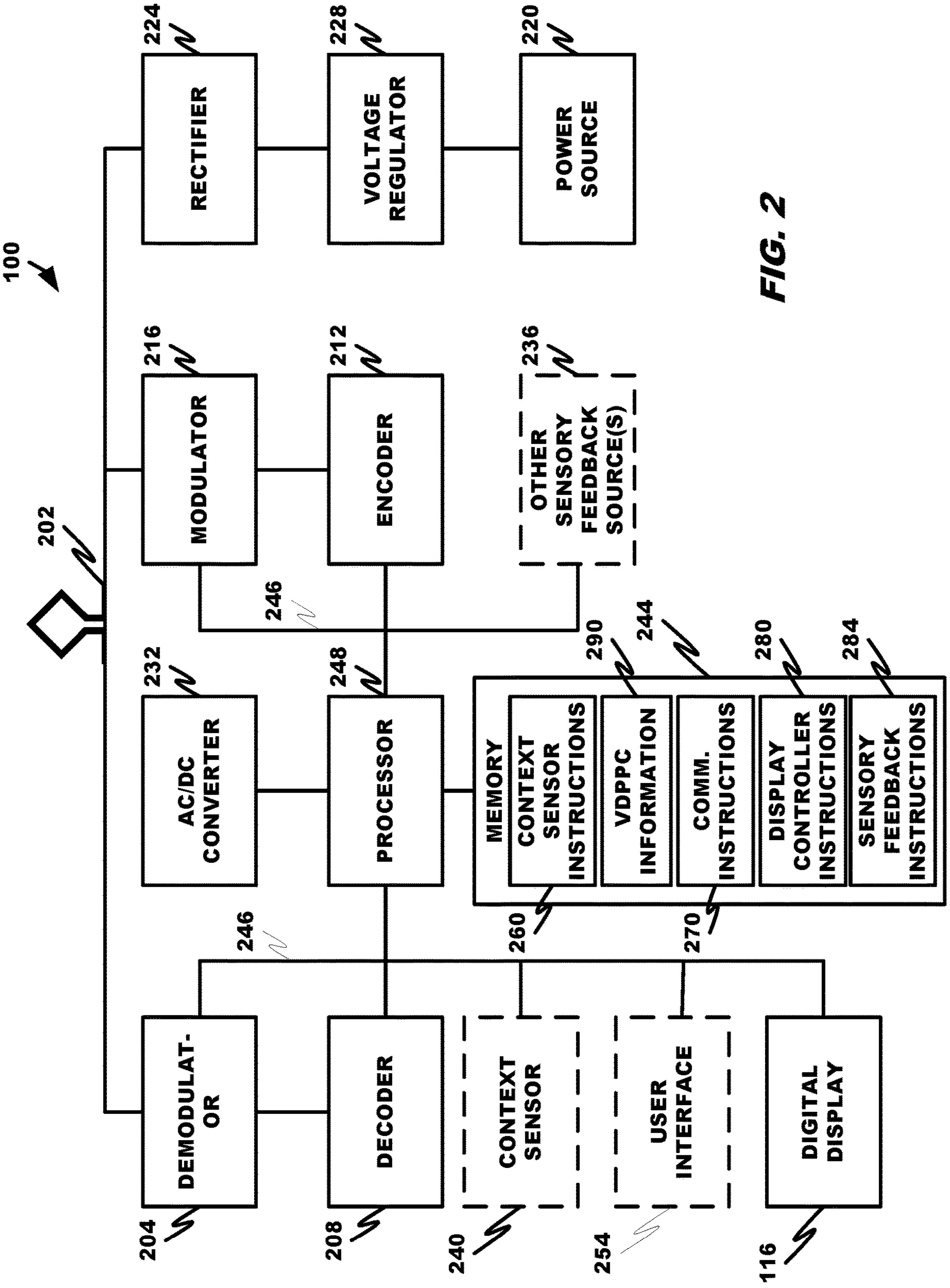
FIG. 2 illustrates components of a VDPPC in accordance with embodiments of the present disclosure.

Referring to FIG. 2, the functional components of a typical VDPPC 100 or 150 are illustrated in accordance with an embodiment. The VDPPC 100 or 150 comprises an antenna 202 (such as an RF antenna, WiFi antenna and driver circuit, Bluetooth antenna and driver circuit, or a cellular communication antenna and driver circuit) to send and receive encoded wireless signals, a demodulator 204 to demodulate received wireless signals and decoder 208 to decode the demodulated signal and perform the necessary transformations to determine the data in the signal, an encoder 212 to transform and encode data to be emitted by the antenna 202 and a modulator 216 to modulate encoded data for transmission, a power source 220, a rectifier 224 to convert received electromagnetic (charging) signals into electrical energy, such as Alternating Current ("AC") or Direct Current ("DC") power, a voltage regulator 228 that, due to the large variation in rectified voltage, automatically maintains a constant voltage level, an AC-DC converter 232 to convert an AC electrical energy input to a DC electrical energy output (or vice versa), the digital display 116, other (optional) sensory feedback source(s) 236, an (optional) user interface 254, an (optional) context sensor 240, and a memory 244, all coupled by a bus 246 to a (micro)processor 248.

In some embodiments, the various VDPPC components are configured as thinner than paper non-silica embedded electronics and processors to be used in combination with NFC technology. This VDPPC configuration can apply power to the various VDPPC components and charge them during a game, thereby overcoming the challenge of powering the digital display(s) and other electronic components in each VDPPC.

The power supply 220 may correspond to an internal power supply that provides AC and/or DC power to components of the VDPPC 100 or 150. In some embodiments, the power source 220 may correspond to one or multiple batteries or capacitors or other electromagnetic energy storage devices. Alternatively or additionally, the power source 220 may include a power adapter or wireless charger that converts AC power into DC power for direct application to components of the VDPPC 100 or 150, for charging a battery, for charging a capacitor, or a combination thereof.

The power supply 220 can be wirelessly rechargeable. As will be appreciated, the electromagnetic (charging) signals can be any frequency, such as radio frequency, and includes inductive charging, which is a type of wireless or cordless charging that uses an electromagnetic field to transfer energy between two objects using electromagnetic induction. In some embodiments, NFC near field power and communications and lower power processor and I/O interface can be employed to reduce VDPPC power requirements and increase power supply 220 life. Additionally or alternatively, power source life can be extended by deactivating the digital display when not being viewed, such as deactivating the second digital display when the VDPPC is face down on the table, deactivating the first digital display when the VDPPC is in covered by another VDPPC in a VDPPC stack and the like. Additionally or alternatively, power source life can be extended by deactivating the first or second digital display after a certain time interval has elapsed since the display was activated to render selected content. Additionally or alternatively, player or dealer gaze detection by the gaming system may be used to deactivate the first or second digital display when one or more players or the dealer in the card game are not gazing at the digital display. Additionally or alternatively, the power source metrics can be used to trigger generation of a warning by a digital display or to a gaming device of a player that a selected VDPPC has a low charge and requires charging. The trigger can be a detection that the stored energy level of a battery in the power source has fallen below a selected threshold. Additionally or alternatively, the battery metrics can be used to control selected content display or in the selection of content to be displayed by the VDPPC. For instance, advertisements or certain types of sensory feedback may not be provided when the charge level of the battery falls below a selected threshold.

In some embodiments, the brightness level of the first or second digital display can be auto-adjusted when the charge level of the battery falls below a selected threshold. By way of illustration, when the charge level falls below the selected threshold, the brightness of the first and/or second digital display can automatically be decreased from a higher level to a lower level and, conversely when the charge level is above the selected threshold, the brightness of the associated first or second digital display, respectively, can be automatically increased to a higher level or maintained at an existing higher level.

In some embodiments, the brightness level of the first or second digital display can be auto-adjusted based upon a level of light detected for the VDPPC surface comprising the associated one of the first or second digital display. By way of illustration, a light sensor located on or in proximity to the first VDPPC surface can sense a first level of light incident on the first surface at a first time and a second level of light incident on the first surface at a second time. Likewise, a light sensor located on or in proximity to the second VDPPC surface can sense a first level of light incident on the second surface at a first time and a second level of light incident on the second surface at a second time. When either the first or second level of light is less than a selected threshold, the brightness of the associated first or second digital display, respectively, can be automatically decreased from a higher level to a lower level and, conversely when either the first or second level of light is more than a selected threshold, the brightness of the associated first or second digital display, respectively, can be automatically increased to a higher level or maintained at an existing higher level.

Additional charging embodiments are also possible. While wireless charging may be more convenient for the dealer and players, wired VDPPC charging modes may also be used. In this embodiment, a wired charging port, or set of ports, may be placed at each seat in the table. The charging port could accommodate one or more VDPPCs, including dedicated VDPPCs, or the mobile devices of players that run an application which can hold VDPPCs.

The optional user interface 254 may include a combination of user input devices and user output devices. For instance, the user interface 254 may be implemented as one or more buttons located on a surface of the VDPPC 100 or 150, as a touch sensitive display 116, or as any other device that is capable of enabling tactile player interaction with the VDPPC 100 or 150.

The other sensory feedback source(s) 236 can include any other device for interacting with a player, including one or more light sources positioned on one or more of the first and second planar surfaces 104 and 108 or circumferential or peripheral edge 112, speaker to emit an audible sound having any selected sound spectrum and volume, and vibrating device to cause the VDPPC to vibrate or oscillate. The vibrating device 312 can be any oscillating device, such as an electromechanical vibration motor (e.g., eccentric rotating mass vibration motor (ERM) or linear resonant actuator (LRA)) or an electromagnetic device (such as transducer), and the like.

The context sensor can be any device that senses or collects contextual information relating to the VDPPC 200. The context sensor 240 senses contextual information relating to the VDPPC 200.

The memory 244 may include one or multiple computer memory devices that are volatile or non-volatile. The memory 244 may store VDPPC information 290.

The associated VDPPC information 290 can be any information relating to the VDPPC 100 or 150 or an operation thereof. Examples include a unique VDPPC identifier, session connection and security information, VDPPC state (including what selected content is currently being displayed by each digital display), object ID information, and/or VDPPC software and hardware requirements and configuration specifications. The VDPPC unique identifier can be any unique or substantially unique identifier or image associated with the VDPPC 100 or 150, such as a digital signature data structure (such as an RFID, a QR code, a barcode, or the like) or an image based on a software and/or hardware configuration of the VDPPC 100 or 150 or a variable computed by selected software executed by the VDPPC (such as hash valuer calculated by a secure hash algorithm). The VDPPC information 290 can further include information regarding the player currently assigned to the VDPPC 100 or 150 (e.g., player identification (such as a customer or customer account identifier maintained by the casino)), the gaming device or table to which the VDPPC is currently assigned (e.g., a gaming table object such as a dealer identity, table identity, seating position identity, and the like), and a current spatial location of the VDPPC 100 or 150.

Examples of connection and security information include a communication address (such as a universally or locally administered address) associated with the VDPPC itself, a mobile device of the player, or another gaming system component (such as an electronic gaming table or gaming server), and secure session information (e.g., one or more symmetric or asymmetric multi- or single-use, private or public cryptographic keys, such as a session key, content encryption key, traffic encryption key, multicast key, key encryption key, key wrapping key, etc.) relating to a communication session with another gaming system component (such as an electronic gaming table or gaming server or player mobile device).

The memory can include any other data depending on the application, such as game credits and customer account information.

The memory 244 can further include a variety of instruction sets. An example of an instruction set that may be stored in the memory 244 includes context sensor instructions 260 that, when executed by the processor 248, sense or collect, or enable the context sensor 240 to sense or collect, contextual information relating to the VDPPC 100 or 150; sensory feedback instructions 284 that, when executed by the processor 248, applies one or more rulesets to the sensed or collected contextual information to select one or more sensory feedback responses for the digital display 116 and/or other sensory feedback source(s) 236; display controller instructions 280 that, when executed by the processor 248, control display of the selected content by the digital display 116; and communication instructions 270 that, when executed by the processor 248, may enable the VDPPC 100 or 150 to communicate with another gaming system component or a player's mobile device or multiple mobile devices.

In an example of context, the context sensor 240 and/or context sensor instructions 260 collect, as contextual information, a current spatial position or location of the VDPPC 100 or 150. The position can be relative to a coordinate system or selected object or location. By way of illustration, the context sensor 240 can be a satellite positioning system (such as a Global Positioning system), a magnetic positioning device, an inertial measurement device, a Wi-Fi based positioning system (which measures the intensity of received wireless signals (or received signal strength)) and fingerprinting location system (such as the use of SSID and MAC address of a nearby access point), Bluetooth location device, RFID tag, or other location device. Alternatively or additionally, VDPPC location can be determined using triangulation techniques.

In a further example of context, the context sensor 240 and/or context sensor instructions 260 collect, as contextual information, displacement information associated with the VDPPC or a surface thereof. The displacement information, for instance, can be a fact or instance of spatial displacement of the VDPPC, a rate of displacement of the VDPPC, a distance of displacement of the VDPPC, and a direction of displacement of the VDPPC. The context sensor 240 can be, for instance, a motion sensor, such as a gyro sensor, accelerometer, magnetometer, or other motion detecting devices.

The context sensor 240 and/or context sensor instructions 260 can collect, as contextual information, information regarding an ambient condition in spatial proximity to the VDPPC. By way of illustration, the context sensor can collect information relating to ambient sound and light in spatial proximity to the VDPPC. The context sensor 240 can be, for instance, an audio or video recorder, a microphone to detect sound, passive infrared detector, active ultrasonic wave-emitting detector, active ultrasonic detector, passive ultrasonic detector, microwave detector, or proximity detector to detect nearby persons, or a photoresistor, photovoltaic light sensor, light dependent sensor, or photo diode to detect light or light intensity, and the like.

In a further example of context, the context sensor 240 and/or context sensor instructions 260 collect, as contextual information, information regarding a current power level or state-of-charge or depth-of-charge of the power source 220. The context sensor 240 can use, for instance, a fuel gauge circuit and algorithm (such as a Coulomb counter), chemical method, voltage method, current integration method, combined approach, Kalman filtering, pressure method, or other device or method for determining or estimating the state-of-charge or depth-of-charge of the power source 220.

The VDPPC sensory feedback instructions 284 receive the sensed context information from a context sensor or processor executing the context sensor instructions 260 and, based on the sensed context information, causes a selected sensory user feedback response, such as color, video, sound, and/or movement, to be demonstrated by the VDPPC 100 or 150. For example, the digital display 116 of the VDPPC 100 or 150 can change colors or color intensity or pulsate in color based on sensed context information. The VDPPC display 116 can display a symbol or video based on sensed context information. The VDPPC 100 or 150 can move or vibrate based on sensed context information. The VDPPC 100 or 150 can play sound sequences or sets of sounds based on sensed context information. The VDPPC 100 or 150 can simultaneously exhibit or generate combinations of these sensory user feedback responses or behaviors.

In other embodiments, the application of the one or more rulesets to the sensed or collected contextual information to select one or more sensory feedback responses for the digital display 116 and/or other sensory feedback source(s) 236 is done by another gaming system component, such as a gaming device, mobile device, or gaming server, which then provides a sensory feedback response command to the processor 248, via the antenna 202 and demodulator 204 and decoder 208 of the VDPPC 100 or 150. The sensory feedback instructions 280 enable the processor 248 to process the sensory feedback response command and cause the selected sensory feedback response(s) to be implemented by the digital display 116 and/or other sensory feedback source(s) 236.

The display controller instructions 280 may include drivers for the digital display 116. As will be appreciated, a driver provides a software interface to hardware devices, enabling operating systems and other computer programs to access hardware functions without needing to know precise details about the hardware being used. A driver communicates with the device through a computer bus or communications subsystem to which the hardware connects. When a calling program invokes a routine in the driver, the driver issues commands to the device. Once the device sends data back to the driver, the driver may invoke routines in the original calling program. Drivers usually provide the interrupt handling required for any necessary asynchronous time-dependent hardware interface.

The VDPPC communication instruction set 270 may include instructions that enable the VDPPC 100 or 150 to pair with a mobile device of a player or another gaming system component (as the case may be) and establish a communication channel with the mobile device or gaming system component via the pairing. As an example, the VDPPC communication instruction set 270 may include instructions that enable NFC, Bluetooth®, WiFi, or other types of communication protocols. It should be appreciated that the VDPPC instruction set 270 may also be updated to reflect when the VDPPC 100 or 150 is paired with the gaming device 312 or a mobile device (as the case may be) and such pairing information may include addressing information for the VDPPC 100 or 150 and/or identification information associated with the player of the VDPPC 100 or 150. Alternatively or additionally, the VDPPC communication instruction set 270 may enable the VDPPC 100 or 150 to identify a player assigned to the VDPPC 100 or 150, identify a loyalty account associated with the player assigned to the VDPPC 100 or 150, exchange information (e.g., send or receive) with a loyalty application operating on the VDPPC 100 or 150, or combinations thereof. In some embodiments, the VDPPC communication instruction set 270 may be configured to operate or drive a network interface to facilitate direct or indirect communications with the VDPPC 100 or 150 or another gaming system component or mobile device (as the case may be). Alternatively or additionally, the VDPPC communication instruction set 270 may be configured to periodically send VDPPC information-containing status signals to the gaming server to synchronize the VDPPC operations, such as selected content currently being displayed by each digital display, with the VDPPC operations maintained in memory by the gaming server.

The VDPPC 100 or 150 commonly interacts with a gaming system comprising multiple gaming system components. In various embodiments, the gaming system of the present disclosure includes: (a) one or more gaming devices in combination with one or more central servers, central controllers, or remote hosts; (b) one or more personal gaming devices in combination with one or more central servers, central controllers, or remote hosts; (c) one or more personal gaming devices in combination with one or more gaming devices; (d) one or more personal gaming devices, one or more gaming devices, and one or more central servers, central controllers, or remote hosts in combination with one another; (e) a single gaming device; (f) a plurality of gaming devices in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "EGT" as used herein represents one EGT or a plurality of EGTs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts. A "gaming device" as used herein may be understood to include an EGM, multiple EGMs, an EGT, multiple EGTs, a personal gaming device, multiple personal gaming devices, a mobile device, multiple mobile devices, or combinations thereof.

As noted above, in various embodiments, the gaming system includes a gaming device in combination with a central server, central controller, or remote host. In such embodiments, the EGM or EGT (or gaming device) is configured to communicate with the central server, central controller, or remote host through a data network or remote communication link. In certain such embodiments, the EGM or EGT (or gaming device) is configured to communicate with another EGM or EGT (or gaming device) through the same data network or remote communication link or through a different data network or remote communication link. For example, the gaming system includes a plurality of gaming devices that are each configured to communicate with a central server, central controller, or remote host through a data network.

In certain embodiments in which the gaming system includes a gaming device in combination with a central server, central controller, or remote host, the central server, central controller, or remote host is any suitable computing device (such as a server) that includes at least one processor and at least one memory device or data storage device. As further described herein, the EGM or EGT (or gaming device) includes at least one EGM or EGT (or gaming device) processor configured to transmit and receive data or signals representing events, messages, commands, or any other suitable information between the EGM or EGT (or gaming device) and the central server, central controller, or remote host. The at least one processor of that EGM or EGT (or gaming device) is configured to execute the events, messages, or commands represented by such data or signals in conjunction with the operation of the EGM or EGT (or gaming device). Moreover, the at least one processor of the central server, central controller, or remote host is configured to transmit and receive data or signals representing events, messages, commands, or any other suitable information between the central server, central controller, or remote host and the EGM or EGT (or gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM or EGT (or gaming device). Further, one, more than one, or each of the functions of the at least one processor of the EGM or EGT (or gaming device) may be performed by the at least one processor of the central server, central controller, or remote host.

In certain such embodiments, computerized instructions for controlling any games displayed by the EGM or EGT (or gaming device) are executed by the central server, central controller, or remote host. In such "thin client" embodiments, the central server, central controller, or remote host remotely controls any games (or other suitable interfaces) displayed by the EGM or EGT (or gaming device), and the EGM or EGT (or gaming device) is utilized to display such games (or suitable interfaces) and to receive one or more inputs or commands. In other such embodiments, computerized instructions for controlling any games displayed by the EGM or EGT (or gaming device) are communicated from the central server, central controller, or remote host to the EGM or EGT (or gaming device) and are stored in at least one memory device of the EGM or EGT (or gaming device). In such "thick client" embodiments, the at least one processor of the EGM or EGT (or gaming device) executes the computerized instructions to control any games (or other suitable interfaces) displayed by the EGM or EGT (or gaming device).

In various embodiments in which the gaming system includes a plurality of EGMs or EGTs (or gaming devices), one or more of the EGMs or EGTs (or gaming devices) are thin client EGMs or EGTs (or gaming devices) and one or more of the EGMs or EGTs (or gaming devices) are thick client EGMs or EGTs (or gaming devices). In other embodiments in which the gaming system includes one or more EGMs or EGTs (or gaming devices), certain functions of one or more of the EGMs or EGTs (or gaming devices) are implemented in a thin client environment, and certain other functions of one or more of the EGMs or EGTs (or gaming devices) are implemented in a thick client environment. In one such embodiment in which the gaming system includes an EGM or EGT (or gaming device) and a central server, central controller, or remote host, computerized instructions for controlling any games and VDPPCs 104 displayed by the EGM or EGT (or gaming device) are communicated from the central server, central controller, or remote host to the EGM or EGT (or gaming device) in a thick client configuration, and computerized instructions for controlling any games, VDPPC 100 or 150 display, or other functions displayed by the EGM or EGT (or gaming device) are executed by the central server, central controller, or remote host in a thin client configuration.

In certain embodiments in which the gaming system includes: (a) an EGM or EGT (or gaming device) configured to communicate with a central server, central controller, or remote host through a data network; and/or (b) a plurality of EGMs or EGTs (or gaming devices) configured to communicate with one another through a communication network, the communication network may include a local area network (LAN) in which the EGMs or EGTs (or gaming devices) are located substantially proximate to one another and/or the central server, central controller, or remote host. In one example, the EGMs or EGTs (or gaming devices) and the central server, central controller, or remote host are located in a gaming establishment or a portion of a gaming establishment.

In other embodiments in which the gaming system includes: (a) an EGM or EGT (or gaming device) configured to communicate with a central server, central controller, or remote host through a data network; and/or (b) a plurality of EGMs or EGTs (or gaming devices) configured to communicate with one another through a communication network, the communication network may include a wide area network (WAN) in which one or more of the EGMs or EGTs (or gaming devices) are not necessarily located substantially proximate to another one of the EGMs or EGTs (or gaming devices) and/or the central server, central controller, or remote host. For example, one or more of the EGMs or EGTs (or gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs or EGTs (or gaming devices) are located. In certain embodiments in which the communication network includes a WAN, the gaming system includes a central server, central controller, or remote host and an EGM or EGT (or gaming device) each located in a different gaming establishment in a same geographic area, such as a same city or a same state. Gaming systems in which the communication network includes a WAN are substantially identical to gaming systems in which the communication network includes a LAN, though the quantity of EGMs or EGTs (or gaming devices) in such gaming systems may vary relative to one another.

In further embodiments in which the gaming system includes: (a) an EGM or EGT (or gaming device) configured to communicate with a central server, central controller, or remote host through a data network; and/or (b) a plurality of EGMs or EGTs (or gaming devices) configured to communicate with one another through a communication network, the communication network may include an internet (such as the Internet) or an intranet. In certain such embodiments, an Internet browser of the EGM or EGT (or gaming device) is usable to access an Internet game page from any location where an Internet connection is available. In one such embodiment, after the EGM or EGT (or gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card, VDPPC 100 or 150 uniquely identifying the player, or other smart card inserted into a card reader; by validating a unique player identification number associated with the player by the central server, central controller, or remote host; or by identifying the EGM (or gaming device), such as by identifying the MAC address or the IP address of the Internet facilitator. In various embodiments, once the central server, central controller, or remote host identifies the player, the central server, central controller, or remote host enables placement of one or more wagers via VDPPCs 104 on one or more plays of a game, and displays those VDPPCs and plays via the Internet browser of the EGM or EGT (or gaming device).

The central server, central controller, or remote host and the EGM or EGT (or gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs or EGTs (or gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Embodiments of the present disclosure will be described in connection with a player interacting with one or more gaming devices. It should be appreciated that a gaming device, as described herein, may include a gaming device, mobile device, server, and other computational device. While embodiments of the present disclosure will be described in connection with the example of an Electronic Gaming Table ("EGT"), Electronic Gaming Machine (EGM), Virtual Reality ("VR") gaming machine, Augmented Reality ("AR") gaming machine, or Video Gaming Machine (VGM) using improved VDPPCs, it should be appreciated that embodiments of the present disclosure are not so limited. For instance, other types of computational devices, such as portable user devices, smartphones, tablets, laptops, Personal Computers (PCs), wearable devices, etc. may be configured with gaming device functionality (e.g., to implement a game of chance, a game or skill, or a hybrid game of chance/game of skill), similar to a gaming device as described herein.

Figure 3:
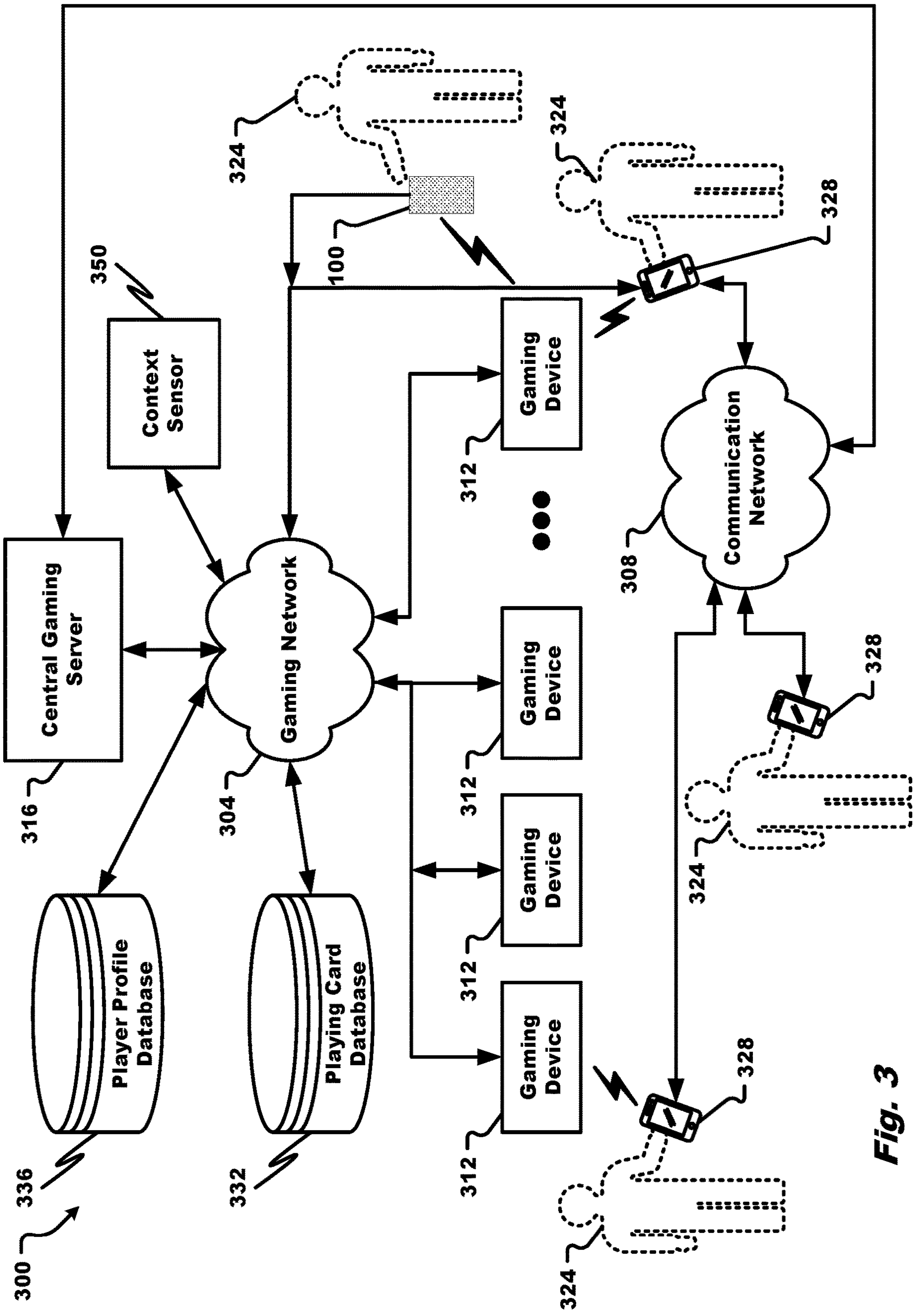
FIG. 3 illustrates a gaming system for interacting with VDPPCs in accordance with embodiments of the present disclosure.

With reference initially to FIG. 3, details of an illustrative gaming system 300 will be described in accordance with at least some embodiments of the present disclosure. The components of the gaming system 300, while depicted as having particular instruction sets and devices, is not necessarily limited to the examples depicted herein. Rather, a system according to embodiments of the present disclosure may include one, some, or all of the components depicted in the system 300 and does not necessarily have to include all of the components in a single device. The illustration of a single central gaming server 316 is for ease of discussion and should not be construed as limiting embodiments of the present disclosure to a single-server architecture.

The gaming system 300 is shown to include a gaming network 304 and a communication network 308. The gaming network 304 may correspond to a distributed set of devices that interconnect and facilitate machine-to-machine communications between one or multiple gaming devices 312 and the gaming server 316. The communication network 308 may correspond to a distributed set of devices that interconnect and facilitate machine-to-machine communications between the gaming server 316 and mobile devices 328 carried by players 324. In some embodiments, the gaming network 304 and communication network 308 may correspond to different networks administered and/or maintained by different entities. In such a scenario, one or more of a gateway, firewall, or similar network border device may reside between the gaming network 304 and the communication network 308 (e.g., to maintain security preferences/settings of each network). In another possible scenario, the gaming network 304 and communication network 308 may correspond to the same or similar network. As a non-limiting example of the second scenario, the gaming network 304 and communication network 308 may both correspond to a distributed Internet Protocol (IP)-based communication network, such as the Internet.

A gaming network 304 and communication network 308 may include any type of known communication medium or collection of communication media and may use any type of protocols to transport messages between devices. As some non-limiting examples, the gaming network 304 may correspond to a WAN or LAN in which the plurality of gaming devices 312 are configured to communicate with the gaming server 316 using devices that are owned and administered by the same entity that administers security settings of the gaming devices 312. As such, the gaming network 304 may be considered a secure or trusted network.

The communication network 308, in some embodiments, may also include a WAN or LAN. Alternatively or additionally, the communication network 308 may include one or more devices that are not administered by the same entity administering the gaming devices 312. Thus, the communication network 308 may be considered an untrusted or unsecure network from the perspective of the gaming network 304. The Internet is an example of the communication network 308 that constitutes an IP network consisting of many computers, computing networks, and other communication devices located all over the world, which are connected through many telephone systems and other means. Other examples of the communication network 308 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 408 may be administered by a Mobile Network Operator (MNO) whereas a casino entity may administer the gaming network 304.

It should be appreciated that the gaming network 304 and/or communication network 308 need not be limited to any one network type, and instead may be comprised of a number of different networks and/or network types. Moreover, the gaming network 304 and/or communication network 308 may comprise a number of different communication media such as coaxial cable, copper cable/wire, fiber-optic cable, antennas for transmitting/receiving wireless messages, wireless access points, routers, and combinations thereof.

In some embodiments, the gaming devices 312 may be distributed throughout a single property or premises (e.g., a single casino floor) or the gaming devices 312 may be distributed among a plurality of different properties. In a situation where the gaming devices 312 are distributed in a single property or premises, the gaming network 304 may include at least some wired connections between network nodes (e.g., a LAN or multiple LANs). As a non-limiting example, the nodes of the gaming network 304 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 312 may utilize the same or different types of communication protocols to connect with the gaming network 304. It should also be appreciated that the gaming devices 312 may or may not present the same type of game to a player 324. For instance, the first gaming device 312 may correspond to a gaming device, such as an EGM, that presents a slot game to the player 324 whereas a second gaming device 312 may correspond to a gaming device, such as an EGT, that presents a playing card game a player 324. It should be appreciated that a gaming device 312 may correspond to one example of a gaming device. It should also be appreciated that the functions and features described in connection with a gaming device 312 may be provided in any other type of gaming device without departing from the scope of the present disclosure.

In some embodiments, the gaming devices 312 may be configured to communicate with a centralized management server in the form of the central gaming server 316. The central gaming server 316 may be configured to centrally manage games of chance, games of skill, or hybrid games of chance/skill played at the gaming devices 312 (e.g., slot games), enable execution of a different game (e.g., a card game), monitor player 324 activity at the gaming devices 312, track player 324 association with a gaming device 312, facilitate communications with players 324 via the gaming devices 312, facilitate communications with players 324 via the mobile devices 328 (or other gaming devices), and/or perform any other task in connection with games played by a player 324 at gaming devices.

The context sensor 350 can collect additional context information for use in controlling the sensory feedback response behavior of the VDPPC(s) 100 or 150. While the context sensor 240 and context sensor instructions 260 can collect context information regarding the VDPPC itself or its immediate environment, the context sensor 350 can collect context information over a much broader area, such as over a gaming table or over the spatial area of the entire gaming system. For example, the context sensor 350 can assist the context sensor 240 and/or context sensor instructions 260 in sensing a current spatial position or location of the VDPPC 100 or 150. The position can be relative to a coordinate system or selected object or location. By way of illustration, the context sensor 350 can be part of a Wi-Fi based positioning system (which measures the intensity of received wireless signals (or received signal strength)).

The context sensor 350 can collect or assist the context sensor 240 in collecting, as contextual information, information regarding an ambient condition in spatial proximity to the VDPPC or the gaming device associated with the VDPPC. By way of illustration, the context sensor 350 can collect information relating to ambient sound and light in spatial proximity to the VDPPC. The context sensor 350 can be, for instance, an audio and/or video recorder to record or stream audio and/or video of a game event or player, a microphone to detect sound, passive infrared detector, active ultrasonic wave-emitting detector, active ultrasonic detector, passive ultrasonic detector, microwave detector, or proximity detector to detect nearby persons, a photoresistor, photovoltaic light sensor, light dependent sensor, or photo diode to detect light or light intensity, and the like.

In some embodiments, a player 324 may be enabled to enhance their experience with the gaming devices 312 via interactions with their personal mobile device 328. In some embodiments, a mobile device 328 may be configured to execute one or more games of chance, one or more games of skill, and/or one or more hybrid games of chance/skill that are also executable by a gamine device 312. Thus, in some embodiments, a mobile device 328 may be considered another example of a gaming device. In some embodiments, the mobile device 328 may be referred to as a personal gaming device that is configured to be owned and carried by a player 324. For instance, a player 324 may be allowed to play a game at their mobile device 328 without ever having to physically engage a gaming device 312. The mobile device 328 may correspond to a mobile communication device, such as a smartphone, tablet, laptop, PDA, wearable device, an augmented reality headset, a virtual reality headset, or the like. In other embodiments, the mobile device 328 may correspond to a PC, kiosk, or the like that facilitates improved lottery game play for the player 324. Any of the above-mentioned examples of a mobile device 328 may correspond to an example of a gaming device as described herein.

In some embodiments, a mobile device 328 may be configured to communicate directly with a gaming device 312. In some embodiments, some or all of the game play may be achieved with the mobile device 328 rather than relying on the use of a gaming device 312. Where a mobile device 328 interacts with a gaming device 312, direct machine-to-machine communications may utilize a proximity-based communication protocol such as NFC, Bluetooth®, BLE, WiFi, or the like. Alternatively or additionally, the mobile devices 328 may be configured to communicate with other mobile devices 328 and/or the central gaming server 316 via the communication network 308. Such communications may be secured (e.g., encrypted) or unsecured depending upon the nature of information exchanged during the communications. A mobile device 328 may correspond to a player's 324 personal device that uses an unsecured or untrusted communication network 308 or to a device issued to the player 324 during the player's visit at a particular casino, in which case the mobile device 328 may be administered with certain casino-approved security policies.

It should be appreciated that the central gaming server 316 may or may not be co-located with the gaming devices 312. Further still, players 324 may be allowed to carry multiple mobile devices 328, which may or may not be required to communicate or pair with a gaming device 312.

FIG. 3 also depicts the possibility of some mobile devices 328 or VDPPCs 100 or 150 being paired with a gaming device 312, thereby enabling communications to flow between the mobile device 328 or VDPPC 100 or 150 and gaming device 312. This communication may utilize a proximity-based communication protocol, such as Bluetooth, BLE, NFC, WiFi, etc. FIG. 3 further shows that one or more mobile devices 328 or VDPPCs 100 or 150 may not necessarily be paired with a gaming device 312, but such mobile devices 328 or VDPPCs 100 or 150 may still be configured to communicate with the central gaming server 316 via the communication network 308. Communications between the gaming device 312 and mobile device 328 may facilitate any number of combinations of gameplay opportunities.

The central gaming server 316 is in communication, via the gaming network 304, with player profile and playing card databases 336 and 332, respectively. The databases 336 and 332 may be configured to store one or multiple data structures that are used in connection gaming interactive activities of players and VDPPCs. The databases can use any database model and compatible database management system. Examples of database models include relational databases, object-oriented databases, and non-relational databases, such as NoSQL and NewSQL databases.

Figure 4A:
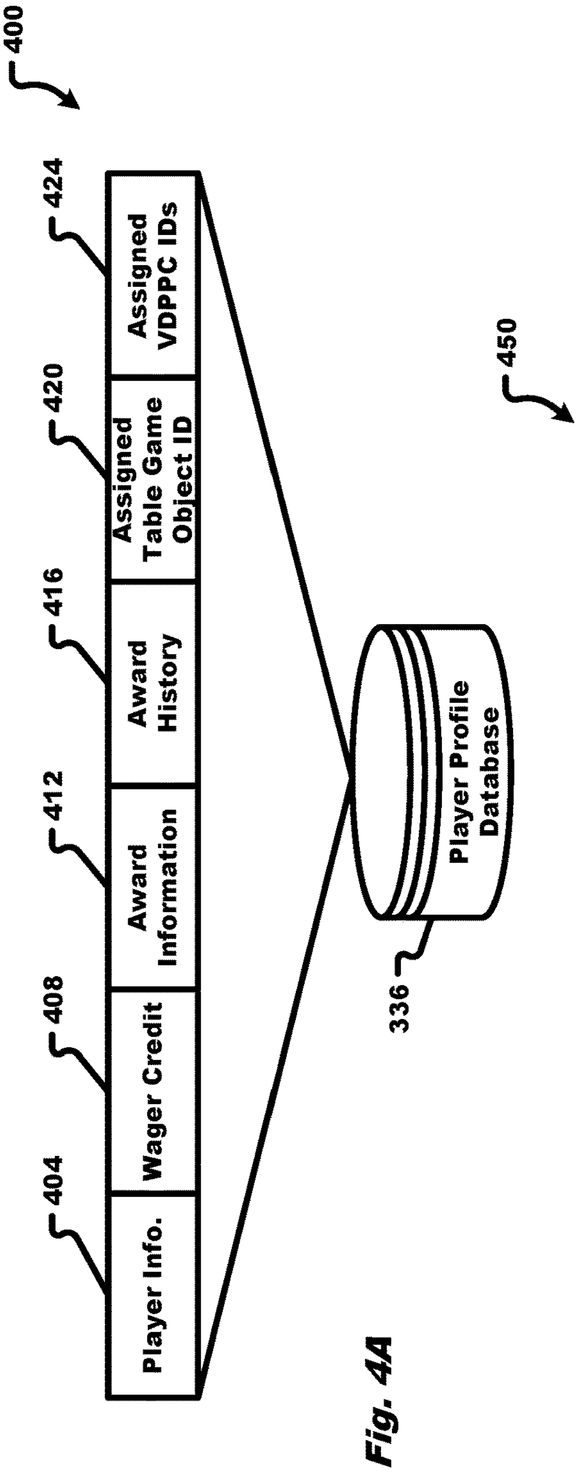
FIG. 4A illustrates data structures in a player profile database configured for use with VDPPCs in accordance with embodiments of the present disclosure.

Referring now to FIGS. 4A and B, the data structures in the player profile and playing card databases 336 and 332 will be discussed.

With reference to FIG. 4A, the data stored in the data structures 400 may be stored for a plurality of different player profiles or for a single player profile. The data structure 400 may include a plurality of data fields that include, for instance, a player information field 404, wager credit field 408, award information field 412, award history field 416, assigned table game object identifier field 420, and assigned VDPPC identifiers field 424.

The player information field 404 may be used to store any type of information that identifies a player. In some embodiments, the player information field 404 may store one or more of username information for a player 324, contact information for the player (such as email address, phone number, social website webpage universal resource locator, and the like), password information for a player account, player status information, accommodations associated with the player 324, and any other type of customer service management data that may be stored with respect to a player 324.

The wager credit field 408 may be used to store data about a player's 324 available credit with a casino or a plurality of casinos. For instance, the wager credit field 408 may store an electronic record of available credit in the player's account and whether any restrictions are associated with such credit. The wager credit field 408 may further store information describing a player's available credit over time, wagers made over time, cash out events for the player, winning events for the player, and the like.

The award information field 412 may be used to store information describing awards that have been paid to the player 324 or that are available to be paid in response to particular events occurring within the gaming system. As a non-limiting example, the award information field 412 may be used to store electronic records for values of awards that are available to or have been paid to the player 324.

The award history field 416 may store data related to awards, bonuses, mini bonuses, jackpots, side bets, etc. granted to the player 324. The award history field 416 may also indicate when such awards were granted to the player 324, whether the awards have been redeemed, whether the awards are being funded by a game of chance or skill, a mini bonus associated with an event, or a side bet award.

The assigned table game object ID field 420 may store data related to a table game with which the player 324 is currently or historically associated. The assigned table game object ID field 420, for instance, may indicate a table game identifier of the gaming table at which the player 324 is currently playing, a dealer identifier of the dealer associated with the gaming table, and/or a seating position identifier of the player's 324 seating position at the gaming table.

The assigned VDPPC IDs field 424 may store data related to the VDPPCs currently and historically associated with the player 324. The VDPPC ID field 424, for instance, may indicate the VDPPC identifiers currently assigned to the player 324. This can be done by referencing or linking to the VDPPC ID field 440 corresponding to the VDPPC 100 or 150 assigned to the player 324.

Figure 4B:
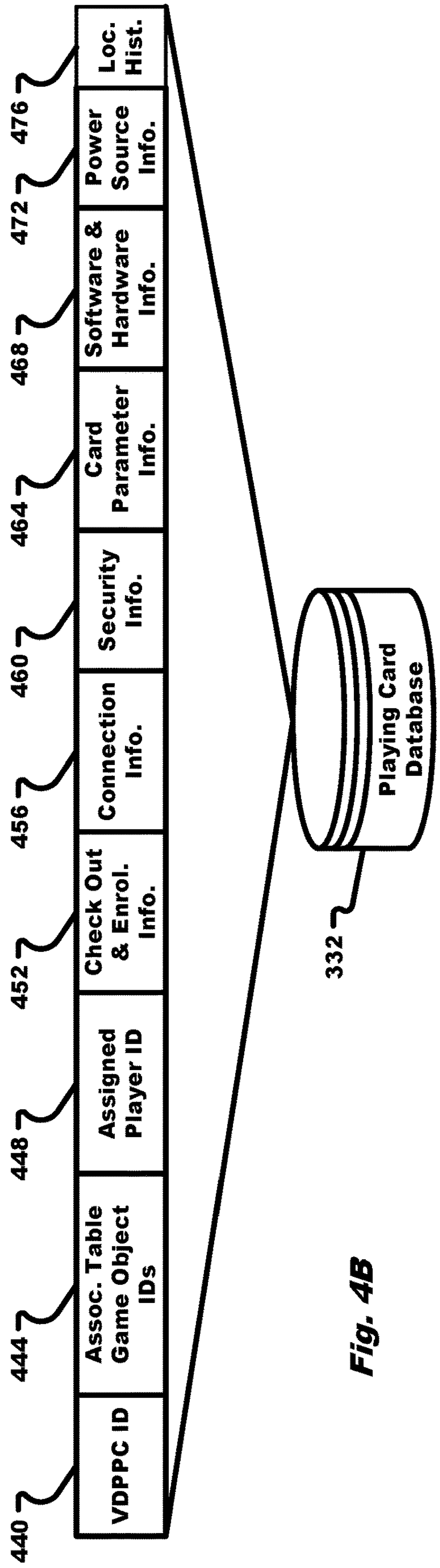
FIG. 4B illustrates data structures in a playing card database configured for use with VDPPCs in accordance with embodiments of the present disclosure.

With reference to FIG. 4B, the data stored in the data structures 450 may be stored for a plurality of different VDPPCs or for a single VDPPC. The data structure 450 may include a plurality of data fields that include, for instance, a VDPPC ID field 440, associated table game object IDs field 444, assigned player ID field 448, enrollment information field 452, connection information field 456, security information field 460, card parameter information field 464, software and hardware information field 468, power source information field 472, and location history field 476.

The VDPPC ID field 440 may be used to store any type of information that identifies a VDPPC. In some embodiments, the VDPPC ID field 440 may store a VDPPC identifier, such as the VDPPC identifier(s) described above. Alternatively or additionally, the VDPPC identifier can be a communication or network address, such as an IP or MAC address.

The associated table game object ID field 444 may be used to store one or more identifiers regarding one or more table game objects to which the VDPPC is currently or has been previously assigned.

The assigned player ID field 448 may be used to store one or more player information identifiers regarding one or more players 324 to which the VDPPC is currently or has been previously assigned. This can be done by referencing or linking to the player information field 404 corresponding to the assigned one or more players 324.

The check out and enrollment information field 452 may be used to store check out and enrollment information regarding the VDPPC. The check out and enrollment information may include, for instance, a gaming table object identifier with which the VDPPC is currently or was checked out and/or enrolled along with a beginning and ending timestamp for the check out and/or enrollment and an identifier of the dealer or player that checked out and/or enrolled the VDPPC.

The connection information field 456 may be used to store connection information regarding current or prior communication sessions between the VDPPC and a gaming system component, such as the central gaming server 316 or a gaming device 312 or a mobile device 328.

The security information field 460 may be used to store security information regarding current or prior communication sessions between the VDPPC and a gaming system component, such as the central gaming server 316 or a gaming device 312 or a mobile device 328.

The card parameter information field 464 may be used to store playing card parameters currently or previously generated and provided to the VDPPC along with an associated timestamp indicating for what period the corresponding set of playing card parameters was active.

The software and hardware information field 468 may be used to store information regarding the software and hardware requirements and specifications of the VDPPC 100 or 150 and/or a current software and hardware configuration of the VDPPC 100 or 150.

The power source information field 472 may be used to store a current power level or state-of-charge or depth-of-charge of the power source 220 of the VDPPC.

Finally, the location history field 476 may be used to store a current or prior spatial location of the VDPPC along with an associated timestamp. The location history field 476 can include a listing of communication links or VDPPC IDs of VDPPCs in communication range of the selected VDPPC.

Figure 5:
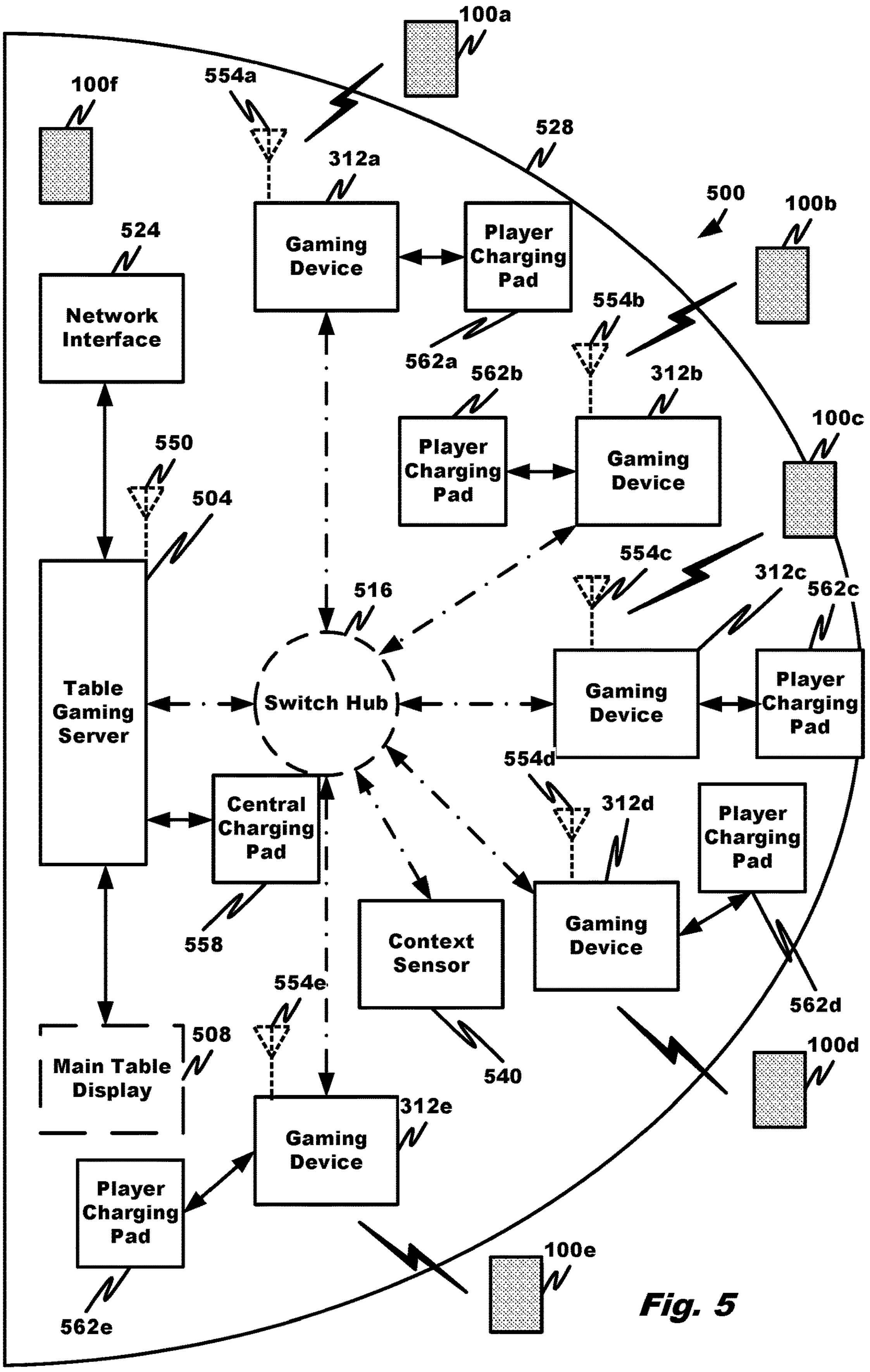
FIG. 5 depicts a table gaming system configured for use with VDPPCs in accordance with embodiments of the present disclosure.

Referring to FIG. 5, a multi-player EGT system 500 according to another embodiment is depicted. The EGT system 500 includes an EGT 528 having a table gaming server 504 or master table controller (MTC), an optional main multi-touch table display system 508, and a plurality of player station gaming devices 312*a-e* and context sensor 540, which, for example, may be connected to the table gaming server 504 via at least one switch or hub 516. In at least one embodiment, the table gaming server 504 may include at least one processor and memory (not shown). Additionally, the EGT system 500 may also include one or more network interfaces 524 (discussed below) for communicating with other devices and/or systems in a casino network, such as the central gaming server 316. The EGT system 500 can be used with card games alone (using only VDPPCs or VDPPCs coupled with physical cards or virtual or digital cards displayed by a gaming system component) or combined with other games of chance or skill, including dice games, such as craps and sic bo, and roulette and wheel games. While the EGT system 500 is shown to have only five gaming devices, it is understood that the EGT system may have more or fewer gaming devices depending on the application.

The EGT system 500 may further comprise a table gaming server antenna 550 and gaming device antennas 554*a-e* to communicate wirelessly with the VDPPCs 100 or 150 assigned to each player station gaming device in accordance with a suitable wireless protocol such as those described above. One or more VDPPCs 100 or 150 have been enrolled by the EGT system 500 but not yet checked out to a player.

The EGT system 500 may further comprise a central charging pad 558 and each player station may alternatively or additionally comprise a player charging pad 562*a-e* to charge VDPPCs 100 or 150. While the charging pads may be by a wired charger, such as a powered USB port, the charging pads typically are configured to charge the VDPPCs 100 or 150 wirelessly as described above. For example, the charging pads can emit an NFC field that not only exchanges data but also can power the VDPPCs 100 or 150.

By way of illustration, the EGT can be a blackjack table with the central charging pad 558 being positioned near the dealer to charge the enrolled VDPPCs 100 or 150 that have not yet been checked out and stored by the dealer.

The various charging pads can exchange VDPPC or game information with the table gaming server 504. For example, VDPPC identifiers ("VDPPC IDs") could be relayed from the VDPPCs, via the charging pads, to the table gaming server 504 to keep track of the winning and losing hand analytics, along with data being transferred to the VDPPC processor and memory to change an image state on the digital displays of the VDPPCs. In some embodiments, the displayed image on the card only requires power to change state.

In some embodiments, the EGT has no central charging pad 558 but instead comprises a wireless power and/or charging pad 562 at each seating position at the table as well as the dealer seating position.

In some embodiments, the central charging pad 558 occupies or underlies most or all of the playing surface of the EGT and constantly and continuously emits an NFC field that not only transmits data to VDPPCs but also powers the VDPPCs 100 or 150. By way of example, the NFC field can cause the first or second digital displays of enrolled and/or checked out VDPPCs and one or more table displays to show a video broadcast or loop. When the player leaves the table, the video stops, and the card reverts back to a darkened or static image.

In some embodiments, the EGT comprises only the central charging pad 558 as a single, shared wireless power and/or charging place for the entire the table.

While the gaming table system 500 is depicted as having player station gaming devices 312*a-e*, it is to be understood that VDPPCs 100 or 150 may be used in an EGT not having gaming devices 312*a-e* or at a gaming table not having a table gaming server 504 or switch hub 516.

Figure 6:
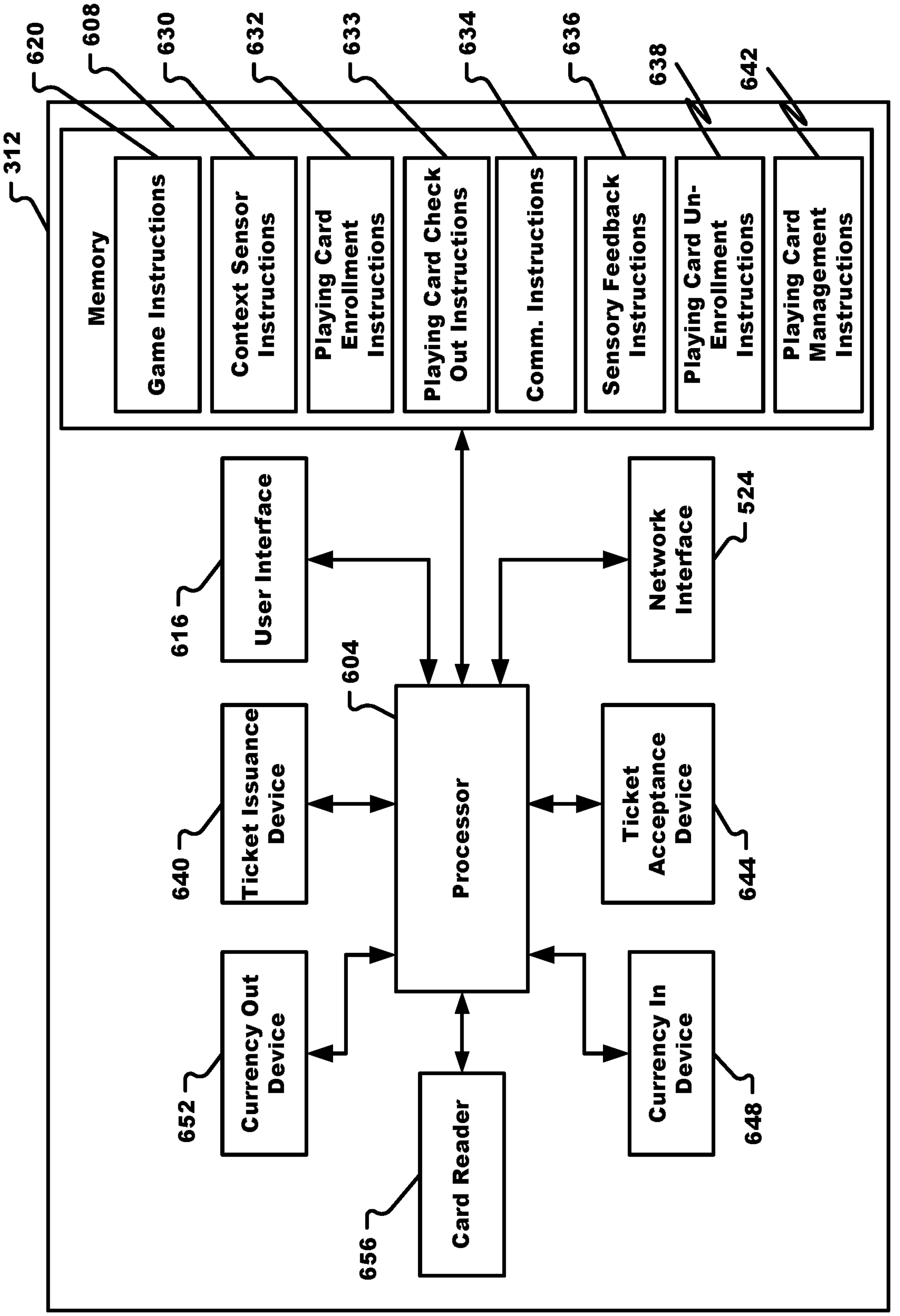
FIG. 6 depicts a gaming device configured for use with VDPPCs in accordance with embodiments of the present disclosure.

With reference to FIG. 6, additional details of the components that may be included in a gaming device 312 or any other gaming device will be described in accordance with at least some embodiments of the present disclosure.

A gaming device 312 may correspond to a portable or non-portable device used for executing a gaming application or multiple different gaming applications without departing from the scope of the present disclosure. Non-limiting examples of a gaming device 312 include an EGM, a VGM, EGT, EGT player station, VR gaming machine, AR gaming machine, a mobile communication device (e.g., a smartphone, laptop, wearable device, etc.), a laptop, a PC, etc. The illustrative gaming device 312 depicted herein may include a support structure, housing or cabinet, which provides support for a plurality of displays, inputs, controls and other features of a conventional gaming machine. In some embodiments, a player 324 plays gaming device 312 while sitting, however, the gaming device 312 is alternatively configured so that a player can operate it while standing or sitting. The illustrated gaming device 312 can be positioned on the floor but can be positioned alternatively (i) on a base or stand, (ii) as a pub-style table-top game (e.g., where the gaming device 312 is at a player station in communication with a central or gaming table server 504 or 316 as shown in FIG. 5 above), (iii) as a stand-alone computational device on the floor of a casino with other stand-alone computational devices, or (iv) in any other suitable manner. The gaming device 312 can be constructed with varying cabinet and display configurations.

The gaming device 312 is shown to include a processor 604, memory 608, a network interface 524, and a user interface 616.

In some embodiments, the processor 604 may correspond to one or many microprocessors, CPUs, microcontrollers, Integrated Circuit (IC) chips, or the like. For instance, the processor 604 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 604 may be provided as a microcontroller, microprocessor, Central Processing Unit (CPU), or plurality of microprocessors that are configured to execute the instructions sets stored in memory 608. In some embodiments, the instruction sets stored in memory 608, when executed by the processor 604, may enable the gaming device 312 to provide game play functionality.

The nature of the network interface 524 may depend upon whether the network interface 524 is provided in cabinet- or player station-style gaming device 312 or a mobile gaming device 312. Examples of a suitable network interface 524 include, without limitation, an Ethernet port, a USB port, an RS-232 port, an RS-485 port, a NIC, an antenna, a driver circuit, a modulator/demodulator, etc. The network interface 524 may include one or multiple different network interfaces depending upon whether the gaming device 312 is connecting to a single gaming network 304 or multiple different types of gaming networks 304. For instance, the gaming device 312 may be provided with both a wired network interface 524 and a wireless network interface 524 without departing from the scope of the present disclosure.

The user interface 616 may include a combination of user input devices and user output devices. For instance, the user interface 616 may include a display screen, speakers, buttons, levers, a touch-sensitive display, or any other device that is capable of enabling player 324 interaction with the gaming device 312. The user interface 616 may also include one or more drivers for the various hardware components that enable player 324 interaction with the gaming device 312.

The memory 608 may include one or multiple computer memory devices that are volatile or non-volatile. The memory 608 may include volatile and/or non-volatile memory devices. Non-limiting examples of memory 608 include Random Access Memory (RAM), Read Only Memory (ROM), flash memory, Electronically-Erasable Programmable ROM (EEPROM), Dynamic RAM (DRAM), etc.

The memory 608 may be configured to store the instruction sets depicted in addition to temporarily storing data for the processor 604 to execute various types of routines or functions. The instruction sets can enable user interaction with the gaming device 312 and game play at the gaming device 312. Examples of instruction sets that may be stored in the memory 608 include a game instruction set 620, context sensor instructions 630, playing card enrollment instructions 632, playing card check out instructions 633, communication instructions 634, sensory feedback instructions 636, playing card un-enrollment instructions 638, and playing card management instructions 642. In addition to the instruction sets, the memory 608 may also be configured to store a random number generator (not shown) that is used by the game instruction set 620, for example, to provide game outputs. The communication instruction set 634 may enable the gaming device 312 to exchange electronic communications, either directly or indirectly, with a mobile device 328 or the VDPPC 100 or 150, respectively.

In some embodiments, the game instructions 620, when executed by the processor 604, may enable the gaming device 312 to facilitate one or more games of chance and/or skill and produce interactions with the player. In some embodiments, the game instruction set 620 may include subroutines that generate, such as by a random number generator, a playing card parameter (such as a playing card type (e.g., suit) or hierarchical value (e.g., rank) to be rendered by a selected VDPPC 100 or 150, subroutines that present one or more graphics to the player via the user interface 616, subroutines that calculate whether a particular card game wager using VDPPCs 100 or 150 has resulted in a win or loss during the game of chance and/or skill, subroutines for determining payouts for the player in the event of a win during the first game of chance, subroutines for exchanging communications with another device, such as central or table gaming server 316 or 504, and any other subroutine useful in connection with facilitating game play at the gaming device 312.

The context sensor instructions 630 may correspond to an instruction set within the gaming device 312 that can facilitate a tracking of wager activity at the gaming device 312. In some embodiments, the context sensor instruction set 630, when executed by the processor 604, may be used to store or log information related to various player activities and events that occur at the gaming device 312. The types of information that may be collected and maintained by the context sensor instructions 630 include, without limitation, player information, available credit information, wager amount information, game state information, game events, and other types of information that may or may not need to be recorded for purposes of accounting for wagers placed at the gaming device 312 and payouts made for a player during a game of chance and/or skill played at the gaming device 312.

In some embodiments, the context sensor instructions 630 may be configured to track currency in activity, currency out activity, coin drop activity, jackpot paid activity, credits applied activity, external bonus payout activity, voucher in activity, voucher out activity, timing of events that occur at the gaming device 312, and the like.

The sensory feedback instructions 636, which may be the same as the sensory feedback instructions 284, receive the sensed context information from the context sensor 240, 450, or 540 or processor 248 or 604 executing the context sensor instructions 260 or 630 and, based on the sensed context information, causes a selected sensory user feedback response, such as color, video, sound, and/or movement, to be provided by the VDPPC 100 or 150. For example, the first or second digital display 154 or 116 of the VDPPC 100 or 150 can change colors or color intensity or pulsate in color based on sensed context information, such as player information 404 and/or game event information (e.g., information regarding a game activity, state or outcome). The first or second digital 154 or 116 can display a symbol or video based on sensed context information. The VDPPC 100 or 150 can move or vibrate based on sensed context information. The VDPPC 100 or 150 can play sound sequences or sets of sounds based on sensed context information. The VDPPC 100 or 150 can simultaneously exhibit or generate combinations of these sensory user feedback responses or behaviors.

The playing card enrollment instructions 632, when executed by the processor 604, may permit the gaming device 312 or a dealer associated with the gaming device 312 to enroll a selected VDPPC 100 or 150 by associating the selected VDPPC 100 or 150 with a gaming table object, such as a dealer, an identifier of the EGT, and/or a seating position at the EGT, such as at a player station-style gaming device 312. In a non-limiting enrollment example during the process of opening the table, one or more VDPPCs 100 or 150 are associated with the table. The purpose of this enrollment is to prevent the use of VDPPCs 100 or 150 at other tables, or VDPPCs that may be manipulated by a player to display the wrong information. This enrollment process may include associating the serial number or asset number of a VDPPC with the table. The enrollment process may also involve the verification of any software installed on the VDPPC. The enrollment process may also be used to establish a secure communications channel between the VDPPCs and the table gaming server 504 of the dealer. This can include a session key used to secure all later wireless communications between the VDPPCs 100 or 150 and the table gaming server 504 or central gaming server 316 during the lifecycle of the open table. The enrollment could require a physical connection between the table gaming server 504 and each VDPPC 100 or 150, or it may only require a wireless connection, such as NFC, BLE, WiFi, etc.

The playing card check out instructions 633, when executed by the processor 604, may permit the gaming device 312 or a dealer associated with the gaming device 312 to check out a selected VDPPC 100 or 150 by associating the selected VDPPC 100 or 150 with a player 324 or player station. In a non-limiting example, as players 324 arrive at a gaming table, he or she will be issued one or more VDPPCs 100 or 150 by the dealer for use during a hand. The dealer may associate those cards with the player and/or table seating position. The dealer can perform this association by scanning each VDPPC 100 or 150 and then using a mouse, keyboard, or other user interface element (such as the main table display 508) of the table gaming server 504 to associate the VDPPCs 100 or 150 with the player's table seat or to note them as issued to a player 324. This information will then be stored in a data store, such as the player profile or playing card database 336 or 332. In one embodiment, the player may be required, or given the option to swipe his or her player tracking card in the card reader 656 or present their mobile device to start a player tracking session at the table.

The playing card unenrollment instructions 638, when executed by the processor 604, may permit the gaming device 312 to unenroll enrolled and/or checked out VDPPCs 100 or 150. By way of non-limiting example, at the end of a shift, the dealer may close the table. During the table close process, the dealer may have to account for the VDPPCs enrolled with the table. This may involve a process similar to that used during table enrollment. For instance, the dealer may have to tap to an NFC wireless radio (such as a table or gaming station antenna 550 or 554*a-e*) with each VDPPC 100 or 150 enrolled with the table to un-enroll each VDPPC 100 or 150. In any of the methods discussed herein, the gaming system 300 can use gesture recognition, such as by image processing, to detect player or dealer movements and thereby determine an associated command. If one or more VDPPCs 100 or 150 is not tapped during the process of closing the table, then the dealer will mark, via a dealer interface (such as the main table display 508) the one or more VDPPCs 100 or 150 as missing. This event can be reported to the central or table gaming server 316 or 504 so that the missing VDPPCs 100 or 150 can be tracked and possibly prevented from being used at another table. The process of unenrolling a VDPPC 100 or 150 may also clear out any security information held on the VDPPC 100 or 150, such as connection information, or any security keys negotiated during initial enrollment.

The playing card management instructions 642, when executed by the processor 604, may permit the gaming device 312 to perform one or more card game commands or operations, such as discarding a card, folding a hand, and determining a winning player at the end of a hand or card game.

The communication instructions 634, when executed by the processor 604, may enable the gaming device 312 to communicate with the central or table gaming servers 316 or 540 and/or mobile device 328 or multiple mobile devices 328 and/or VDPPC 100 or 150 or multiple VDPPCs 100 or 150. In some embodiments, the communication instruction set 634 may include instructions that enable the gaming device 312 to pair with a mobile device 328 or VDPPC 100 or 150 (as the case may be) and establish a communication channel with the mobile device 328 or VDPPC 100 or 150 via the pairing. As an example, the communication instruction set 634 may include instructions that enable NFC, Bluetooth®, WiFi, or other types of communication protocols. It should be appreciated that the communication instruction set 634 may also be updated to reflect when a mobile device 328 or VDPPC 100 or 150 (as the case may be) is paired with the gaming device 312 and such pairing information may include addressing information for the mobile device 328 or VDPPC 100 or 150 and/or identification information associated with the player 324 of the mobile device 328 or VDPPC 100 or 150. Alternatively or additionally, the communication instructions 634 may enable the gaming device 312 to identify a player 324 of the mobile device 328 or associated with a VDPPC 100 or 150, identify a loyalty account associated with the player 324 of the mobile device 328 or associated with a VDPPC 100 or 150, exchange information (e.g., send or receive) with a loyalty application operating on the mobile device 328, or combinations thereof. This information may be provided to the context sensor 240, 350, or 540 or processor 248 or 604 executing the context sensor instructions 260 or 630. In some embodiments, the communication instructions 634 may be configured to operate or drive the network interface 524 to facilitate direct or indirect communications with a mobile device 328 or VDPPC 100 or 150 (as the case may be).

While shown as separate instruction sets, it should be appreciated that any of the playing card enrollment or unenrollment, playing card check out, sensory feedback, and/or playing card management instructions set 642 may correspond to a subroutine of the game instruction set 620 without departing from the scope of the present disclosure.

The gaming device 312 is further shown to include a ticket issuance device 640, a ticket acceptance device 644, a currency in device 648, a currency out device 652, and a card reader 656. The ticket issuance device 640 may be configured to print physical tickets, vouchers, or the like. The ticket acceptance device 644 may be configured to receive, scan, and/or recognize information from an input physical ticket, voucher, or cash. In some embodiments, the ticket issuance device 640 and ticket acceptance device 644 may operate in concert with a common piece of hardware that both accepts and produces physical tickets, vouchers, or the like. Tickets or vouchers printed by ticket issuance device 640 and recognizable by the ticket acceptance device 644 may correspond to physical lottery tickets, casino vouchers, paper coupons, and the like. Alternatively or additionally, the ticket issuance device 640 and/or ticket acceptance device 644 may be connected to ticket or cash reading hardware. In such an embodiment, the ticket issuance device 640 and ticket acceptance device 644 may operate as a driver and/or firmware component for the card reader.

Similarly, the currency in device 648 and currency out device 652 may include or operate in concert with a coin slot or any other type of coin delivery mechanism. The currency in device 648 and currency out device 652 may include hardware, drivers, or firmware that facilitate receiving or distributing tokens, coins, chips, etc. In some embodiments, the currency in device 648 may be configured to determine an amount of coins (an amount of tokens, an amount of chips, etc., input at the coin slot and convert the values into credits for playing games with the game instruction set 620. The currency out device 652 may correspond to hardware and software configured to output coins, tokens, chips, etc. if a player decides to cash out or convert playing credits back into coins, tokens, or chips, etc.

The card reader 656 may include hardware and/or software configured to read or accept any type of card, VDPPC 100 or 150, or portable credential (e.g., NFC, Bluetooth, WiFi, etc.). In some embodiments, the card reader 656 may include hardware and/or software that enable contactless reading of a card, token, VDPPC 100 or 150, or portable credential. In some embodiments, the card reader 656 may include hardware and/or software that enable contact-based reading of a card, token, VDPPC 100 or 150, or portable credential (e.g., magstripe, chip reader, electrodes, card-receiving slot, etc.). It should be appreciated that the card reader 656 may be configured to receive and reader a card or portable credential, token, or VDPPC 100 or 150 in any type of format (e.g., portable plastic card, magstripe card, key fob, etc.). It should also be appreciated that the card reader 656 may be configured to write information or data onto a card or portable credential or VDPPC 100 or 150. Furthermore, in some embodiments, the card reader 656 may be configured to read a player loyalty card in the form of a plastic credit-card shaped credential. In some embodiments, the card reader 656 may enable communications with a loyalty application operating on a player's mobile device 328. In some embodiments, the VDPPC 100 or 150 acts as a type of card or portable credential and wirelessly communicates to the gaming device 312 the identity, credential, and/or account information of the player. In some embodiments, the VDPPC 100 or 150 acts as a type of card or portable credential and wirelessly communicates to the network interface 524 or card reader 656 gaming device 312 game credits, thereby allowing the player to load game credits onto the gaming device 312.

Figure 7:
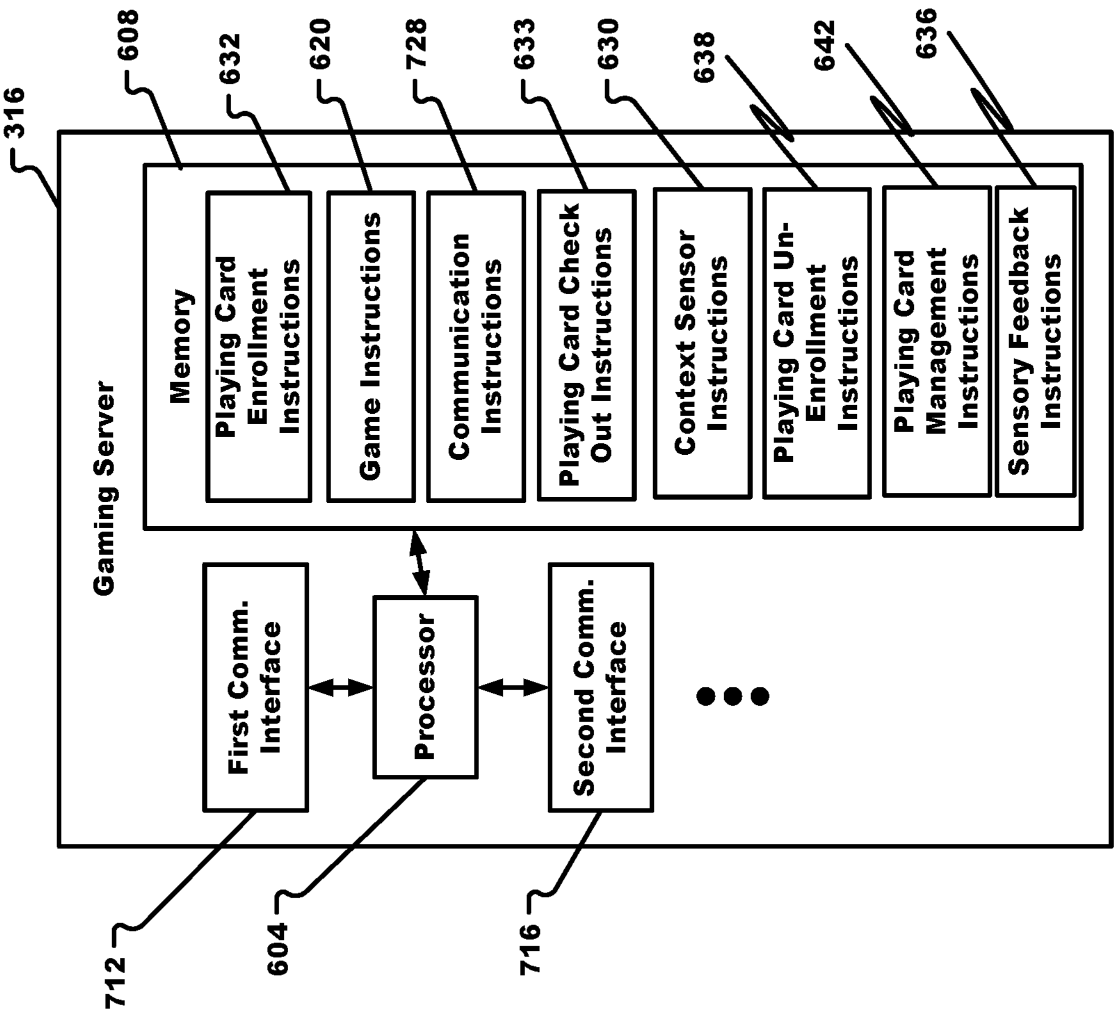
FIG. 7 depicts a gaming server configured for use with VDPPCs in accordance with embodiments of the present disclosure.

With reference now to FIG. 7, additional details of a central or table gaming server 316 or 504 (hereinafter referred to as "gaming server") will be described in accordance with embodiments of the present disclosure. The gaming server 316 or 504 is shown to include a processor 604, memory 608, and a plurality of communication interfaces 712, 716. These resources may enable functionality of the gaming server 316 or 504 as will be described herein. For instance, the first communication interface 712 may provide the gaming server 316 or 504 with the ability to send and receive communication packets or the like over the gaming network 304. The first communication interface 712 may be provided as a network interface card (NIC), a network port, drivers for the same, and the like. Communications between the components of the gaming server 316 or 504 and other devices connected to the gaming network 304 may all flow through the first communication interface 712.

The gaming server 316 or 504 is also shown to include a second communication interface 716 that facilitates communications with the mobile devices 328 via the communication network 308. In some embodiments, the second communication interface 716 may be similar to the first communication interface 712. For instance, the second communication interface 716 may also include a NIC, network port, drivers for the same, and the like. In some embodiments, the first and second communication interfaces 712, 716 may be provided in a single physical component or set of components, but may correspond to different communication channels (e.g., software-defined channels, frequency-defined channels, amplitude-defined channels, etc.) that are used to send/receive different communications to the mobile devices 328 as compared to the gaming devices 312. In some embodiments, a single communication interface may facilitate communications with both the gaming devices 312 and mobile devices 328, especially if both devices communicate with the gaming server 316 or 504 via a common network.

The processor 604 may correspond to one or many computer processing devices. The processor 604 may be configured to execute one or more instruction sets stored in memory 608. Upon executing the instruction sets stored in memory 608, the processor 604 enables various authentication functions of the gaming server 316 or 504.

The memory 608 may include any type of computer memory device or collection of computer memory devices. The illustrative instruction sets that may be stored in memory 608 include, without limitation, a game instruction set 620, context sensor instructions 630, playing card enrollment instructions 632, playing card check out instructions 633, communication instructions 728, sensory feedback instructions 636, playing card unenrollment instructions 638, and playing card management instructions 642. In addition to the instruction sets, the memory 608 may also be configured to store a random number generator (not shown) that is used by the game instruction set 620, for example, to provide game outputs. Functions of the gaming server 316 or 504 enabled by these various instruction sets will be described in further detail herein. It should be appreciated that the instruction sets depicted in FIG. 7 may be combined (partially or completely) with other instruction sets or may be further separated into additional and different instruction sets, depending upon configuration preferences for the gaming server 316 or 504. Said another way, the particular instruction sets depicted in FIG. 7 should not be construed as limiting embodiments described herein.

Although not depicted, the gaming server 316 or 504 may include instructions that enable a processor to store data into the player profile database 336 and/or playing card database 332 and retrieve information from the databases 336, 332. Alternatively or additionally, the player profile database 336 or data stored therein may be stored internal to the gaming server 316 or 504 (e.g., within the memory of the server 316 or 504 rather than in a separate database). Alternatively or additionally, the playing card database 332 or data stored therein may be stored internal to the gaming server 316 or 504.

The operations of the game instruction set 620, playing card enrollment instructions 632, playing card check out instructions 633, sensory feedback instructions 636, playing card unenrollment instructions 638, and playing card management instructions 642 have been discussed above with respect to FIG. 6.

The context sensor instructions 630, in addition to the context information referenced above, can collect additional context information for use in controlling the sensory feedback response behavior of the VDPPC(s) 100 or 150.

The communication instruction set 728, when executed by the processor 604, may enable the gaming server 316 or 504 to communicate with the other devices in the system 300. For instance, the communication instruction set 728 may be configured to modulate/demodulate communications exchanged over the gaming network 304 and/or communication network 308, determine timings associated with such communications, determine addresses associated with such communications, etc. In some embodiments, the communication instruction set 728 may be configured to allocate communication ports of the gaming server 316 or 504 for use as either the first or second communication interface 712, 716 as appropriate. The communication instruction set 728 may further be configured to generate messages in accordance with communication protocols used by the networks 304, 308 and to parse messages received via the networks 304, 308.

Figure 8:
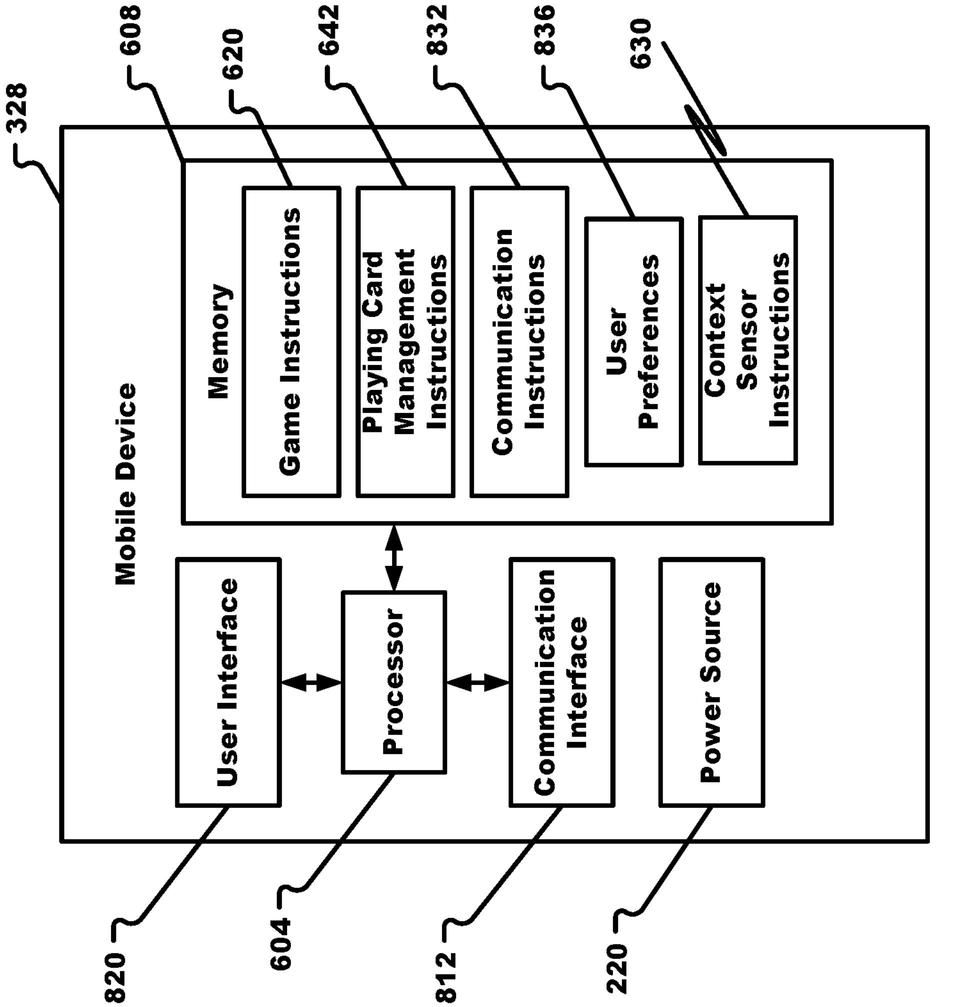
FIG. 8 depicts a mobile device configured for use with VDPPCs in accordance with embodiments of the present disclosure.

With reference now to FIG. 8, additional details of the components that may be included in a mobile device 328 will be described in accordance with at least some embodiments of the present disclosure. The mobile device 328 is shown to include a processor 604, memory 608, a communication interface 812, power source 220, and a user interface 820. The processor 604 may be configured to execute one or more instruction sets stored in memory 608. In some embodiments, the instruction sets stored in memory 608, when executed by the processor 604, may enable the mobile device 328 to provide game play functionality, interact with gaming devices 312, pair with gaming devices 312, pair with VDPPCs 100 or 150, or any other type of desired functionality.

The communication interface 812 may be similar or identical to the network interface 524 and/or communication interfaces 712, 716 depicted and described herein. The nature of the communication interface 812 may depend upon the type of communication network 308 for which the mobile device 328 is configured. Examples of a suitable communication interfaces 812 include, without limitation, a WiFi antenna and driver circuit, a Bluetooth antenna and driver circuit, a cellular communication antenna and driver circuit, a modulator/demodulator, etc. The communication interface 812 may include one or multiple different network interfaces depending upon whether the mobile device 328 is connecting to a single communication network 308 or multiple different types of communication networks. For instance, the mobile device 328 may be provided with both a wired communication interface 812 and a wireless communication interface 812 without departing from the scope of the present disclosure.

The user interface 820 may include a combination of user input and user output devices. For instance, the user interface 820 may include a display device, a microphone, a speaker, a haptic feedback device, a light, a touch-sensitive display, a button, or a combination thereof. The user interface 820 may also include one or more drivers for the various hardware components that enable user interaction with the mobile device 328.

The memory 608 may be configured to store instruction sets that enable user interaction with the mobile device 328 and that enable game play at the mobile device 328. Examples of instruction sets that may be stored in the memory 608 include a game instruction set 620, playing card management instruction set 642, communication instruction set 832, and context sensor instruction set 630. In addition to the instruction sets, the memory 608 may also be configured to store data that is useable by the various instruction sets. Examples of such data that may be stored in memory 608 include, without limitation user preferences 836.

The operations of the game instruction set 620, playing card management instruction set 642, and context sensor instruction set 630 have been discussed above with respect to FIG. 6.

The communication instruction set 832, when executed by the processor 604, may enable the mobile device 328 to communicate via the communication network 308. In some embodiments, the communication instruction set 832 may be similar or identical to the communication instruction set 700 and may be particular to the type of communication network 308 used by the mobile device 328. As an example, the communication instruction set 832 may be configured to enable cellular, WiFi, and/or Bluetooth communications with other devices. The communication instruction set 832 may follow predefined communication protocols and, in some embodiments, may enable the mobile device 328 to remain paired with a gaming device 312 or VDPPC 100 or 150 as long as the mobile device 328 is within a predetermined proximity (e.g., 20-30 feet, an NFC communication range, or a Bluetooth communication range) and paired with the gaming device 312.

In one embodiment, the communication instruction set 832 allows the player 324 to use his or her mobile device 328 to receive and interact with VDPPCs 100 or 150 given to the player by the dealer/table through the playing card management instructions 642 loaded into the memory 608 of the player's mobile device 328. This will require the player to associate the mobile device 328 with the table when he or she sits down, which is discussed in co-pending U.S. patent application Ser. No. 15/992,424, filed May 30, 2018, entitled "Cardless Login at Table Games" and Ser. No. 14/924,391, filed Oct. 27, 2015, entitled "Project EGM Display onto Mobile Device"). The player 324 would then interact with the mobile device 328 to view his or her VDPPC dealt cards, hold cards, discard cards, or fold during the current game.

The user preferences 836 may correspond to gaming or wager preferences that are desired by the player 324 of the mobile device 328. In some embodiments, where the mobile device 328 is not owned by the player 324, but rather is loaned to the player 324 by a casino operator, the user preferences 836 may include default preferences defined by the casino as well as other preferences that are defined by the player 324 after receiving the mobile device 328. The user preferences 836 may alternatively or additionally relate to communication preferences that drive operation of the communication instruction set 832. In some embodiments, the user preferences 836 may include user preferences controlling the sensory feedback response provided by the VDPPC 100 or 150 under a predetermined context, or a set of context information, and may enable automated selection or assignment of the sensory feedback response to be provided by the VDPPC 100 or 150. The gaming device 312, VDPPC 100 or 150, and mobile device 328 may be configured to communicate with one another and, in some embodiments, the context sensor instructions 630, when executed by the processor 604 of the mobile device 328, may provide some or all of the user preferences 836 to the VDPPC 100 or 150 for use during a game play session or at least until the player 324 leaves the gaming device 312 (e.g., as determined by the mobile device 328 leaving the predetermined proximity of the gaming device 312).

By way of illustration, player 324 can, by user preferences 836, select the color or pattern rendered by the first or second digital displays 154 or 116 of the VDPPC 100 or 150. Alternatively or additionally, the user preferences 836 can select the content or media or multimedia to be displayed by the first or second digital displays 154 or 116 or output by a speaker in the VDPPC 100 or 150. For instance, the user preferences can be communicated to the VDPPC 100 or 150 by a mobile device 328, such as a mobile phone, smart watch, or Augmented Reality (AR) device. The player 324 can choose the color or color pattern via the mobile device 328, which then wirelessly informs the gaming server 316 or 504 or gaming device 312 about the selection.

Figure 9:
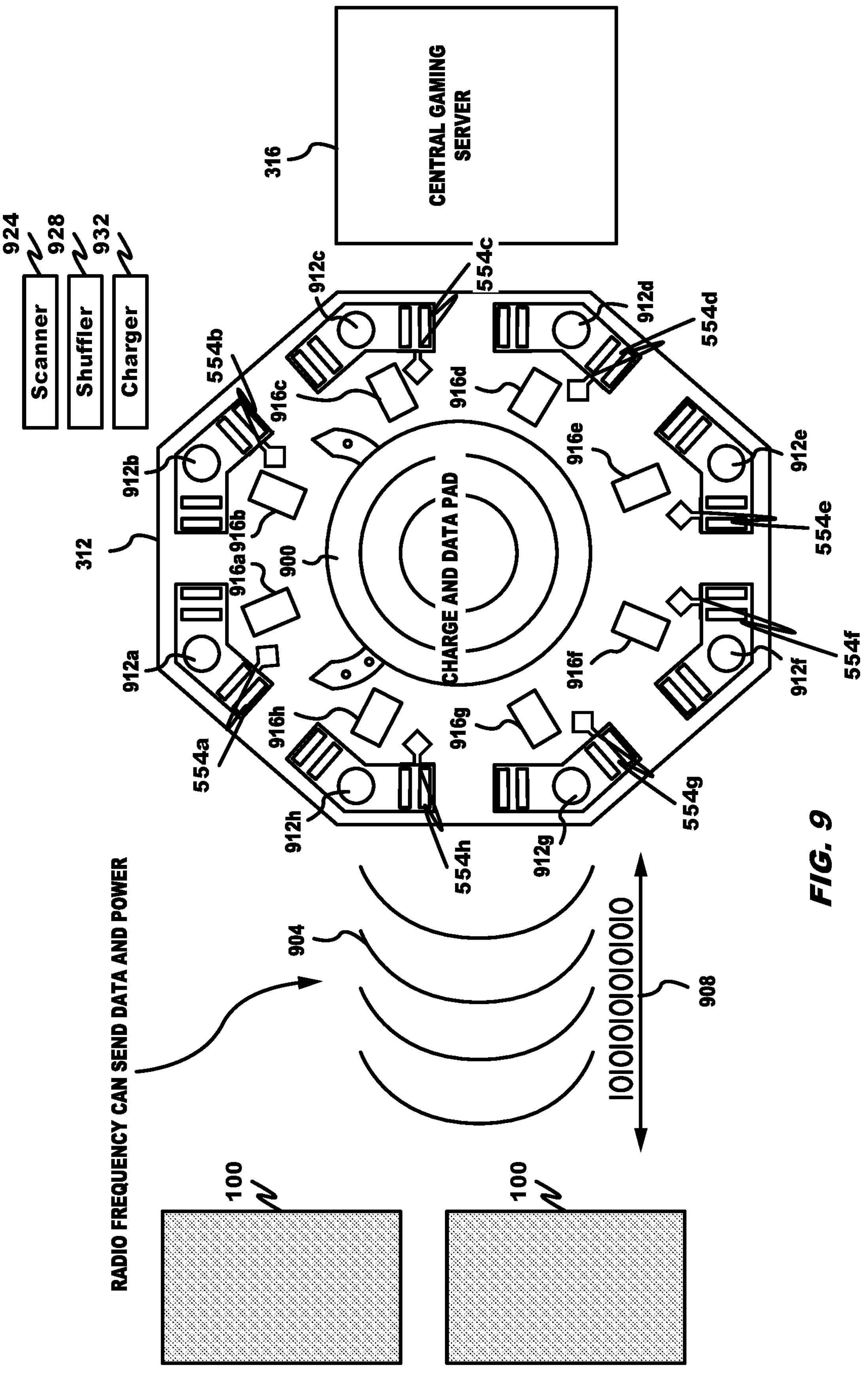
FIG. 9 depicts data and power communications between an electronic gaming table and VDPPCs in accordance with embodiments of the present disclosure.

With reference now to FIG. 9, interaction of physical VDPPCs 100 or 150 with a gaming device 312 is depicted in accordance with at least some embodiments of the present disclosure. The gaming device 312 comprises a wireless power and/or charging pad associated with each seat (including the dealer) and a central wireless power/charging pad associated with the area in the table where players show their final hand to other players, such as at the center of the table.

The gaming device 312 in the form of a gaming table comprises a plurality of player stations 912*a-h* around the periphery of the gaming table. Each player station comprises a marked player location 916*a-h* to receive one or more playing cards, VDPPCs 100 or 150, or other game pieces or components. The VDPPCs 100 or 150 can additionally or alternatively be received in a central area of the gaming device 312 that comprises a charge and data pad 900. The charge and data pad 900 can wirelessly charge the on-board power source 220 by any suitable technique. As noted above, the charge and data pad 900, in some embodiments, uses electromagnetic (charging) signals to charge the power source 220 and, for instance, increase battery or capacitor charge capacity. The electromagnetic signals can be any frequency, such as radio frequency. In another embodiment, the charge and data pad 900 charges the power source 220 by inductive charging, which uses an electromagnetic field to transfer energy between the charge and data pad 900 and VDPPC 100 or 150 using electromagnetic induction. In accordance with communication instructions 634, the charge and data pad 900 can also transmit data signals, such as sensory feedback response commands and VDPPC IDs and other information, to the VDPPCs 100 or 150. Likewise, the context sensor 240 or context sensor instruction set 260 in the VDPPC 100 or 150 can transmit to the charging and data pad 900 sensed context information or data and VDPPC IDs and other information via antenna 202, which is received by an antenna 554*a-h* at the player station 916*a-h* of the player 324 associated with the VDPPC 100 or 150. The exchange of charging and data signals is denoted by arcuate lines 904 and binary data stream 908. Alternatively or additionally, the VDPPCs 100 or 150 receive data signals only when the processor 248 determines, from sensed context information of the context sensor 240 or context sensor instruction set 260, that the VDPPC 100 or 150 is assigned to the gaming device 312 and/or checked out to the player 324. Alternatively or additionally, the gaming device 312 can communicate data signals to the VDPPC 100 or 150 comprising command logic only when the processor 248 determines, from sensed context information of the context sensor 240 or context sensor instruction set 260, that the VDPPC 100 or 150 is within a predetermined distance of the gaming device 312. The VDPPCs 100 or 150 can use NFC, Bluetooth™, or WiFi for command and data exchange. Alternatively or additionally, the VDPPCs 100 or 150 are powered by the power source 220 only when the processor 248 determines, from sensed context information of the context sensor 240 or context sensor instruction set 260, that the VDPPC 100 or 150 is within a predetermined distance of the gaming device 312 and/or the charge and data pad 900. For example, the charge and data pad 900 can comprise a wireless charging coil (not shown) for inductive charging and the VDPPC 100 or 150 can be powered or inductively charged when in the electromagnetic field of the coil. In other configurations, the charge and data pad is incorporated at each player station 912*a-h*. This can not only be convenient but also enable the gaming system 300 to determine which VDPPCs 100 or 150 belong to which player. In other words, the gaming system can associate VDPPCs 100 or 150 with or automatically check out VDPPCs 100 or 150 to specific players if the VDPPCs 100 or 150 are placed at the respective table player station based on pairing or other signals received from the charge and data pad at each player station. As will be appreciated, the charge and data pads can be located anywhere and/or all around the circumference or perimeter of the table. The pads can not only charge the VDPPCs 100 or 150 but also inform the system about the location of the VDPPCs 100 or 150.

The gaming system 300 can further include a scanner 924, shuffler 928, and/or portable charger 932. The scanner can be any hand-held, mechanical, or 3D image scanner that optically scans images, such as printed text on a conventional playing card, and converts the scanned image into a digital image. For example, the dealer can deal a card from a standard deck of cards to each player 324 at each occupied player station 912*a-h*, scan the dealt card, and cause the gaming device 312 to transmit the scanned digital image to the VDPPC 100 or 150 assigned to each player 324 for display by a digital display of the VDPPC 100 or 150. The shuffler 928 can be any shuffling machine for randomly shuffling packs of playing cards. The comparable size and dimensions of the VDPPCs 100 or 150 to standard playing cards enables a conventional continuous, batch or automatic shuffling machine to be used to shuffle plural VDPPCs 100 or 150 alone or as a mixed deck with standard playing cards. The charger 932 can be moved to any desired location by the dealer or player to charge one or more VDPPCs 100 or 150.

Other table architectures are possible. For example, the table could have only a single wireless antenna for the table and the antenna could be moved to each player 324 when a player action is required. Alternatively, the player 324 may move his or her VDPPC to a central location on the table to perform an activity. A persistent wireless communications channel may exist between every VDPPC at the table and the central antenna of the table to exchange VDPPC and gaming information.

Figure 10:
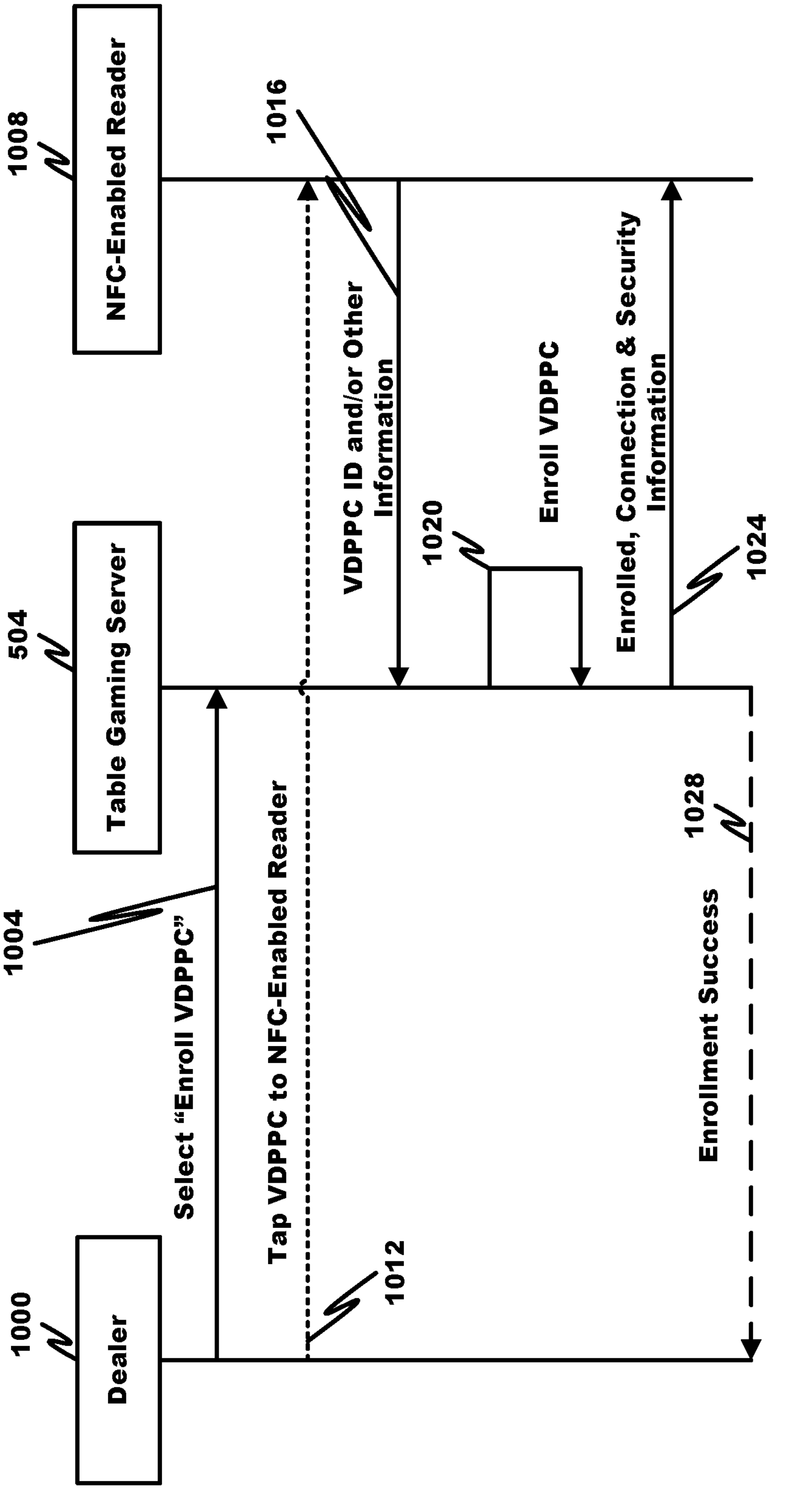
FIG. 10 depicts signal flows for VDPPC enrollment in accordance with embodiments of the present disclosure.
Figure 15:
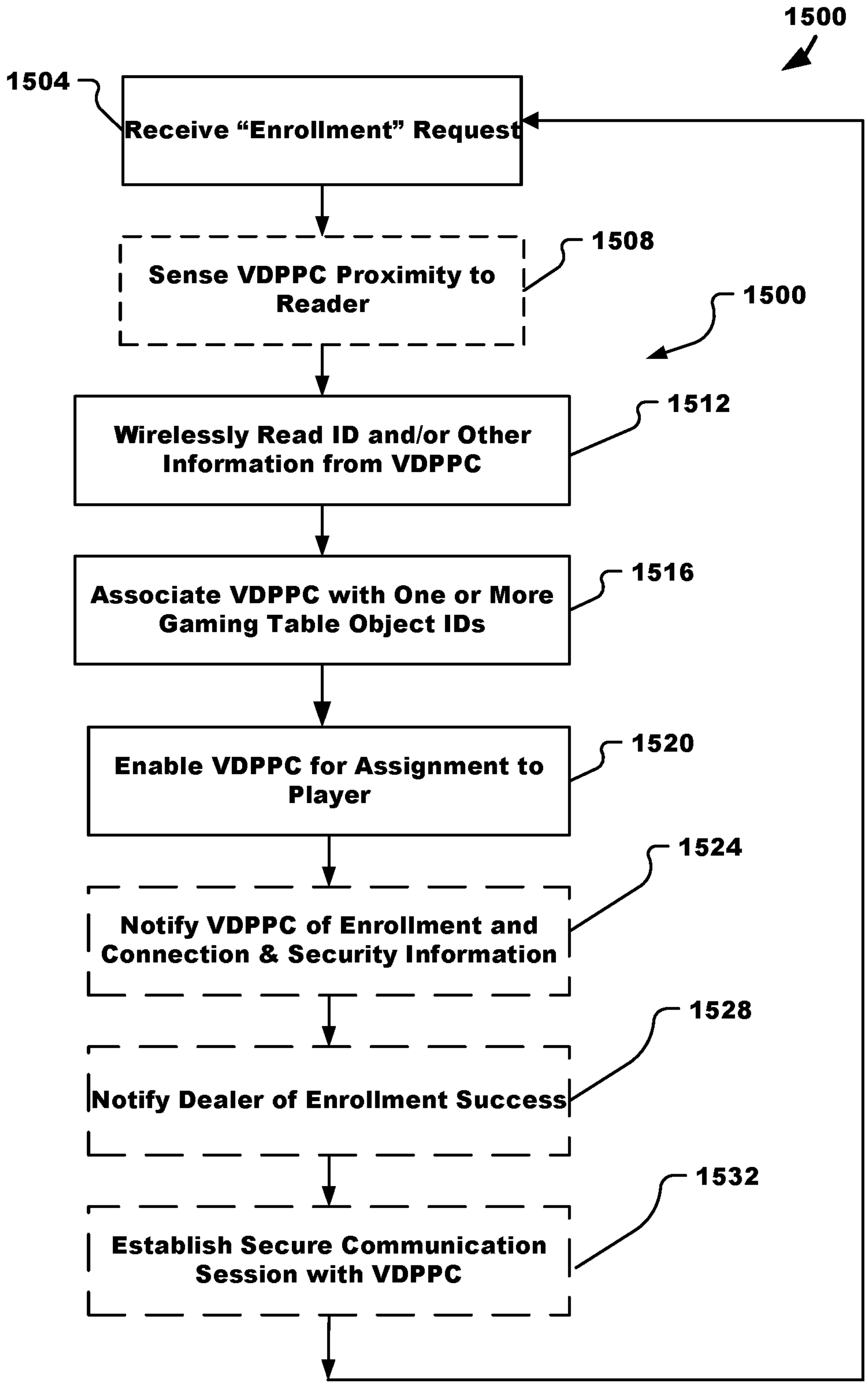
FIG. 15 is a flow chart illustrating VDPPC enrollment logic in accordance with embodiments of the present disclosure.

With reference now to FIGS. 10 and 15, various operations of a VDPPC 100 or 150, gaming device 312, table gaming server 504, central gaming server 316, and/or mobile device 328 will be described in accordance with at least some embodiments of the present disclosure.

The method 1500 begins when the table gaming server 504 or central gaming server 316 receives an "enroll VDPPC" selection 1004 from a dealer 1004 (step 1504). During the process of opening a gaming table, one or more VDPPCs 100 or 150 are associated with the gaming table. The purpose of enrollment is to prevent the use of VDPPCs 100 or 150 at other gaming tables or VDPPCs 100 or 150 that may be manipulated by a player 324 to display wrong or incorrect information.

The method 1500 may continue by the table gaming server 504 or central gaming server 316 sensing VDPPC proximity to a Near Field Communication ("NFC")-enabled reader 1008 (optional step 1508). While any technique may be used to sense proximity of the VDPPC to be enrolled to the NFC-enabled reader 1008, the dealer in some embodiments taps 1012 the VDPPC 100 or 150 to the NFC-enabled reader 1008. Other non-contact methods can be employed, such as placement of the VDPPC 100 or 150 within a selected distance or range of distances from the NFC-enabled reader 1008.

The method 1500 can continue by the NFC-enabled reader 1008 wirelessly reading 1016 the VDPPC ID and/or other VDPPC information 290 from the memory 244 of the VDPPC 100 or 150 (step 1512). While the example is discussed with reference to the NFC communication protocol, it is to be understood that the wireless exchange may be done using any suitable wireless protocol, such as Bluetooth Low Energy ("BLE"), Wi-Fi, and the like. In some embodiments, a contact method is employed to exchange VDPPC information, such as a physical connection between the table gaming server 504 or central gaming server 316 and the selected VDPPC. In some embodiments, the VDPPC ID is a serial number or asset number of a VDPPC. In some embodiments, the VDPPC ID is generated by a security algorithm, such as a key derivation function, from a software and/or hardware image and/or state information of the VDPPC. The VDPPC information may include hardware or software configuration, specification, or requirement information to be used by the gaming system 300 in verifying selected hardware and/or software installed on the VDPPC 100 or 150.

The method 1500 may continue by the table gaming server 504 or central gaming server 316 associating or enrolling the VDPPC ID with one or more gaming table object IDs and updating the associated table game object IDs and check out & enrollment information fields 440 and 452 in the playing card database 332 (step 1516 and operation 1020). In some embodiments, the enrollment process may include associating a serial number or asset number of a VDPPC with an identifier of a gaming table. The enrollment process may also involve the verification of any hardware and/or software installed on the VDPPC as a precondition to successful enrollment.

The method 1500 may continue by the gaming system 300 enabling the selected VDPPC for assignment to a player 324 (step 1520). In some embodiments, this occurs when the VDPPC ID is not concurrently enrolled at a different gaming table, is not flagged in memory as being ineligible for enrollment (or stated differently is indicated as being eligible for enrollment), and is verified successfully.

The method 1500 may continue by the gaming system 300 notifying 1024 the selected VDPPC of enrollment and connection and security information (optional step 1524). The enrollment process may also be used to establish a secure communications channel between the selected VDPPC to be enrolled and the table gaming server 504 or central gaming server 316. This secure communications establishment can include generating and/or exchanging a session key to be used to secure all later wireless communications between the selected VDPPC and the table gaming server 504 or central gaming server 316 during the lifecycle of the open table or a particular card game.

The method 1500 can continue by the gaming system 300 notifying 1028 the dealer of enrollment success (optional step 1532), such as by displaying suitable notification via the main table display 508 of the EGT 500.

The method 1500 can continue by the gaming system 300 establishing a secure communication session with the selected, now successfully enrolled, VDPPC 100 or 150 (optional step 1528).

Figure 11:
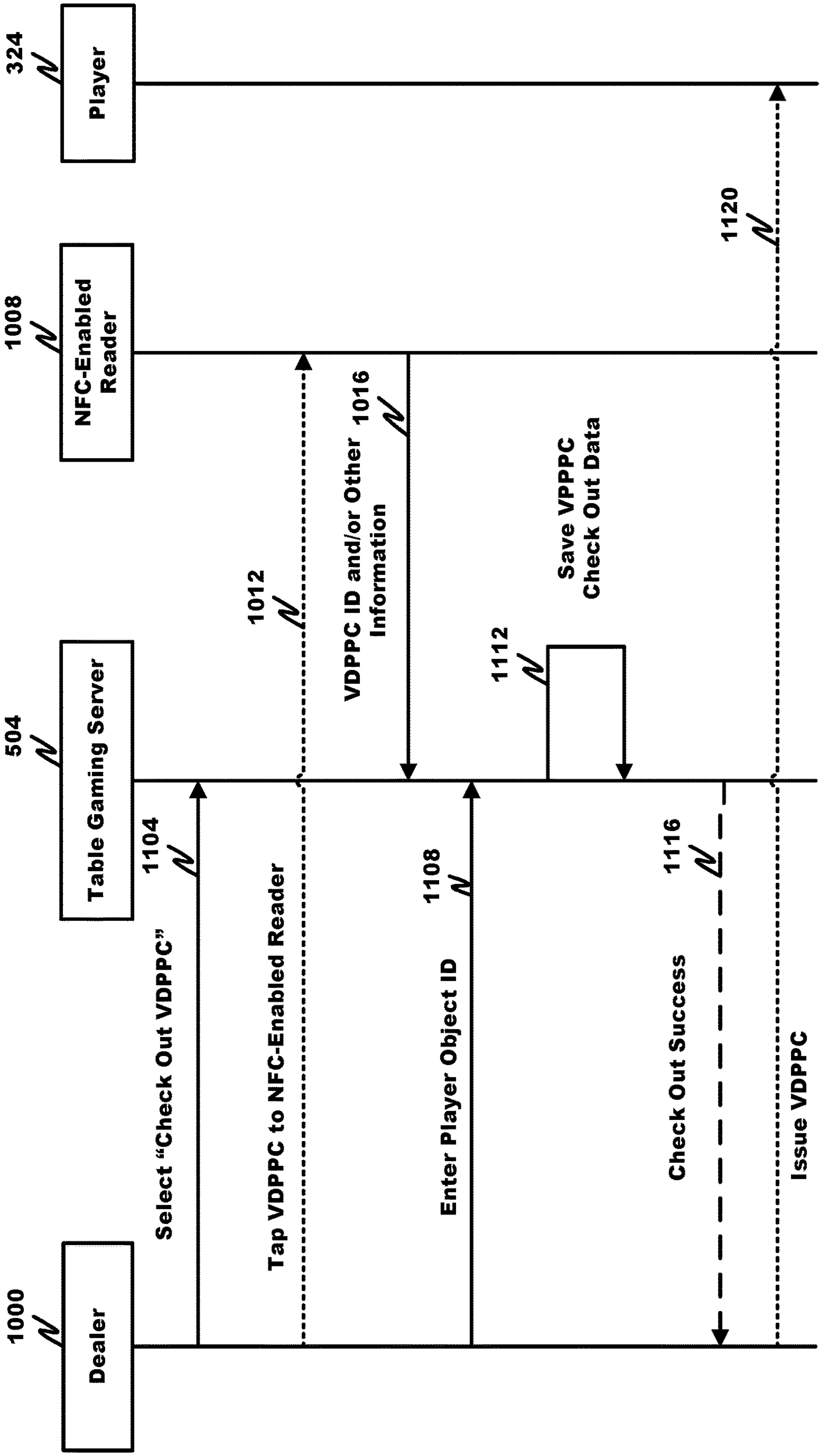
FIG. 11 depicts signal flows for VDPPC check out in accordance with embodiments of the present disclosure.
Figure 16:
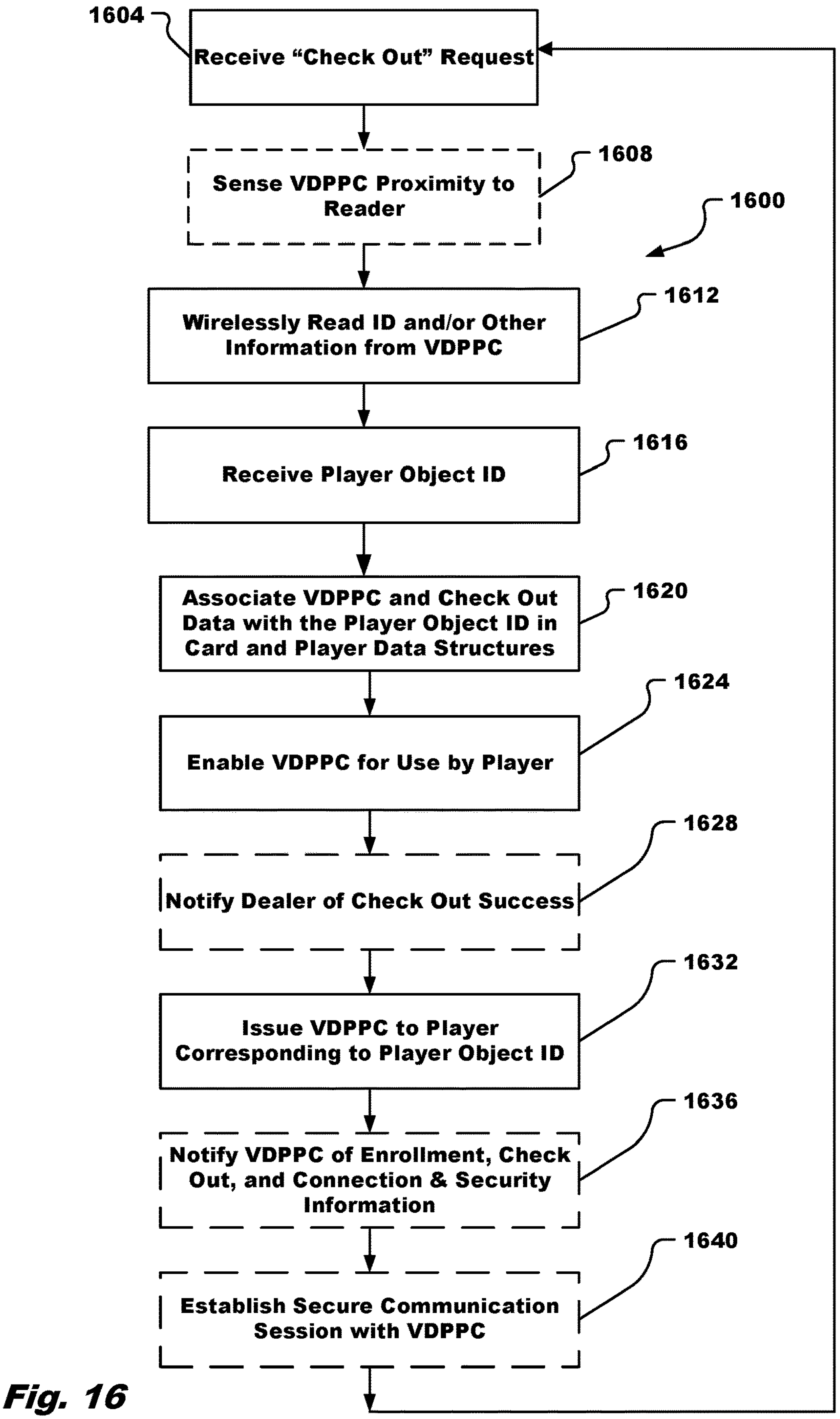
FIG. 16 is a flow chart illustrating VDPPC check out logic in accordance with embodiments of the present disclosure.

With reference now to FIGS. 11 and 16, various operations of a VDPPC 100 or 150, gaming device 312, table gaming server 504, central gaming server 316, and/or mobile device 328 will be described in accordance with at least some embodiments of the present disclosure.

The method 1600 begins when a table gaming server 504 or central gaming server 316 receives a "check out" request 1104 from a dealer 1000 (step 1604). As players arrive at the table, they will be issued one or more VDPPCs 100 or 150 by the dealer for use during a hand.

The method 1600 can continue by sensing a VDPPC in proximity to the NFC-enabled reader (step 1608). While any technique may be used to sense proximity of the VDPPC to be checked out to the NFC-enabled reader 1008, the dealer 1000 or player 324 in some embodiments taps 1012 the VDPPC 100 or 150 to the NFC-enabled reader 1008.

The method 1600 can continue by the NFC-enabled reader 1008 wirelessly reading 1016 the VDPPC ID and/or other VDPPC information 290 from the memory 244 of the VDPPC 100 or 150 (step 1612).

The method 1600 can continue by the gaming system 300 receiving the player object ID of the player 324 to whom the dealer desires to assign the selected VDPPC 100 or 150. While FIG. 11 shows the dealer 1000 inputting or entering 1108 the player object ID, it is to be understood that the player object ID can be input by the player, obtained by the NFC-enabled reader 1008 wirelessly reading a physical player tracking card in the possession of the player 324, obtained from a mobile device 328 associated with the player 324, and other techniques. In some embodiments, the dealer may associate the selected VDPPC 100 or 150 with the player 324, or seating position of the player 324. The dealer could perform this association by scanning each VDPPC and then using a mouse, keyboard, or other user interface element of the table gaming server 504 to associate the VDPPCs 100 or 150 with the player's table seat or to note them as issued to a player.

The method 1600 can continue by the gaming system 300 associating the VDPPC and check out data with the player object ID by updating the assigned table game object IDs and assigned VDPPC IDs fields 420 and 424 and assigned player ID and check out & enrollment information fields 448 and 452 in the player profile and playing card databases 336 and 332, respectively (step 1620 and operation 1112). In some embodiments, the VDPPC and check out data is stored in a data store, such as one or more of the databases 332 and 336, in the table gaming server 504, or in a data store or database in a linked table management system maintained at the central gaming server 316. In some embodiments, the player 324 may be required, or given the option to swipe his or her player tracking card, or present his or her mobile device 328 to start a player tracking session at the table.

The method 1600 may continue by the gaming system 300 enabling the selected VDPPC for assignment to a player 324 (step 1624). In some embodiments, this occurs when the VDPPC ID is not concurrently checked out by a different player, is not flagged in memory as being ineligible for check out by a player (or stated differently is indicated as being eligible for player check out), and is verified successfully.

The method 1600 can continue by the gaming system 300 notifying 1116 the dealer 1000 of check out success (optional step 1628), such as by displaying suitable notification via the main table display 508 of the EGT 500.

The method 1600 can continue by the dealer 1000 issuing or delivering 1120 the VDPPC to the player 324 corresponding to the player object ID (optional step 1632).

The method 1600 can continue by the gaming system 300 notifying the selected VDPPC 100 or 150 of enrollment, check out (e.g., player object ID of the player 324 to whom the selected VDPPC is checked out), and/or connection and security information (optional step 1636).

The method 1600 can continue by the gaming system 300 establishing a secure communication session with the selected, now successfully checked out, VDPPC 100 or 150 (optional step 1640).

Figure 12:
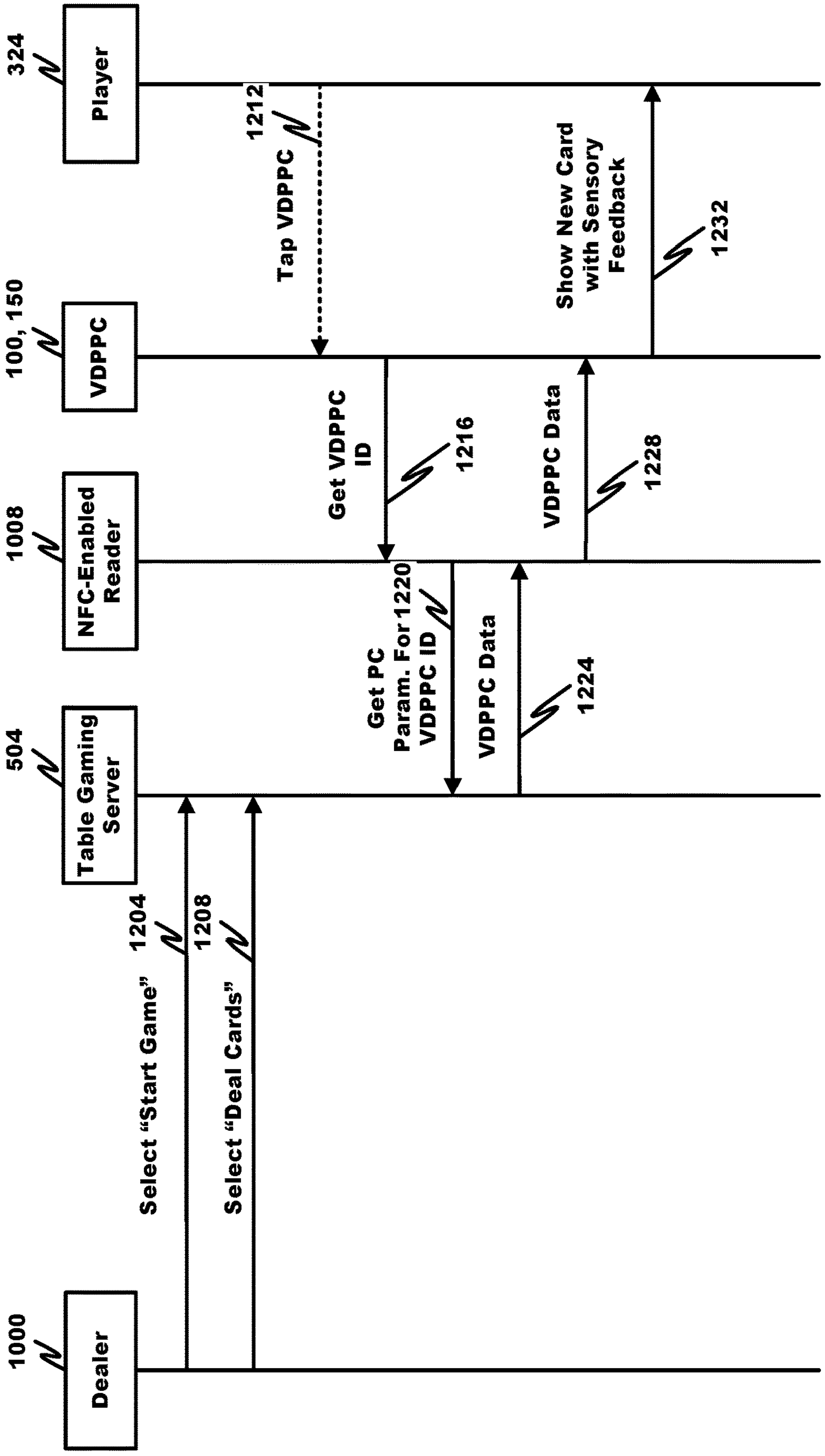
FIG. 12 depicts signal flows for VDPPC game play in accordance with embodiments of the present disclosure.
Figure 17:
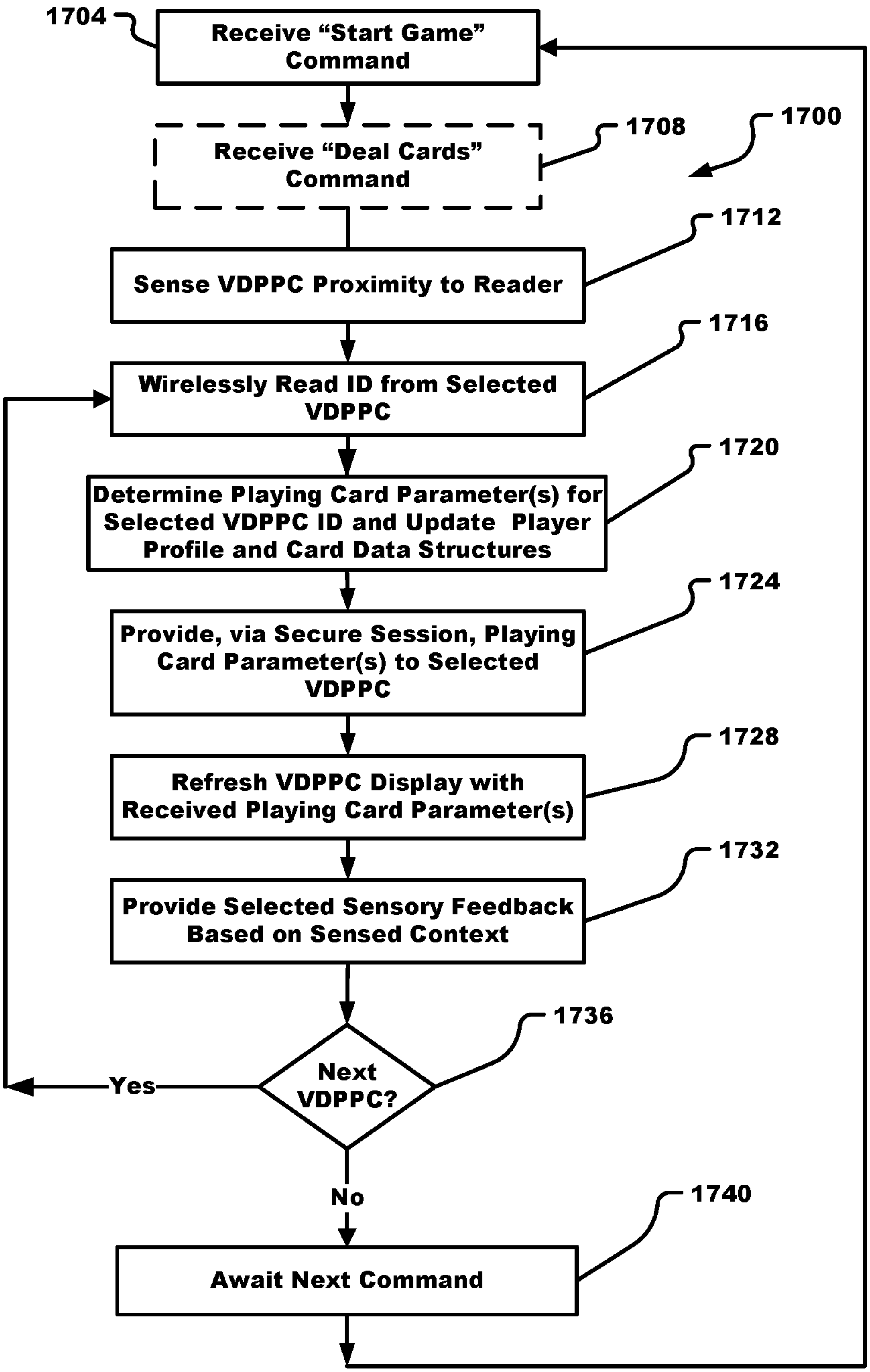
FIG. 17 is a flow chart illustrating VDPPC game play logic in accordance with embodiments of the present disclosure.

With reference now to FIGS. 12 and 17, various operations of a VDPPC 100 or 150, gaming device 312, table gaming server 504, central gaming server 316, and/or mobile device 328 will be described in accordance with at least some embodiments of the present disclosure.

The method 1700 begins when a table gaming server 504 or central gaming server 316 receives a "start game" request 1204 from a dealer 1000 (step 1704) and in optional step 1708 a "deal cards" request 1208 from the dealer 1000 (step 1708). As players 324 play at the table, the gaming system 300 needs to control the issued VDPPCs 100 or 150 to participating players 324 as part of a game. In one embodiment, especially when the VDPPCs 100 or 150 are powered by their own power source, a wireless communications channel would be constantly established between a communications device of the table and the VDPPCs 100 or 150 held by each player 324. The communications channel can be established at any time, such as in steps 1532 (FIG. 15) or 1640 (FIG. 16).

The method 1700 can continue by sensing a selected VDPPC 100 or 150 in proximity to the NFC-enabled reader (step 1712). The VDPPC 100 or 150 can be positioned in proximity to the NFC-enabled reader 1008 by the dealer 1000 or a player 324 associated with the selected VDPPC 100 or 150. While any technique may be used to sense proximity of the VDPPC 100 or 150 to be checked out to the NFC-enabled reader 1008, the dealer 1000 or player 324 in some embodiments taps 1212 the VDPPC 100 or 150 to the NFC-enabled reader 1008.

In response to sensing VDPPC proximity, the NFC-enabled reader 1008 reads 1216 the VDPPC ID from the selected VDPPC 100 or 150 and provides the VDPPC ID to the table gaming server 504 with a request 1216 from the selected VDPPC 100 or 150 and a further request 1220 from the NFC-enabled reader 1008 to get a playing card parameter for the VDPPC 100 or 150 associated with the VDPPC ID.

The method 1700 can continue by determining one or more playing card parameters for the selected VDPPC ID, updating the card parameter information field 464 in the playing card database 332, to reflect the determined one or more playing card parameters, and providing, via the secure session, the determined one or more playing card parameters to the selected VDPPC 100 or 150 (step 1724 and VDPPC data signals 1224 and 1228). The playing card parameter(s) can be determined by a number of techniques. In some embodiments, the table gaming server 504 can automatically deal cards out to each player's video display programmable playing cards, such as by determining the parameter(s) using a random number generator. This determination can be done on a VDPPC-by-VDPPC basis or for multiple VDPPCs in advance. In this case, a virtual deck of differing sets of playing card parameters would be generated, with each set of playing card parameters having a different queue position in the virtual deck and, as in a physical deck of cards, a set of playing card parameters at selected queue position in the deck (e.g., at the head or end of the queue) would be "drawn" from the virtual deck and assigned to the selected VDPPC. In some embodiment, the dealer 1000 can shuffle the deck of physical playing cards such as using a shuffler 928 and deal the physical (conventional) cards from the deck. Instead of transferring the physical cards to each player 324, the dealer 1000 could place the cards into the scanner 924 which would then trigger the digital transmission of the playing parameter(s) associated with each card to each appropriate player 324. In another embodiment, the player may place his or her VDPPC 100 or 150 in a certain location, such as a central location 900 on the table, or on a location 916 in front of the individual player 324, to be dealt the card or cards to be transferred to the VDPPC 100 or 150 held by the player 324.

The method 1700 can continue by the selected VDPPC 100 or 150 receiving the playing card parameter(s) and, in response, refreshing the VDPPC digital display with the received playing card parameter(s) (step 1728) and optionally providing selected sensory feedback based on sensed context (step 1732 and operation 1232). The sensory feedback, for example, can be one or more of the processor 248 of a VDPPC 100 causing the VDPPC to emit selected sounds through a speaker, vibrate, display selected content on the first or second digital display simultaneous with or prior to display of the received playing card parameter(s). For example, the first digital display can display customized selected content for the corresponding player such that different players in a common game have differing selected content rendered by the first digital display. The sensory feedback responses (e.g., animations, displays or sounds) of the VDPPCs 100 or 150 could scale to the event or game outcome. For example, a small win might cause the first digital display to flash a selected color for a first time duration or a first frequency while a large win might cause the first digital display to flash the selected color for a (longer) second time duration or a (higher) second frequency. Alternatively, a large win might cause the VDPPC display or cycle colors in patterns. The VDPPCs can have a matrix of fixed state thinner-than-paper RGB LEDs and a processor. When the cards are near the NFC field on the table, they illuminate and show synchronous patterns and images that enhance the table game experience.

The method 1700 can continue by the table gaming server 504 determining whether there is a next VDPPC (decision diamond 1736). If so, the table gaming server 504 can return to and repeat step 1716. If not, the table gaming server 504 can await the next command (step 1740).

Figure 13:
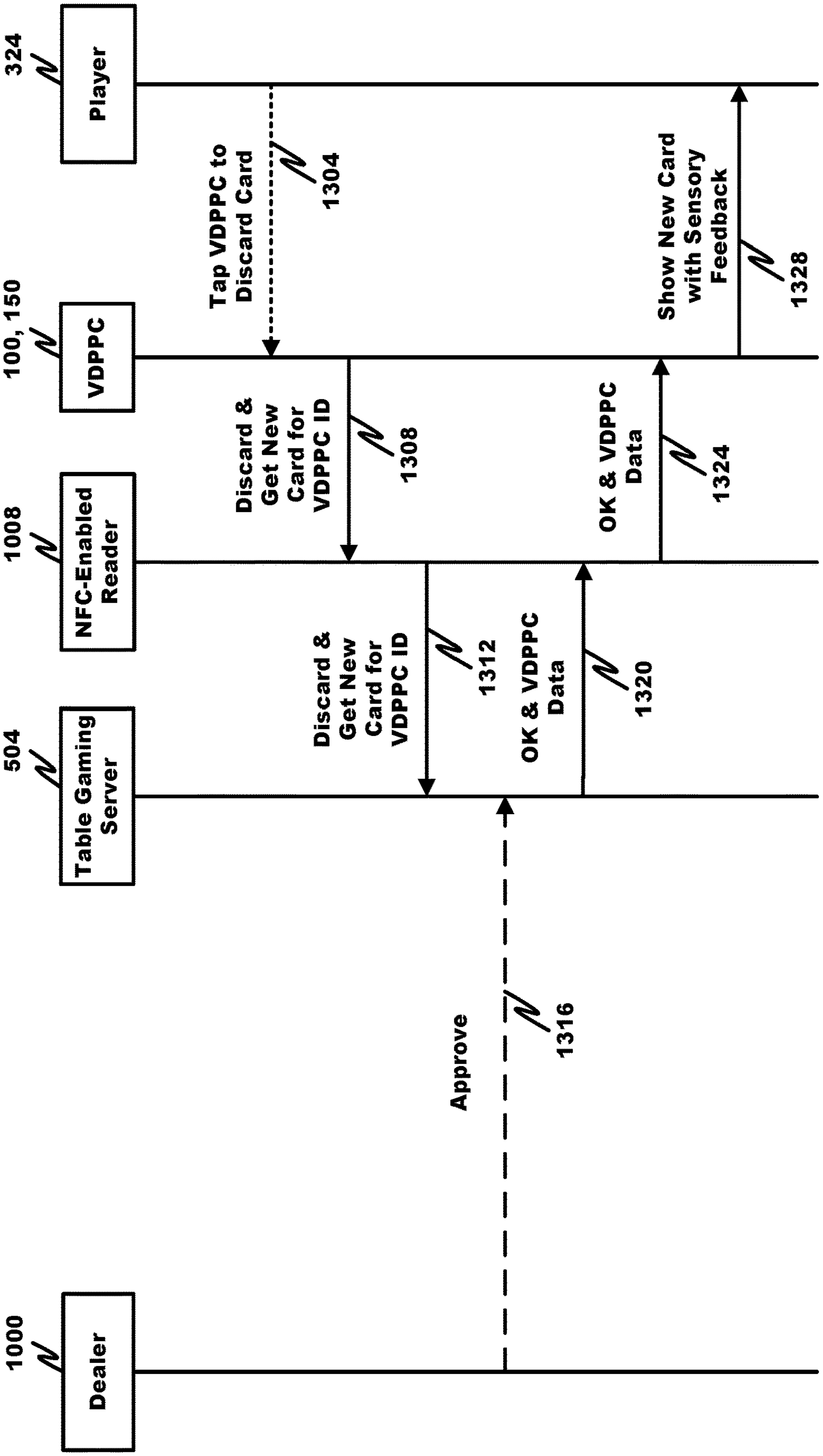
FIG. 13 depicts signal flows for VDPPC discard in accordance with embodiments of the present disclosure.
Figure 18:
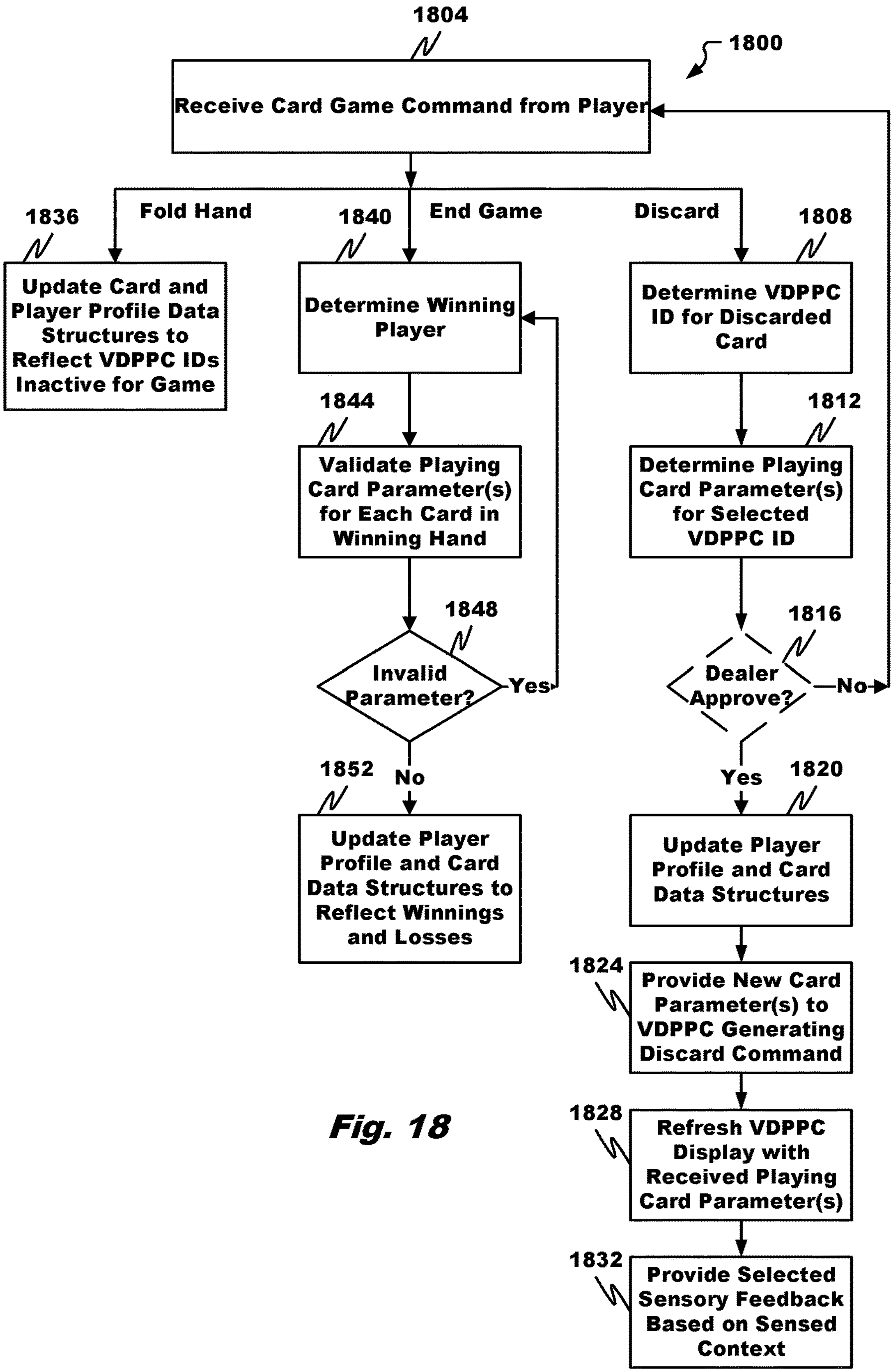
FIG. 18 is a flow chart illustrating VDPPC game play logic in accordance with embodiments of the present disclosure.

With reference now to FIGS. 13 and 18, various operations of a VDPPC 100 or 150, gaming device 312, table gaming server 504, central gaming server 316, and/or mobile device 328 will be described in accordance with at least some embodiments of the present disclosure.

The method 1800 begins when a table gaming server 504 or central gaming server 316 receives a card command from a player 324 or dealer 1000 (step 1804). As players 324 play at the table, the gaming system 300 needs to control the issued VDPPCs 100 or 150 to participating players 324 as part of a game. In one embodiment, especially when the VDPPCs 100 or 150 are powered by their own power source, a wireless communications channel would be constantly established between a communications device of the table and the VDPPCs 100 or 150 held by each player 324. The communications channel can be established at any time, such as in steps 1532 (FIG. 15) or 1640 (FIG. 16).

The method 1800 can continue by performing different operations depending on the received card command, namely discard, fold hand, or end game.

When the received card command is to discard, the method 1800 can continue by determining the VDPPC ID 100 or 150 for the discarded card (step 1808). In many card games, players can hold certain cards and request replacements of one or more cards. In one embodiment shown in FIG. 13, the player 324 can tap 1304 the first or second digital display on the VDPPC 100 or 150 he or she wishes to discard. This would send a first message 1308 over a wireless communications channel between the VDPPC 100 or 150 and the NFC-enabled reader 1008 and a second message 1312 from the reader 1008 to the table gaming server 504 to discard and get a new card for the selected VDPPC 100 or 150. These messages can include information identifying the playing card parameter(s) on the VDPPC that is/are being discarded or reference the serial number (or other VDPPC ID) of the VDPPC that is being discarded.

When the table gaming server 504 receives the second message 1312, the method 1800 can continue by the table gaming server 504 determining the new playing card parameter(s) for the selected VDPPC ID (step 1812). In some embodiments, the table gaming server 504 first validates that the VDPPC 100 or 150 being discarded is owned by the VDPPC 100 or 150 requesting the discard action, validate that the VDPPC 100 or 150 is active for the table and may also validate if the VDPPC 100 or 150 is assigned to a player 324.

The method 1800 can continue by the table gaming server 504, prior to providing the new playing card parameters requesting that the dealer 1000 approve the discard (decision diamond 1816). When the dealer fails to approve the discard, the method can continue by returning to step 1800 and awaiting a next card game command. Upon successful VDPPC validation and dealer approval, the table gaming server 504 can continue by generating or drawing the next card or set of playing card parameters in the virtual deck for issuance to the player's selected VDPPC 100 or 150 and updating the player profile and playing card data structures in the databases 226 and 332, respectively, to reflect the determined one or more playing card parameters (step 1820).

The method 1800 can continue by the table gaming server 504 providing, via the secure session, the determined one or more playing card parameters to the selected VDPPC 100 or 150 (step 1824 and VDPPC data signals 1320 and 1324).

The method 1800 can continue by the selected VDPPC 100 or 150 receiving the playing card parameter(s) and, in response, refreshing the VDPPC digital display with the received playing card parameter(s) (step 1828) and optionally providing selected sensory feedback based on sensed context (step 1832 and operation 1328).

When the received card command is to fold a hand, the method 1800 can continue by updating the player profile and playing card data structures in the databases 226 and 332, respectively, to reflect the VDPPC IDs of the VDPPCs assigned to the player folding the hand and therefore inactive for the remainder of the game (step 1836). A player 324 may fold during the process of the game. If this occurs, the player 324 can press or tap a physical button or digital button on one or more of his or her VDPPCs 100 or 150 to fold for the current hand in the game. Alternatively, they can tap one or more of his or her VDPPCs 100 or 150 on the NFC-enabled reader 1008 or an antenna 912 or at a seating location (or player station 912*a-h* or marked player location 916*a-h*) assigned to the player or a shared charge and data pad 900 comprising a shared wireless radio for the table. This process helps the table gaming server 504 determine and track a current state of the game. Alternatively, the dealer 1000 could be responsible for recording in the table gaming server 504 operated by the dealer 1000 or at the central gaming server 316 as one or more players 324 fold during the game.

When the table gaming server 504 receives an end game command (step 1800), the method 1800 can continue by the table gaming server 504 determining a winning player in the game (step 1840). At the end of a hand in a typical card game, for instance, the winning player 324 needs to be determined. Once the betting has completed on the table, the dealer 1000 can interact with the table gaming server 504, such as by issuing an end game command, to complete the current game. At this point, remaining players 324 in the card game may place their hidden cards face up on the table for other players 324 to view the displayed playing card parameters on the second digital display of the VDPPCs.

The method 1800 can continue by the table gaming server 504 requesting that the dealer 1000, prior to determining or displaying the winnings of each player 324, validating the displayed playing card parameter(s) on the second digital display of each VDPPC 100 or 150 in the hand of each remaining player or only in the hand of each of the winning players (step 1844). This is typically done by the table gaming server 504 determining, for the VDPPC ID of each such VDPPC, the playing card parameter values stored in the card parameter information field 464 in the playing card database 332, displaying the determined card parameter values on a display of a dealer's graphical user interface for viewing by the dealer 1000, and receiving confirmation by the dealer's graphical user interface that the VDPPC and graphical user interface displayed playing card parameters match. This validation is repeated VDPPC by VDPPC until each winning hand is validated. In some embodiments, the table gaming server 504 determines, based on the playing card parameters stored for each player in the playing profile and playing card databases 336 and 332, which of the hands of the remaining players 324 is a winning hand, or entitled to winnings from the game, and identifies the winning players 324 having winning hands via the dealer's graphical user interface. The foregoing validation process is thereafter initiated by the dealer 1000.

If there is a mismatch in playing card parameters between the displayed values, or an invalid playing card parameter displayed by a selected VDPPC in the winning hand, detected by the dealer 1000, it is likely that the respective player 324 has somehow manipulated one or more VDPPCs at the table, or one or more VDPPCs are malfunctioning (decision diamond 1848). In response, the table gaming server 504 returns to step 1840.

When the validation of the playing card parameters in the winning is successful, the central gaming server 316 updates the data structures in the playing profile and playing card databases 336 and 332 to reflect the winnings and losses from the game (step 1852).

Figure 14:
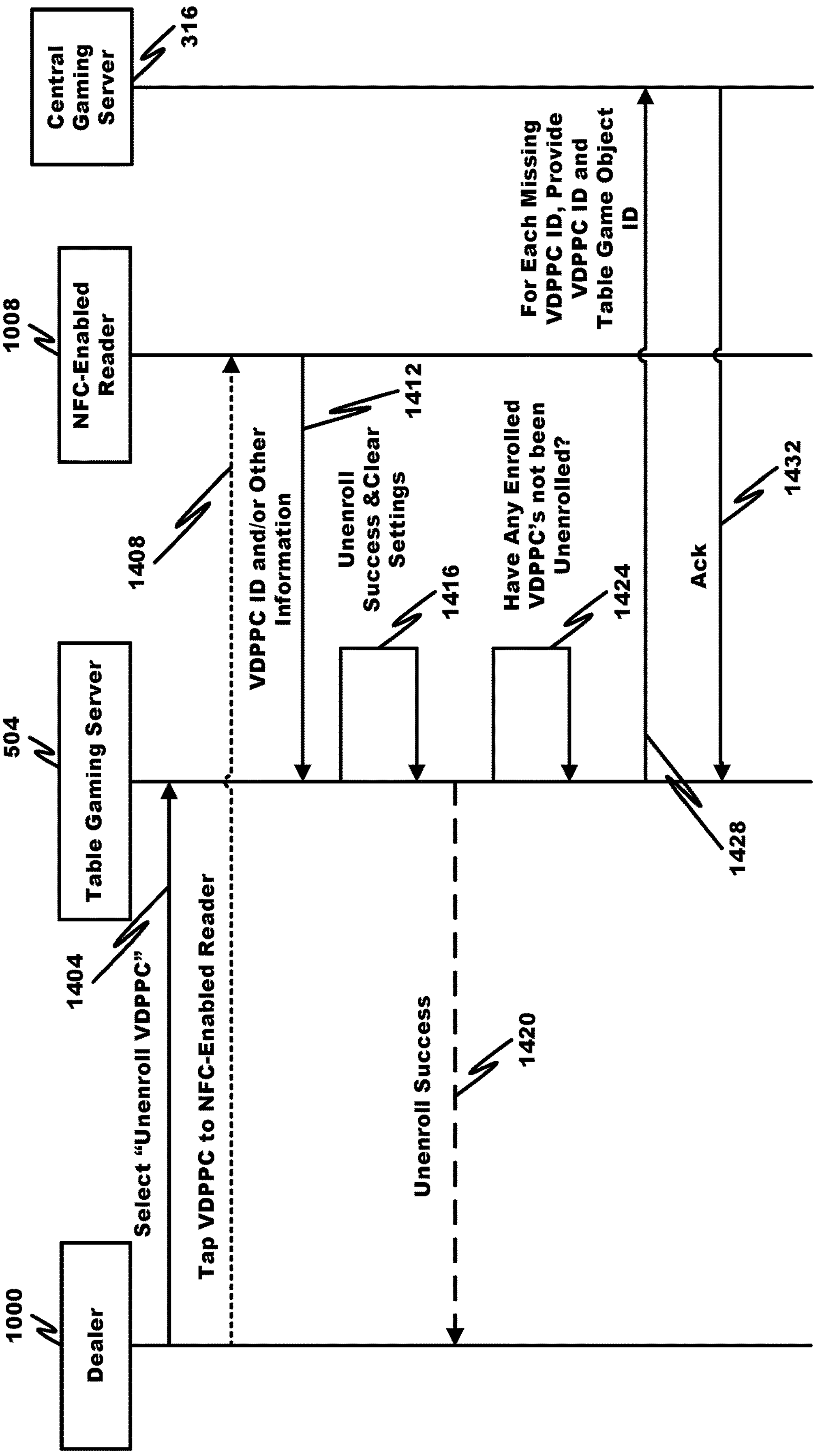
FIG. 14 depicts signal flows for VDPPC unenrollment in accordance with embodiments of the present disclosure.
Figure 19:
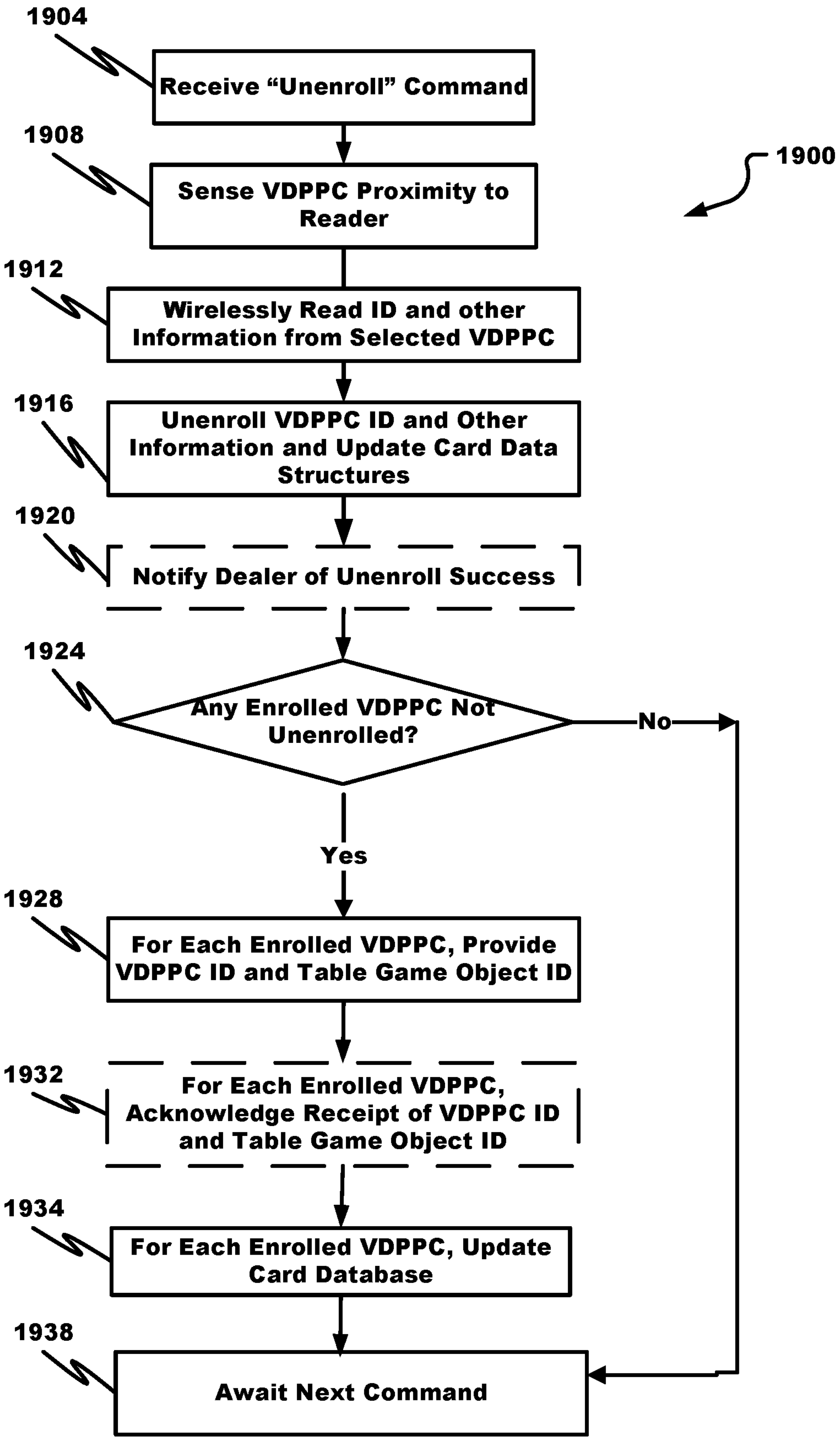
FIG. 19 is a flow chart illustrating VDPPC unenrollment logic in accordance with embodiments of the present disclosure.

With reference now to FIGS. 14 and 19, various operations of a VDPPC 100 or 150, gaming device 312, table gaming server 504, central gaming server 316 and/or mobile device 328 will be described in accordance with at least some embodiments of the present disclosure.

The method 1900 begins when a table gaming server 504 receives a "unenroll VDPPC" command 1404 from a dealer 1000 (step 1904). At the end of the shift, for example the dealer 1000 may close the table. During the table close process, the dealer may have to account for the table VDPPC inventory. While the method 1900 depicts a process similar to that used during table enrollment, it is to be understood that other processes may be employed.

The method 1900 can continue by the NFC-enabled reader 1008 proximally sensing a selected VDPPC 100 or 150 (step 1908) and wirelessly reading the VDPPC ID and other information 1412 from the selected VDPPC 100 or 150 (step 1912). For example, the dealer may have to tap 1408 the NFC-enabled reader 1008 (or other wireless radio) with each VDPPC 100 or 150 in the table VDPPC inventory to un-enroll each VDPPC 100 or 150.

The method 1900 can continue by the table or central gaming server unenrolling the VDPPC ID and other information of the selected VDPPC 100 or 150 and updating the assigned VDPPC IDs field 424, associated table game object IDs field 444, assigned player ID field 446, enrollment information field 452, and other data structures in the playing profile and playing card databases 336 and 332 to reflect that the corresponding VDPPC 100 or 150 is currently not enrolled by a dealer or table or associated with a player. This operation 1416 can further erase from the VDPPC memory 244 of the VDPPC information 290. For example, the process of unenrolling a VDPPC may also clear out any security information held in memory by the VDPPC, such as connection information, or any security keys negotiated during initial enrollment.

The method 1900 can continue by the table gaming server 504 notifying the dealer 1000 of enroll success for the selected VDPPC 100 or 150 (step 1920 and signal 1420).

At the conclusion of VDPPC unenrollment of the VDPPCs assigned to the dealer's table, the method 1900 can continue by the table or central gaming server determining whether any enrolled VDPPC has not yet been unenrolled (decision diamond 1924 and operation 1424) For example if a VDPPC is not tapped on the NFC-enabled reader 1008 during the process of closing the table, then the dealer 1000 will be forced to mark one or more VDPPCs 100 or 150 associated with a table game object ID corresponding to the table or dealer as missing.

When one or more VDPPCs remain enrolled, the method 1900 can continue by the table gaming server 504 providing by signal 1428 to the central gaming server 316 the corresponding VDPPC ID and table game object ID (step 1928), and, for each enrolled VDPPC, acknowledging by the central gaming server 316 receipt by signal 1432 of the VDPPC ID and table game object ID (optional step 1932).

The method 1900 can continue by the central gaming server 316, for each enrolled VDPPC, updating the assigned VDPPC IDs field 424, associated table game object IDs field 444, assigned player ID field 446, enrollment information field 452, and other data structures in the playing profile and playing card databases 336 and 332 to reflect that the VDPPC is missing so that the missing VDPPC(s) can be tracked and possibly prevented from being used at another table (step 1934).

The method 1900 can continue by the table gaming server 504 awaiting a next command (step 1938).

The disclosure also covers methods to preserve the battery charge level of the power source 220 of the VDPPCs 100 or 150 so that the VDPPCs keep working over a longer period of time.

By way of example, the first or second digital displays of the VDPPCs render selected content or the VDPPCs provide a selected set of sensory feedback responses (e.g., display or animate) when moved or displaced and then (after a selected time has expired since VDPPC movement) deactivate the display (e.g., cease rendering the selected content) or stop the selected set of sensory feedback responses. By way of illustration, a VDPPC might be off and not using battery power from the power source 220 when face down on the table. When the player moves the VDPPC, the first or second digital display of the VDPPC 100, for instance, begins displaying the corresponding selected content and then turns off again. Alternatively, one of the first and second digital displays persistently displays selected content while the other only displays selected content in response to VDPPC movement or tactile contact with a player or dealer.

By way of further illustration, the context sensor can comprise a motion sensor and, in a first sensed context, the context sensor senses that the VDPPC is moving at a first movement rate; in a second sensed context, the context sensor senses that the VDPPC is moving at a different second movement rate; in a first state corresponding to the first sensed context, a digital display displays a first selected content; and, in a second state corresponding to the second sensed context, the digital display displays a second selected content. The first and second videos are different from each other.

In another example, the gaming system 300, based on the value in the power source information field 472, selects VDPPCs to render first selected content by one of the digital displays but not second selected content by the other digital display based on a VDPPC stored charge level being below a selected level, allowing the other VDPPCs to gain or maintain charge by not being used.

In another example, the VDPPC 100 or 150 signals the gaming system 300 that the VDPPC 100 or 150 needs to be replaced or charged. The VDPPC 100 or 150 can notify the system 300 about its location stored in the location history field 476 so that the dealer associated with the VDPPC can replace or charge it.

In another example, VDPPCs 100 or 150 that are stacked can recognize that the top and/or bottom of the VDPPC is obscured (or senses a low ambient light level) and automatically power down the obscured digital display(s). By way of illustration, a top VDPPC in a VDPPC can have its exposed first digital display activated and its obscured second digital display deactivated and a bottom VDPPC at the bottom of the stack can have its obscured first display 108 deactivated and its exposed second digital display activated.

In another example, a VDPPC 100 with a higher remaining charge in its power source 220 shares a portion of that charge with one or more nearby VDPPCs.

The casino might implement measures to keep people from removing the VDPPCs from the casino. For example, beacons (not shown) could be placed around the casino to detect the VDPPCs being removed. Alternatively or additionally, a set of sensory feedback responses could be provided by the VDPPC when it senses that it is approaching a boundary of the casino or leaving an area of the casino.

In another aspect of the disclosure, a gaming table can comprise: a processor; and a computer-readable storage medium, coupled with the processor, comprising instructions that are executable by the processor, wherein the instructions comprise: instructions that receive, via a wireless communication session, a unique identifier from a playing card and associate the unique identifier of the playing card with a gaming table object.

In another aspect of the disclosure, a method to play a table game can comprise establishing a wireless communication session between a gaming system and a playing card; and associating a unique identifier, received from the playing card during the wireless communication session, with a gaming table object.

The computer-readable storage medium can further comprise instructions that establish a secure communication session between the processor and a playing card, wherein the unique identifier is received from the playing card during the secure communication session, and wherein the secure communication session is established by encrypting communications between the processor and the playing card by a symmetric or asymmetric cryptographic key, wherein the unique identifier comprises a serial number, wherein the computer-readable medium further comprises instructions that verify compliance of the playing card with a set of requirements and wherein the gaming table object comprises a dealer.

The set of requirements can comprise a set of software specifications, wherein the gaming table object comprises the gaming table.

The set of requirements can comprise a set of software requirements and wherein the gaming table object comprises a player at the gaming table, the playing card being assigned to the player.

The secure communication session can be established by encrypting communications between the processor and the playing card by a symmetric or asymmetric cryptographic key, wherein the unique identifier comprises an asset number associated with a casino, wherein the computer-readable medium further comprises instructions that verify compliance of the playing card with a set of hardware requirements and wherein the gaming table object comprises a seating position at the gaming table.

The wireless communication session can be a secure communication session.

The method can include further include the steps of receiving a dealer command to enroll the playing card; and in response to the dealer command, receiving the unique identifier from the playing card.

In another aspect of the disclosure, a gaming table can comprise: a processor; and a computer-readable storage medium, coupled with the processor, comprising instructions that are executable by the processor, wherein the instructions comprise: instructions that, in response to a player command received from a player by a playing card processor, validate that a unique identifier of the playing card is active for a gaming table object associated with the gaming table; and instructions that, in response to the playing card being active for the gaming table, cause execution of the player command.

In another aspect of the disclosure, a method to play a card game, can comprise: in response to a player command received from a player by a playing card processor, validating, by a gaming table processor, that a unique identifier of the playing card is currently assigned to a gaming table object associated with the gaming table and active for the gaming table; and in response to validating that the playing card is assigned to the gaming table object and active for the gaming table, causing execution of the player command.

The player command can comprise discard of a playing card parameter associated with the playing card and issuance of a new playing card parameter for the playing card.

The method can further include validating that a playing card parameter to be discarded is associated with the unique identifier of the playing card, wherein the player command is not caused to be executed when the validating is unsuccessful.

The player command can be to fold a hand and the method can further include the steps of: detecting, by the gaming table processor that a player associated with the unique identifier of the playing card has physically contacted a selected location on the gaming table or positioned the playing card on a selected location of the gaming table; and in response to the detecting, determining that the player command is to fold a hand. The fold hand command can require a further confirmation by the player before being executed by the processor. For instance, the gaming system can send a confirmation message to a gaming device or to one or more VDPPCs associated with the player to confirm a fold hand command. In another example, the player can be required to provide tactile confirmation of the command by touching with a VDPPC or a body part a defined area of a gaming device or providing a defined hand gesture. In another example, the dealer could be provided with a notification of the fold command and required to receive voice confirmation from the player that he or she intends to fold the hand.

The method can further include: determining a current spatial location of the playing card; validating that the current spatial location of the playing card corresponds to an assigned player seating location of the playing card; and in response to validating that the current spatial location of the playing card corresponds to the assigned player seating location, causing execution of the player command.

In another aspect of the disclosure, a gaming table can comprise: a processor; and a computer-readable storage medium, coupled with the processor, comprising instructions that are executable by the processor, wherein the instructions comprise: instructions that un-enroll a playing card by terminating an association of a unique identifier received from the playing card with a gaming table object; and instructions that cause the un-enrolled playing card to delete from a memory of the playing card information exchanged while the playing card was enrolled.

In another aspect of the disclosure, a method to manage a card game can comprise terminating, by a gaming system, an association of a unique identifier of a playing card with a gaming table object to un-enroll the playing card and causing the un-enrolled playing card to delete from a memory of the playing card information exchanged while the playing card was enrolled.

The gaming table can further comprise instructions to establish a secure communication session between the processor and the playing card to be un-enrolled by encrypting communications between the processor and the playing card using a symmetric or asymmetric cryptographic key and wherein the unique identifier comprises a serial number.

The gaming table object can comprise the gaming table, wherein the information exchanged comprises a cryptographic key and connection information from a secure communication session between the processor and the playing card.

The gaming table object can comprise a player at the gaming table, the playing card being assigned to the player.

The unique identifier can comprise an asset number associated with a casino and wherein the gaming table object comprises a seating position at the gaming table.

In various embodiments in which the gaming system includes a plurality of gaming devices 312, the gaming devices are configured to communicate with one another to provide a group gaming environment. In certain such embodiments, the gaming devices enable players of those gaming devices to work in conjunction with one another, such as by enabling the players to play together as a team or group, to win one or more awards. In other such embodiments, the gaming devices enable players of those gaming devices to compete against one another for one or more awards. In one such embodiment, the gaming devices enable the players of those gaming devices to participate in one or more gaming tournaments for one or more awards.

In various embodiments, the gaming system or gaming device includes one or more player tracking systems. Such player tracking systems enable operators of the gaming system or gaming device (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming device to begin a game, the card reader reads the player identification number off the player tracking card to identify the player. The gaming device timely tracks any suitable information or data relating to the identified player's game and updates the player profile or game event information in the player profile or event databases 436 or 432, respectively. The gaming device also timely tracks when the player tracking card is removed to conclude play for that game. In another embodiment, rather than requiring insertion of a player tracking card into the card reader, the gaming device utilizes one or more portable devices, such as a mobile phone, a radio frequency identification tag, or any other suitable wireless device, to track when a game begins and ends. In another embodiment, the gaming device utilizes any suitable biometric technology or ticket technology to track when a game begins and ends.

In such embodiments, during one or more games, the gaming device tracks, as event information, any suitable information or data, such as any amounts wagered, average wager amounts, and/or the time at which these wagers are placed. In different embodiments, for one or more players, the player tracking system and player profile includes the player's account number, the player's card number, the player's first name, the player's surname, the player's preferred name, the player's player tracking ranking, any promotion status associated with the player's player tracking card, the player's address, the player's birthday, the player's anniversary, the player's recent games, or any other suitable data.

Certain of the gaming systems described herein, including gaming devices located in a casino or another gaming establishment, include certain components and/or are configured to operate in certain manners that differentiate these gaming devices and systems from general purpose computing devices (i.e., certain personal gaming devices such as desktop computers and laptop computers).

For instance, gaming devices are highly regulated to ensure fairness and, in many cases, gaming devices, such as gaming devices 312, are configured to award monetary awards up to multiple millions of dollars. To satisfy security and regulatory requirements in a gaming environment, hardware and/or software architectures are implemented in EGMs that differ significantly from those of general-purpose computing devices. For purposes of illustration, a description of gaming devices relative to general-purpose computing devices and some examples of these additional (or different) hardware and/or software architectures found in gaming devices are described herein.

At first glance, one might think that adapting general-purpose computing device technologies to the gaming industry and gaming devices would be a simple proposition because both general purpose computing devices and gaming devices employ processors that control a variety of devices. However, due to at least: (1) the regulatory requirements placed on gaming devices, (2) the harsh environment in which gaming devices operate, (3) security requirements, and (4) fault tolerance requirements, adapting general purpose computing device technologies to gaming devices can be quite difficult. Further, techniques and methods for solving a problem in the general-purpose computing device industry, such as device compatibility and connectivity issues, might not be adequate in the gaming industry. For instance, a fault or a weakness tolerated in a general-purpose computing device, such as security holes in software or frequent crashes, is not tolerated in a gaming device because in a gaming device these faults can lead to a direct loss of funds from the gaming device, such as stolen cash or loss of revenue when the gaming device is not operating properly or when the random outcome determination is manipulated.

Certain differences between general-purpose computing devices and gaming devices are described below. A first difference between gaming devices and general-purpose computing devices is that gaming devices are state-based systems. A state-based system stores and maintains its current state in a non-volatile memory such that, in the event of a power failure or other malfunction, the state-based system can return to that state when the power is restored or the malfunction is remedied. For instance, for a state-based gaming device, if the gaming device displays an award for a game of chance but the power to the gaming device fails before the gaming device provides the award to the player, the gaming device stores the pre-power failure state in a non-volatile memory, returns to that state upon restoration of power, and provides the award to the player. This requirement affects the software and hardware design on gaming devices. General-purpose computing devices are typically not state-based machines, and a majority of data can be lost when a malfunction occurs on a general-purpose computing device.

A second difference between gaming devices and general-purpose computing devices is that, for regulatory purposes, the software on the gaming device utilized to operate the gaming device has been designed to be static and monolithic to prevent cheating by the operator of the gaming device. For instance, one solution that has been employed in the gaming industry to prevent cheating and to satisfy regulatory requirements has been to manufacture a gaming device that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the gaming device in the presence of a gaming regulator. Regardless of whether the EPROM solution is used, to gain approval in most gaming jurisdictions, a gaming device must demonstrate sufficient safeguards that prevent an operator or a player of a gaming device from manipulating the gaming device's hardware and software in a manner that gives him an unfair, and in some cases illegal, advantage.

A third difference between gaming devices and general-purpose computing devices is authentication-gaming devices storing code are configured to authenticate the code to determine if the code is unaltered before executing the code. If the code has been altered, the gaming device prevents the code from being executed. The code authentication requirements in the gaming industry affect both hardware and software designs on gaming devices. Certain gaming devices use hash functions to authenticate code. For instance, one gaming device stores game program code, a hash function, and an authentication hash (which may be encrypted). Before executing the game program code, the gaming device hashes the game program code using the hash function to obtain a result hash and compares the result hash to the authentication hash. If the result hash matches the authentication hash, the gaming device determines that the game program code is valid and executes the game program code. If the result hash does not match the authentication hash, the gaming device determines that the game program code has been altered (i.e., may have been tampered with) and prevents execution of the game program code.

A fourth difference between gaming devices and general-purpose computing devices is that gaming devices have unique peripheral device requirements that differ from those of a general-purpose computing device, such as peripheral device security requirements not usually addressed by general-purpose computing devices. For instance, monetary devices, such as coin dispensers, bill validators, and ticket printers and computing devices that are used to govern the input and output of cash or other items having monetary value (such as tickets) to and from a gaming device have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs and EGTs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain gaming devices use a watchdog timer to provide a software failure detection mechanism. In a normally-operating gaming device, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain gaming devices use several power supply voltages to operate portions of the computer circuitry. These can be generated in a central power supply or locally on the computer board. If any of these voltages falls out of the tolerance limits of the circuitry they power, unpredictable operation of the gaming device may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain gaming devices have power supplies with relatively tighter voltage margins than that required by the operating circuitry. In addition, the voltage monitoring circuitry implemented in certain gaming devices typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the gaming device.

As described above, certain gaming devices are state-based machines. Different functions of the game provided by the gaming device (e.g., bet, play, result, points in the graphical presentation, etc.) may be defined as a state. When the gaming device moves a game from one state to another, the gaming device stores critical data regarding the game software in a custom non-volatile memory subsystem. This ensures that the player's wager and credits are preserved and to minimize potential disputes in the event of a malfunction on the gaming device. In general, the gaming device does not advance from a first state to a second state until critical information that enables the first state to be reconstructed has been stored. This feature enables the gaming device to recover operation to the current state of play in the event of a malfunction, loss of power, etc. that occurred just prior to the malfunction. In at least one embodiment, the gaming device is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the gaming device memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve gaming device critical data, although other types of non-volatile memory devices may be employed. These memory devices are typically not used in typical general purpose computing devices.

Thus, in at least one embodiment, the gaming device is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of gaming device critical information) within a time period of 200 milliseconds or less. In at least one embodiment, the time period of 200 milliseconds represents a maximum amount of time for which sufficient power may be available to the various gaming device components after a power outage event has occurred at the gaming device.

As described previously, the gaming device may not advance from a first state to a second state until critical information that enables the first state to be reconstructed has been atomically stored. After the state of the gaming device is restored during the play of a game of chance, game play may resume and the game may be completed in a manner that is no different than if the malfunction had not occurred. Thus, for example, when a malfunction occurs during a game of chance, the gaming device may be restored to a state in the game of chance just prior to when the malfunction occurred. The restored state may include metering information and graphical information that was displayed on the gaming device in the state prior to the malfunction. For example, when the malfunction occurs during the play of a card game after the cards have been dealt, the gaming device may be restored with the cards that were previously displayed as part of the card game. As another example, a bonus game may be triggered during the play of a game of chance in which a player is required to make a number of selections on a video display screen. When a malfunction has occurred after the player has made one or more selections, the gaming device may be restored to a state that shows the graphical presentation just prior to the malfunction including an indication of selections that have already been made by the player. In general, the gaming device may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device, such as the player profile database 436 or event database 432. The information stored in the non-volatile memory may be detailed enough to reconstruct a portion of the graphical presentation that was previously presented on the gaming device and the state of the gaming device (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming device prior to, during, and/or after the disputed game to demonstrate whether the player was correct or not in her assertion.

Another feature of gaming devices is that they often include unique interfaces, including serial interfaces, to connect to specific subsystems internal and external to the gaming device. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the gaming device, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming device to a remote device. Often SAS is used in conjunction with a player tracking system.

Certain gaming devices may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into a gaming device by monitoring security switches attached to access doors in the gaming device cabinet. Access violations result in suspension of game play and can trigger additional security operations to preserve the current state of game play. These circuits also function when power is off by use of a battery backup. In power-off operation, these circuits continue to monitor the access doors of the gaming device. When power is restored, the gaming device can determine whether any security violations occurred while power was off, e.g., via software for reading status registers. This can trigger event log entries and further data authentication operations by the gaming device software.

Trusted memory devices and/or trusted memory sources are included in a gaming device to ensure the authenticity of the software that may be stored on less secure memory subsystems, such as mass storage devices. Trusted memory devices and controlling circuitry are typically designed to not enable modification of the code and data stored in the memory device while the memory device is installed in the gaming device. The code and data stored in these devices may include authentication algorithms, random number generators, authentication keys, operating system kernels, etc. The purpose of these trusted memory devices is to provide gaming regulatory authorities a root trusted authority within the computing environment of the gaming device that can be tracked and verified as original. This may be accomplished via removal of the trusted memory device from the gaming device computer and verification of the secure memory device contents is a separate third party verification device. Once the trusted memory device is verified as authentic, and based on the approval of the verification algorithms included in the trusted device, the gaming device is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs and EGTs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, gaming devices that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should further be appreciated that the gaming device of the present disclosure may have varying or alternative housing configurations.

It should further be appreciated that the gaming device of the present disclosure may have varying or alternative display device configurations.

In various embodiments, the gaming device of the present disclosure is configured to be positioned on a base or stand.

It should be appreciated that the enhanced physical player interaction provided by the present disclosure, in addition to being implemented in an gaming device configured to be located on a casino floor, can be implemented in one or more personal gaming devices, such as desktop computers, laptop computers, tablet computers or computing devices, personal digital assistants, mobile phones, and other mobile computing devices.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

As will be appreciated by one skilled in the art, aspects of the present disclosure may be illustrated and described herein in any of a number of patentable classes or circumstances including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the disclosure of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A method of playing a card game, comprising:

enrolling, by a gaming system, a plurality of playing cards with a gaming table, the enrolling comprising associating a unique identifier of each of the plurality of playing cards with a gaming table object identifier associated with the gaming table, verifying software installed on a playing card to be enrolled by comparing the software installed on the playing card against stored information describing the software, and enabling a session key for the playing card to be enrolled to secure later wireless communications between the enrolled playing card and the gaming system;

thereafter assigning, by the gaming system, each playing card of the plurality of playing cards to a unique identifier of a corresponding player of a plurality of players in a card game, each of the assigned playing cards comprising opposing first and second planar playing card surfaces, wherein, when each of the assigned playing cards is being viewed by the corresponding player, the first planar playing card surface faces other players and the second planar playing card surface faces the corresponding player, the second planar playing card surface comprising a digital display; and at a conclusion of a card game involving the enrolled and assigned playing cards and prior to determining or displaying winnings of a corresponding player, validating displayed playing card parameters of each of the enrolled and assigned playing cards of the corresponding player against a stored playing card parameter to identify any mismatch with the displayed playing card parameters.

2. The method of claim 1, wherein the assigning comprises associating each playing card to an identifier of the corresponding player, and further comprising:

determining, by the gaming system, a playing card parameter to be assigned to each of the plurality of playing cards, wherein each of the assigned playing card parameters comprises a value of a corresponding assigned playing card;

providing, by the gaming system, each of the assigned playing cards with a corresponding determined playing card parameter for depiction by the digital display of the respective playing card; and receiving, by the gaming system, current playing card state information from each of the assigned playing cards.

3. The method of claim 2, wherein the gaming system periodically receives current playing card state information from each of the assigned playing cards, wherein a parameter of each assigned playing card comprises a type of playing card, wherein the digital display comprises a light-emitting diode (“LED”) digital display, wherein each of the playing card parameters is a member of a set of playing card parameters, and wherein the determining comprises:

determining, by a random or pseudorandom number generator, multiple sets of playing card parameters, each of the multiple sets of playing card parameters corresponding to a separate playing card;

associating each of the multiple sets of playing card parameters with a position in a virtual deck of playing cards; and indicating in the virtual deck which of the multiple sets of playing card parameters has been assigned to each of the assigned playing cards; and further comprising:

in response to receiving a discard request from a playing card assigned to a player, selecting a next set of playing card parameters in the multiple sets of playing cards parameters and providing the selected next set of playing card parameters to the playing card requesting discard; and updating a data structure to indicate that a set of playing card parameters previously assigned to the playing card requesting discard is no longer eligible for use during the card game.

4. The method of claim 1, wherein the second planar playing card surfaces of the assigned playing cards comprise a corresponding digital display, and further comprising:

providing, by the gaming system, each of the assigned playing cards with selected content for depiction by the corresponding second planar playing card surface digital displays of the assigned playing cards, the selected content being unrelated to a playing card parameter and wherein the selected content for depiction by the corresponding second planar playing card surface digital displays is the same; and subsequently unenrolling, by the gaming system, each of the plurality of playing cards from the gaming table, the subsequently unenrolling comprising disassociating the unique identifier of each of the plurality of playing cards with the gaming table object identifier associated with the gaming table; and when a previously enrolled playing card is not present for unenrollment, updating a data structure associated with the previously enrolled playing card to indicate that the previously enrolled playing card is missing.

5. The method of claim 1, wherein playing card parameters of the assigned playing cards are different from one another.

6. The method of claim 1, wherein the digital display comprises a liquid-crystal digital display (“LCD”) and further comprising:

in response to receiving a request to fold a hand from one or more playing cards assigned to a player, updating a data structure to indicate that a set of playing card parameters previously assigned to the one or more playing cards requesting discard is no longer eligible for use during the card game.

7. The method of claim 1, further comprising:

at a first time, determining that the second planar playing card surface of an assigned playing card is in contact with a surface of the gaming table of the gaming system, wherein the determining at the first time comprises determining that a detected ambient light level for the second planar playing card surface is less than a threshold ambient light level;

in response to determining that the second planar playing card surface of the assigned playing card is in contact with the surface of the gaming table, ceasing depiction of the displayed playing card parameter by the digital display of the assigned playing card;

at a different second time, determining that the second planar playing card surface of the assigned playing card is no longer in contact with the surface of the gaming table, wherein the determining at the different second time comprises determining that a detected ambient light level for the second planar playing card surface is more than a threshold ambient light level; and in response to determining that the second planar playing card surface of the assigned playing card is no longer in contact with the surface of the gaming table, initiating depiction of the displayed playing card parameter by the digital display of the assigned playing card.

8. The method of claim 1, wherein a playing card parameter comprises a playing card type and value, wherein the digital display comprises multiple digital displays, and further comprising:

when a stored charge level of a selected playing card is above a selected level, rendering first and second selected content by respective digital displays of the first and second planar playing card surfaces; and when a stored charge level of the selected playing card falls below the selected level, rendering first selected content by one of the multiple digital displays but not second selected content by the other of the multiple digital displays.

9. A gaming system, comprising:

a communication interface to receive and send communications over a network;

a processor coupled with the communication interface; and a computer readable medium coupled with and readable by the processor and comprising a set of instructions that, when executed by the processor, cause the processor to:

enroll a plurality of playing cards with a gaming table, the enrolling comprising associating a unique identifier of each of the plurality of playing cards with a gaming table object identifier associated with the gaming table, verifying software installed on a playing card of the plurality of playing cards to be enrolled by comparing the software installed on the playing card against stored information describing the software, and enabling a session key for the playing card to be enrolled to secure later wireless communications between the enrolled playing card and the gaming system;

assign each playing card of the plurality of playing cards to a unique identifier of a corresponding player of a plurality of players in a card game, each of the assigned playing cards comprising opposing first and second planar playing card surfaces, wherein, when each of the assigned playing cards is being viewed by the corresponding player, the first planar playing card surface faces other players and the second planar playing card surface faces the corresponding player, the second planar playing card surface comprising a digital display; and at a conclusion of a card game involving the enrolled and assigned playing cards and prior to determining or displaying winnings of a corresponding player, validate displayed playing card parameters of each of the enrolled and assigned playing cards of the corresponding player against a stored playing card parameter to identify any mismatch with the displayed playing card parameters.

10. The gaming system of claim 9, wherein, in the assigning, the processor associates each playing card to an identifier of the corresponding player, wherein each of the displayed playing card parameters comprises a value of a corresponding assigned playing card, and wherein the set of instructions, when executed by the processor, further cause the processor to:

determine a playing card parameter to be assigned to each of the plurality of playing cards;

provide each of the assigned playing cards with a corresponding determined playing card parameter for depiction by the digital display of the respective playing card; and receive current playing card state information from each of the assigned playing cards.

11. The gaming system of claim 10, wherein the processor periodically receives, via the communication interface, current playing card state information from each of the assigned playing cards, wherein a parameter of each of the assigned playing cards comprises a type of playing card, wherein the digital display comprises a light-emitting diode ("LED") digital display, wherein each of the playing card parameters is a member of a set of playing card parameters, and wherein, in the determining, the processor:

determines, by random or pseudorandom number generator output, multiple sets of playing card parameters, each of the multiple sets of playing card parameters corresponding to a separate playing card;

associates each of the multiple sets of playing card parameters with a position in a virtual deck of playing cards; and indicates in the virtual deck which of the multiple sets of playing card parameters has been assigned to each of the assigned playing cards; and wherein the set of instructions, when executed by the processor, further cause the processor to:

in response to receiving a discard request from a playing card assigned to a player, select a next set of playing card parameters in the multiple sets of playing cards parameters and providing the selected next set of playing card parameters to the playing card requesting discard; and update a data structure to indicate that a set of playing card parameters previously assigned to the playing card requesting discard is no longer eligible for use during the card game.

12. The gaming system of claim 9, wherein the second planar playing card surfaces of the assigned playing cards comprise a corresponding digital display, and wherein the set of instructions, when executed by the processor, further cause the processor to:

provide each of the assigned playing cards with selected content for depiction by the corresponding second planar playing card surface digital displays of the assigned playing cards, the selected content being unrelated to a playing card parameter and wherein the selected content for depiction by the corresponding second planar playing card surface digital displays is the same; and subsequently unenroll each of the plurality of playing cards from the gaming table, the subsequently unenrolling comprising disassociating the unique identifier of each of the plurality of playing cards with the gaming table object identifier associated with the gaming table; and when a previously enrolled playing card is not present for unenrollment, update a data structure associated with the previously enrolled playing card to indicate that the previously enrolled playing card is missing.

13. The gaming system of claim 9, wherein the displayed playing card parameters are different from one another.

14. The gaming system of claim 9, wherein the digital display comprises a liquid-crystal digital display ("LCD") and wherein the set of instructions, when executed by the processor, further cause the processor to:

in response to receiving a request to fold a hand from one or more playing cards assigned to a player, update a data structure to indicate that a set of playing card parameters previously assigned to the one or more playing cards requesting to fold a hand is no longer eligible for use during the card game.

15. The gaming system of claim 9, wherein the set of instructions, when executed by the processor, further cause the processor to:

at a first time, determine that the second planar playing card surface of an assigned playing card is in contact with a surface of the gaming table of the gaming system, wherein the determining at the first time comprises determining that a detected ambient light level for the second planar playing card surface is less than a threshold ambient light level;

in response to determining that the second planar playing card surface of the assigned playing card is in contact with the surface of the gaming table, cease depiction of the displayed playing card parameter by the digital display of the assigned playing card;

at a different second time, determine that the second planar playing card surface of the assigned playing card is no longer in contact with the surface of the gaming table, wherein the determining at the different second time comprises determining that a detected ambient light level for the second planar playing card surface is more than a threshold ambient light level; and in response to determining that the second planar playing card surface of the assigned playing card is no longer in contact with the surface of the gaming table, initiate depiction of the displayed playing card parameter by the digital display of the assigned playing card.

16. The gaming system of claim 9, wherein a playing card parameter comprises a playing card type and value, wherein the digital display comprises multiple digital displays, and wherein the set of instructions, when executed by the processor, further cause the processor to:

when a stored charge level of a selected playing card is above a selected level, render first and second selected content by respective digital displays of the first and second planar playing card surfaces; and when a stored charge level of the selected playing card falls below the selected level, render first selected content by one of the multiple digital displays but not second selected content by the other of the multiple digital displays.

17. A gaming system, comprising:

a communication interface to receive and send communications over a network;

a processor coupled with the communications interface; and a computer readable medium coupled with and readable by the processor and comprising a set of instructions that, when executed by the processor, cause the processor to:

enroll a plurality of playing cards with a gaming table, the enrolling comprising associating a unique identifier of each of the plurality of playing cards with a gaming table object identifier associated with the gaming table, verifying software installed on each playing card to be enrolled by comparing the software installed on the playing card against stored information describing the software, and enabling a session key for the playing card to be enrolled to secure later wireless communications between the enrolled playing card and the gaming system;

thereafter assign each playing card of the plurality of playing cards to a unique identifier of a corresponding player of a plurality of players in a card game, each of the assigned playing cards comprising opposing first and second planar playing card surfaces, wherein, when each of the assigned playing cards is being view by the corresponding player, the first planar playing card surface faces other players and the second planar playing card surface faces the corresponding player, the second planar playing card surface comprising a digital display;

at a conclusion of a card game involving the enrolled and assigned playing cards and prior to determining or displaying winnings of a corresponding player, validate displayed playing card parameters of each of the enrolled and assigned playing cards of the corresponding player against a stored playing card parameter to identify any mismatch with the displayed playing card parameters; and in response to identifying a mismatch, determining that an error exists in the card game.

18. The gaming system of claim 17, wherein the displayed playing card parameters are different from one another, wherein the error indicates that the selected player has manipulated one or more of the playing cards assigned to the selected player or one or more of the playing cards assigned to the selected player has malfunctioned, and wherein the set of instructions, when executed by the processor, further cause the processor to:

determine a playing card parameter to be assigned to each of the assigned playing cards;

provide, by the communication interface, each of the assigned playing cards with the corresponding determined playing card parameter for depiction by the digital display of the respective playing card; and receive, by the communication interface, current playing card state information from each of the assigned playing cards.

19. The gaming system of claim 18, wherein the processor periodically receives, by the communication interface, current playing card state information from each of the assigned playing cards, wherein a parameter of each of the assigned playing cards comprises a type of playing card, wherein the digital display comprises a light-emitting diode ("LED") digital display, wherein each of the playing card parameters is a member of a set of playing card parameters, and wherein, in determining the playing card parameter to be assigned to each of the assigned playing cards, the processor:

determines, using random or pseudorandom generator output, multiple sets of playing card parameters, each of the multiple sets of playing card parameters corresponding to a separate playing card;

associates each of the multiple sets of playing card parameters with a position in a virtual deck of playing cards; and indicates in the virtual deck which of the multiple sets of playing card parameters has been assigned to each of the assigned playing cards;

in response to receiving a discard request from a playing card assigned to a player, selects a next set of playing card parameters in the multiple sets of playing cards parameters and providing the selected next set of playing card parameters to the playing card requesting discard; and updates a data structure to indicate that a set of playing card parameters previously assigned to the playing card requesting discard is no longer eligible for use during the card game.

20. The gaming system of claim 18, wherein each of the playing card parameters comprises a value of a corresponding assigned playing card, wherein the digital display comprises a liquid-crystal digital display ("LCD"), wherein the second planar playing card surfaces of the assigned playing cards comprise a corresponding digital display and wherein the set of instructions, when executed by the processor, further cause the processor to:

provide each of the assigned playing cards with selected content for depiction by the corresponding second planar playing card surface digital displays of the assigned playing cards, the selected content being unrelated to the playing card parameter and wherein the selected content for depiction by the corresponding second planar playing card surface digital displays is the same;

after the card game, unenroll each of the plurality of playing cards from the gaming table, the unenrolling comprising disassociating the unique identifier of each of the plurality of playing cards with the gaming table object identifier associated with the gaming table; and when a previously enrolled playing card is not present for unenrollment, update a data structure associated with the previously enrolled playing card that is not present for unenrollment to indicate that the previously enrolled playing card is missing.

* * * * *